US008571389B2

(12) United States Patent
Nakashika et al.

(10) Patent No.: US 8,571,389 B2
(45) Date of Patent: Oct. 29, 2013

(54) INFORMATION RECORDING MEDIUM, INFORMATION RECORDING/PLAYBACK METHOD, AND INFORMATION RECORDING/PLAYBACK APPARATUS

(75) Inventors: Masahiro Nakashika, Kawasaki (JP); Shinichi Kikuchi, Kawasaki (JP); Hiroaki Unno, Kunitachi (JP); Yuuji Ito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1198 days.

(21) Appl. No.: 10/805,436

(22) Filed: Mar. 22, 2004

(65) Prior Publication Data

US 2004/0234247 A1 Nov. 25, 2004

(30) Foreign Application Priority Data

Mar. 25, 2003 (JP) ................................ 2003-083631

(51) Int. Cl.
*H04N 5/84* (2006.01)
(52) U.S. Cl.
USPC ........................................................ 386/334
(58) Field of Classification Search
USPC ........................................................ 386/125
See application file for complete search history.

(56) References Cited

U.S. PATENT DOCUMENTS

| 6,181,870 B1 * | 1/2001 | Okada et al. ................. 386/241 |
| 6,285,826 B1 * | 9/2001 | Murase et al. ................ 386/125 |
| 2002/0131761 A1 * | 9/2002 | Kawasaki et al. ............. 386/65 |
| 2003/0031467 A1 | 2/2003 | Ando et al. |

FOREIGN PATENT DOCUMENTS

| EP | 0 801 384 A2 | 10/1997 |
| JP | 2000-268537 | 9/2000 |
| JP | 2002-218398 | 8/2002 |
| WO | WO 00/49803 | 8/2000 |

OTHER PUBLICATIONS

U.S. Appl. No. 10/860,117, filed Jun. 4, 2004, Nakashika et al.
U.S. Appl. No. 10/945,004, filed Sep. 21, 2004, Kikuchi et al.

* cited by examiner

*Primary Examiner* — William C Vaughn, Jr.
*Assistant Examiner* — Daniel Tekle
(74) *Attorney, Agent, or Firm* — Oblon, Spivak, McClelland, Maier & Neustadt, L.L.P.

(57) ABSTRACT

A digital stream signal complying with MPEG-TS is handled as stream object ESOB. The ESOB is recorded in unit of stream object unit ESOBU which includes one or more pack/packet groups. Each pack/packet group has a pack/packet group header at its head position, and stores one or more TS packets after the pack/packet group header.

8 Claims, 56 Drawing Sheets

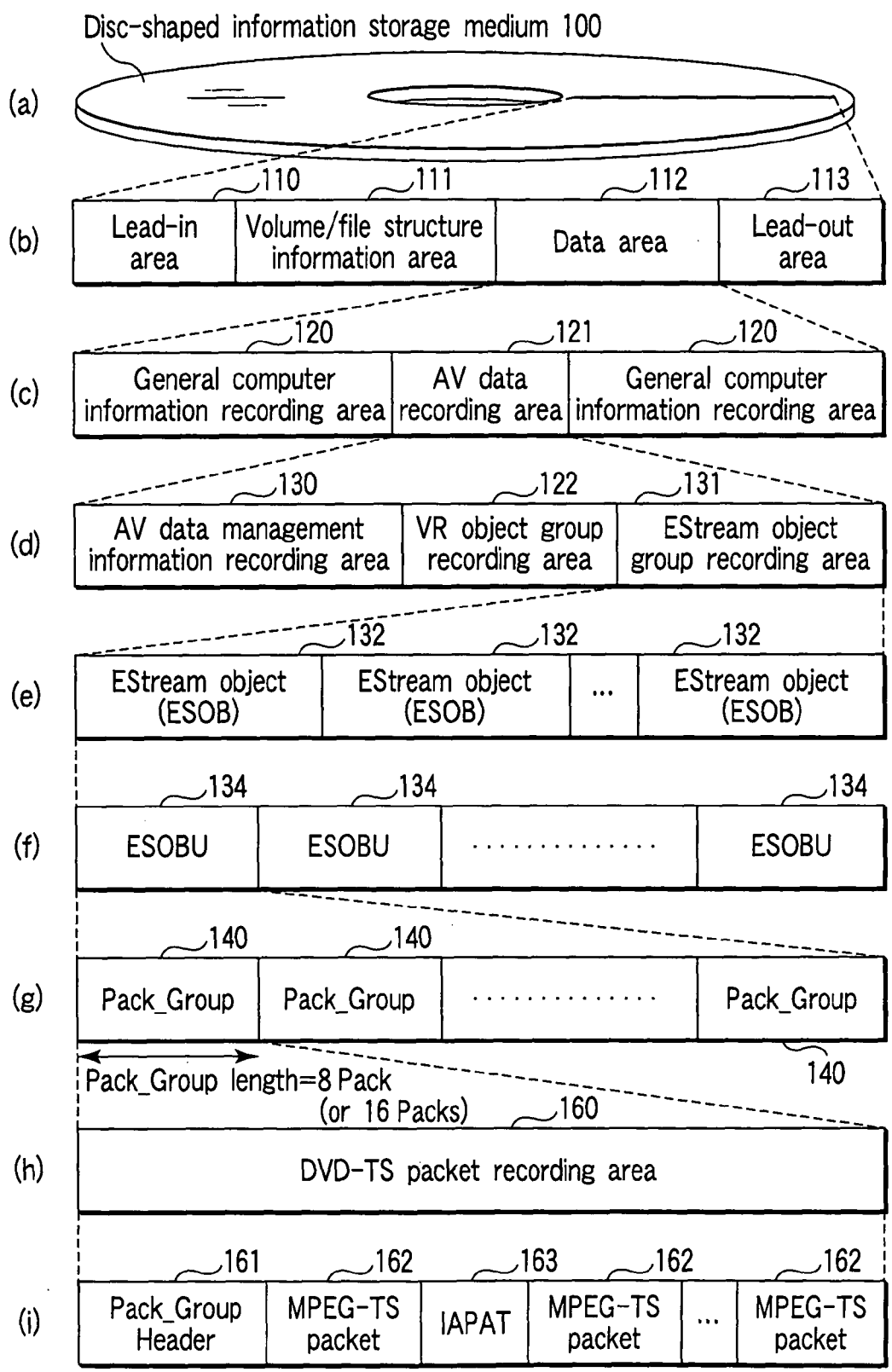
F I G. 1

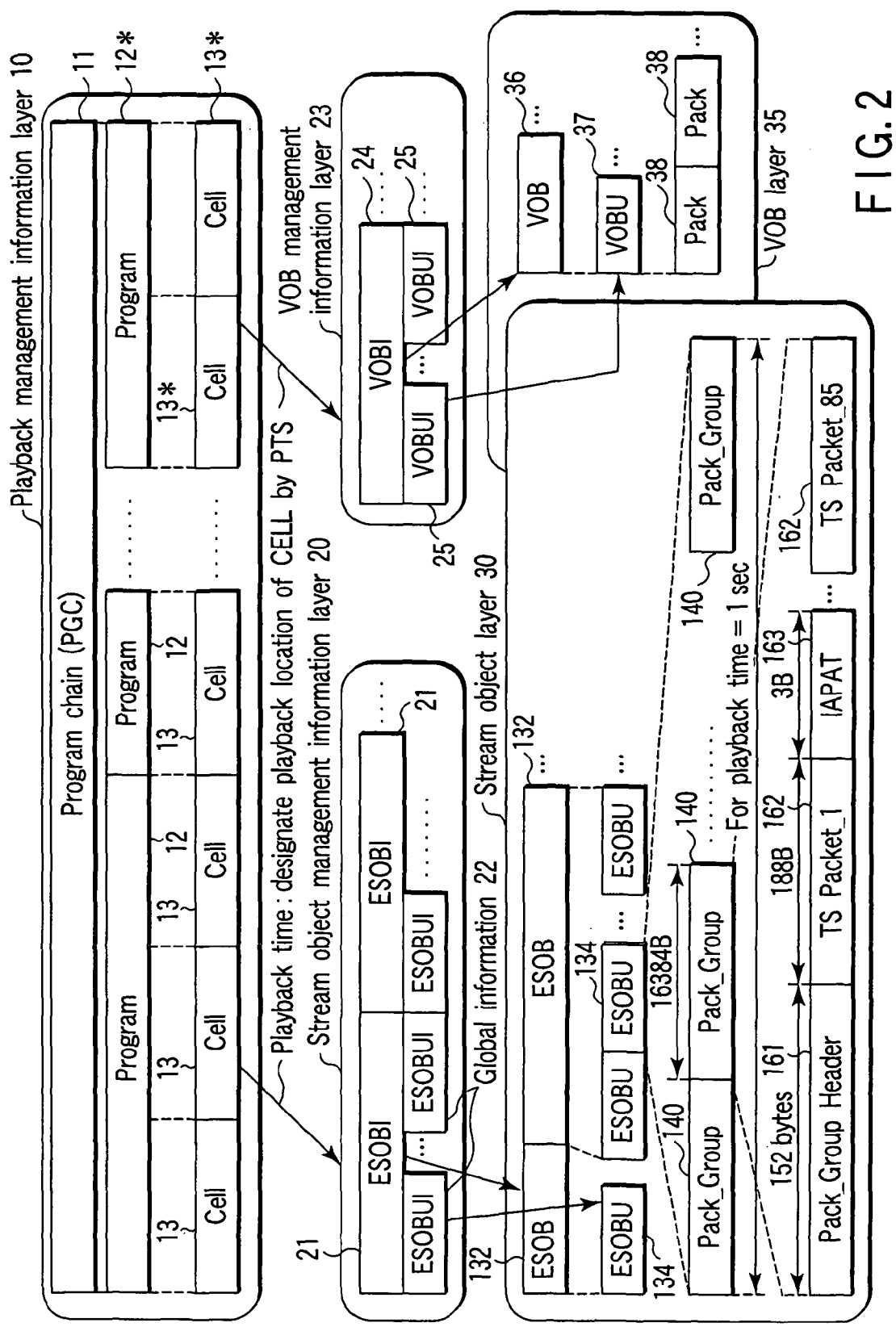
F I G. 2

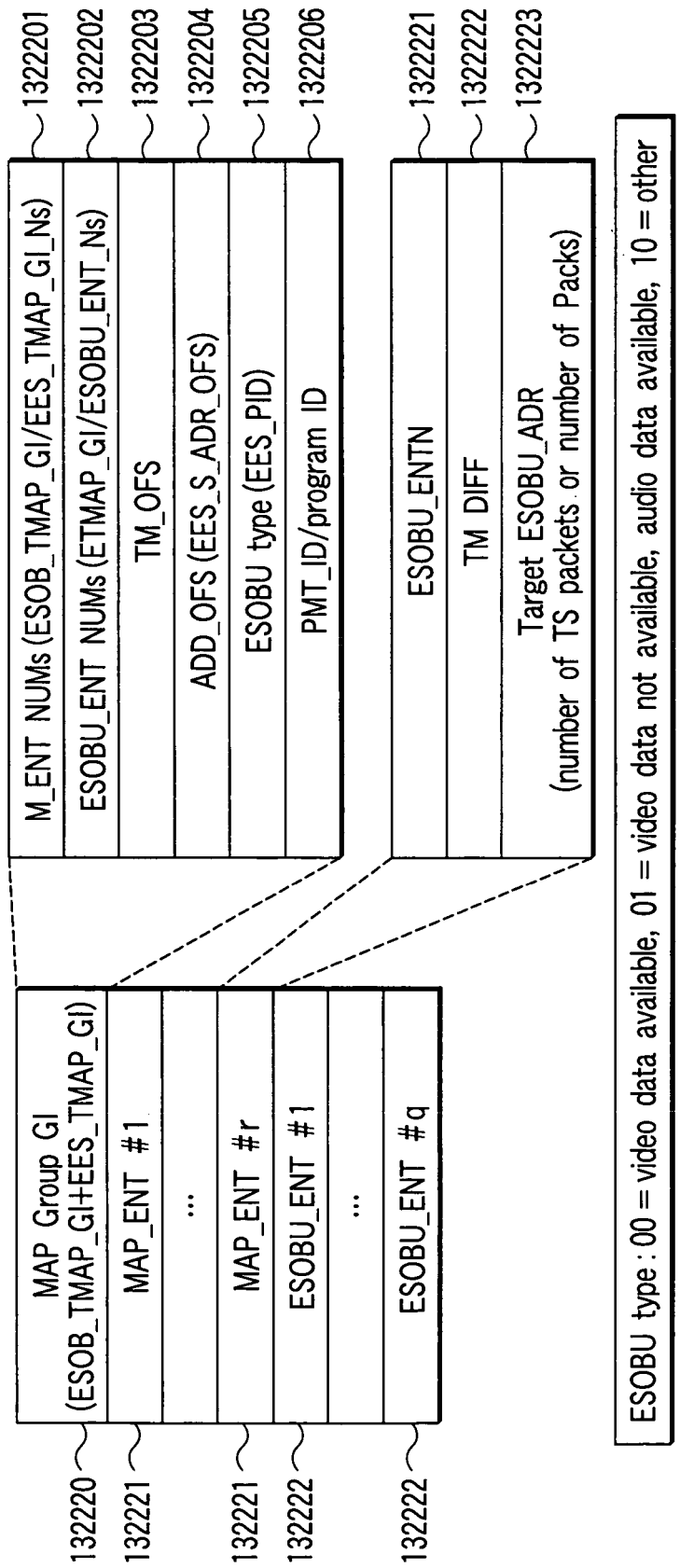
F I G. 7

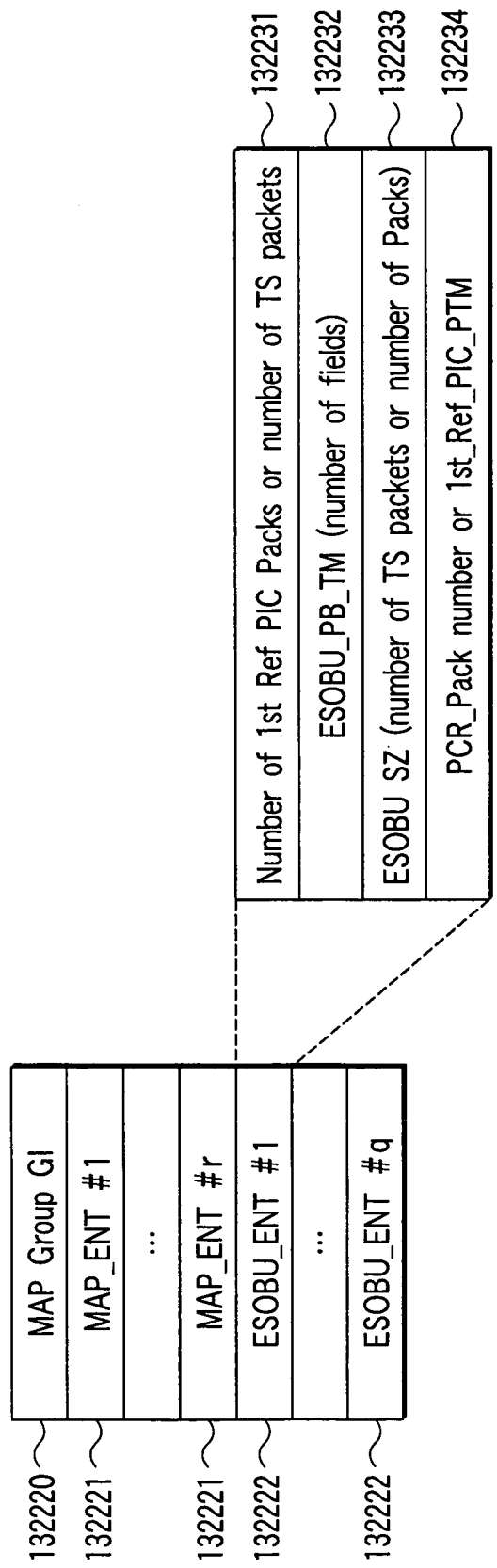
F I G. 8

| ⟨1⟩ When video data is available<br>SOBU: (a) delimited at randomly accessible positions<br>　　　　(b) delimited within maximum of 1s<br>Number of 1st_Ref_PIC_Packs: number of Packs from head of ESOBU to end of Ref_PIC<br>　　When number of 1st Ref_PIC PACKS = 0xffffffff, no Ref_PIC is included in SOBU<br>PCR_Pack number: number of Packs from head of ESOBU closest to 1st_Ref_PIC to Pack with PCR. First 1 bit is ±flag (0 = +, 1 = −). If no PCR is available, PCR Pack number = 0xffff or playback time of 1st_Ref_PIC | ⟨2⟩ When video data is not available, and audio data is available<br>SOBU: delimited at 1s intervals<br>Number of 1st_Ref_PIC_Packs = number of last Packs of audio frame at head of ESOBU<br>PCR_Pack number = number of Packs from head of SOBU closest to audio frame at head of ESOBU to Pack with PCR. First 1 bit is ±flag (0 = +, 1 = −). If no PCR is available, PCR Pack number = 0xffff | ⟨3⟩ When neither video data nor audio data are available, and data broadcast is available<br>SOBU: delimited at 1s intervals<br>Number of 1st_Ref_PIC_Packs = 0xffffffff (fixed)<br>PCR_Pack number = 0xffffffff (fixed) |
|---|---|---|

FIG. 9

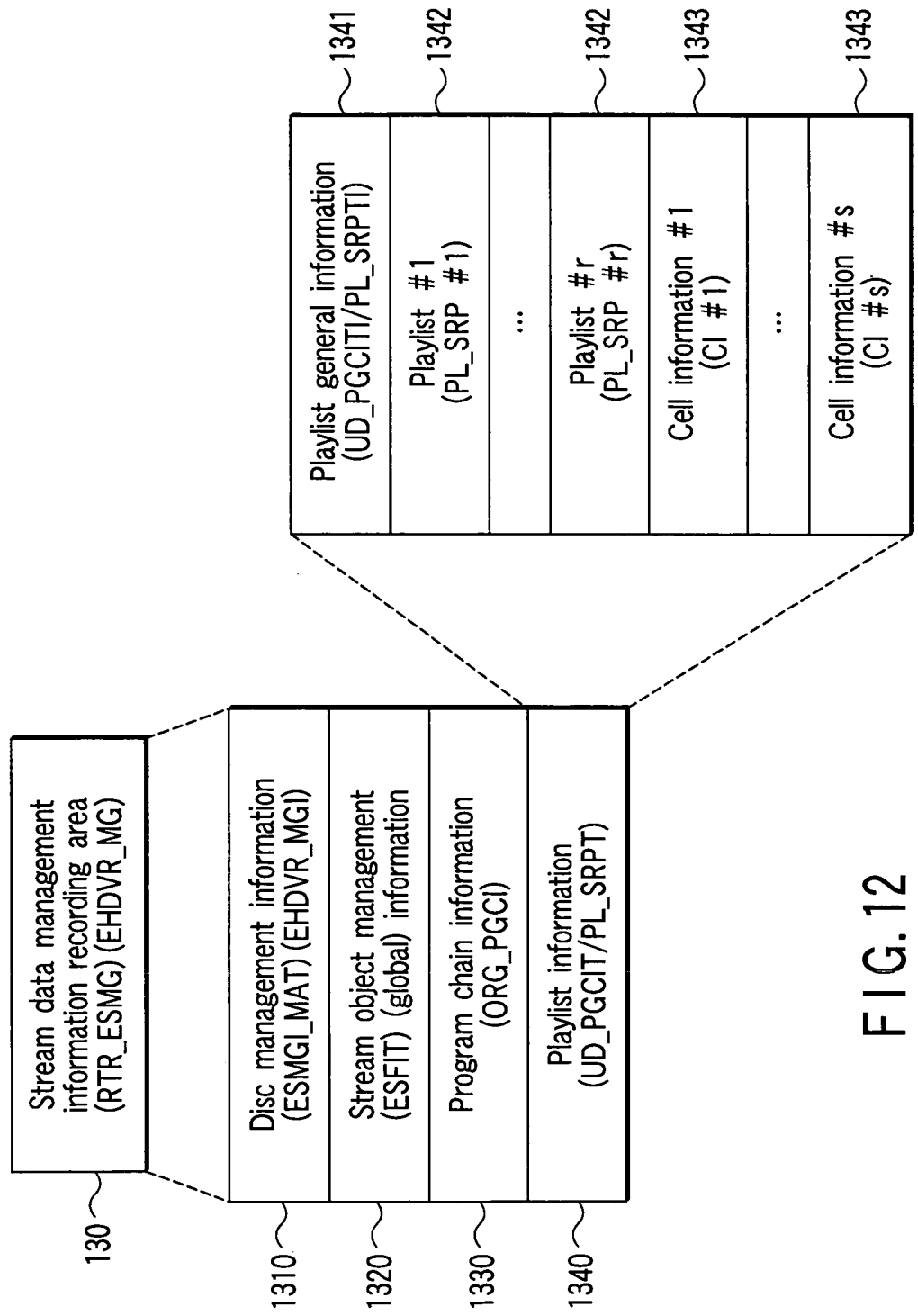
F I G. 12

ESOB_STI (or ESOB_ESI)            1322

| RBP | | Contents | Number of bytes |
|---|---|---|---|
| 0 to 1 | V_ATR | Video attribute | |
| 2 to 2 | AST_Ns | Number of audio streams | |
| 3 to 3 | SP_Ns | Number of SP streams | |
| 4 to 6 | A_ATR0 | Attribute of audio stream #0 | |
| 7 to 9 | A_ATR1 | Attribute of audio stream #1 | |
| 10 to 11 | Reserved | | |
| 12 to 59 | SP_PLT | SP pallet data | |
| | | Total | 54 bytes |

F I G. 22

V_ATR

| Video compression mode | TV mode | Aspect ratio | Reserve |
|---|---|---|---|

| Reserve | Reserve | Video resolution | I/P |
|---|---|---|---|

Aspect ratio···00b = 4 : 3   01b = 16 : 9
Video resolution···000 : 720*480, 001 : 704*480, 010 : 352*480,
    011 : 352*240, 100 : 544*480, 101 : 480*480,
    110 : 1920*1080
I/P···00 : Progressive, 01 : Interlaced

F I G. 23

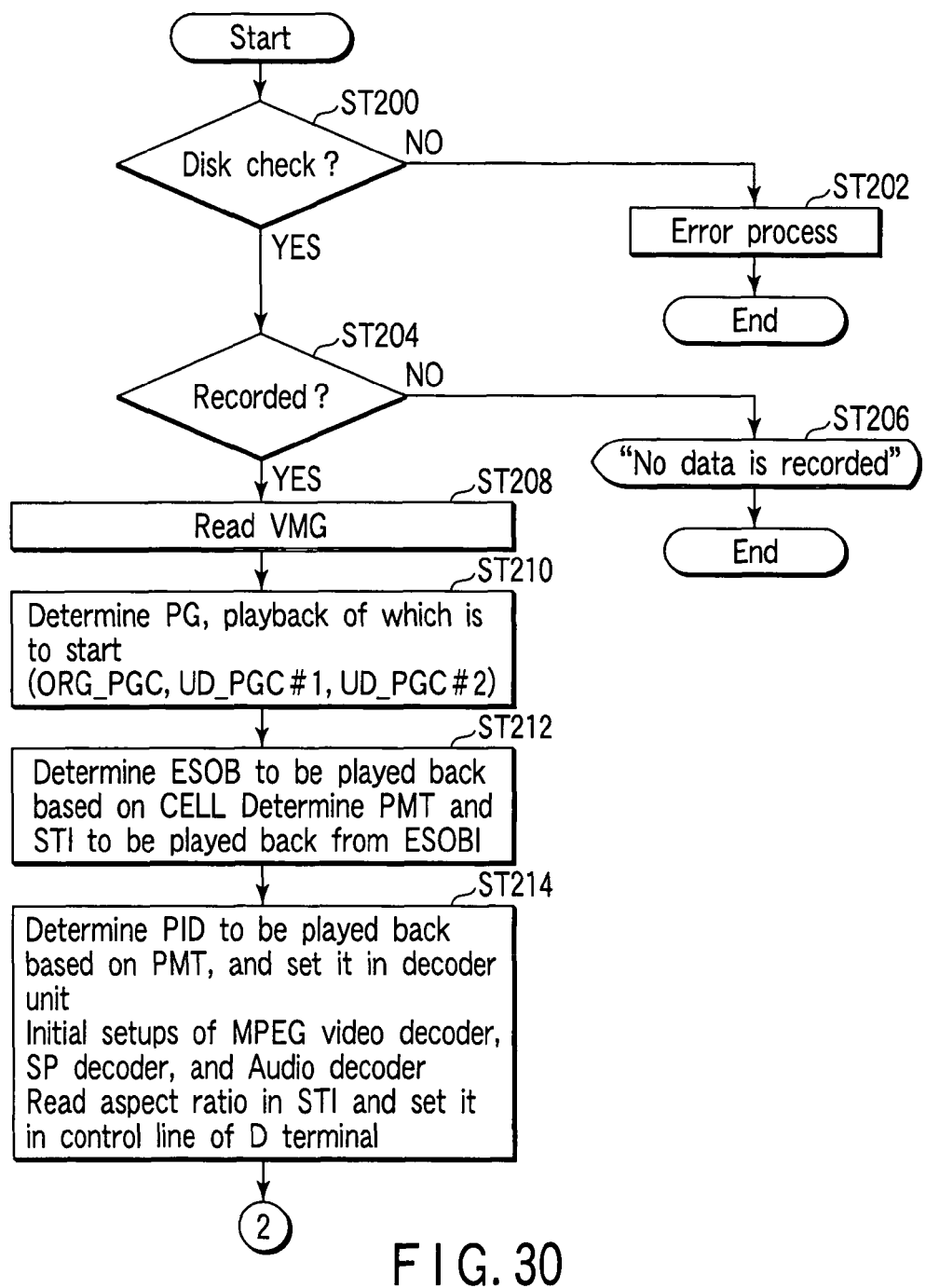
F I G. 30

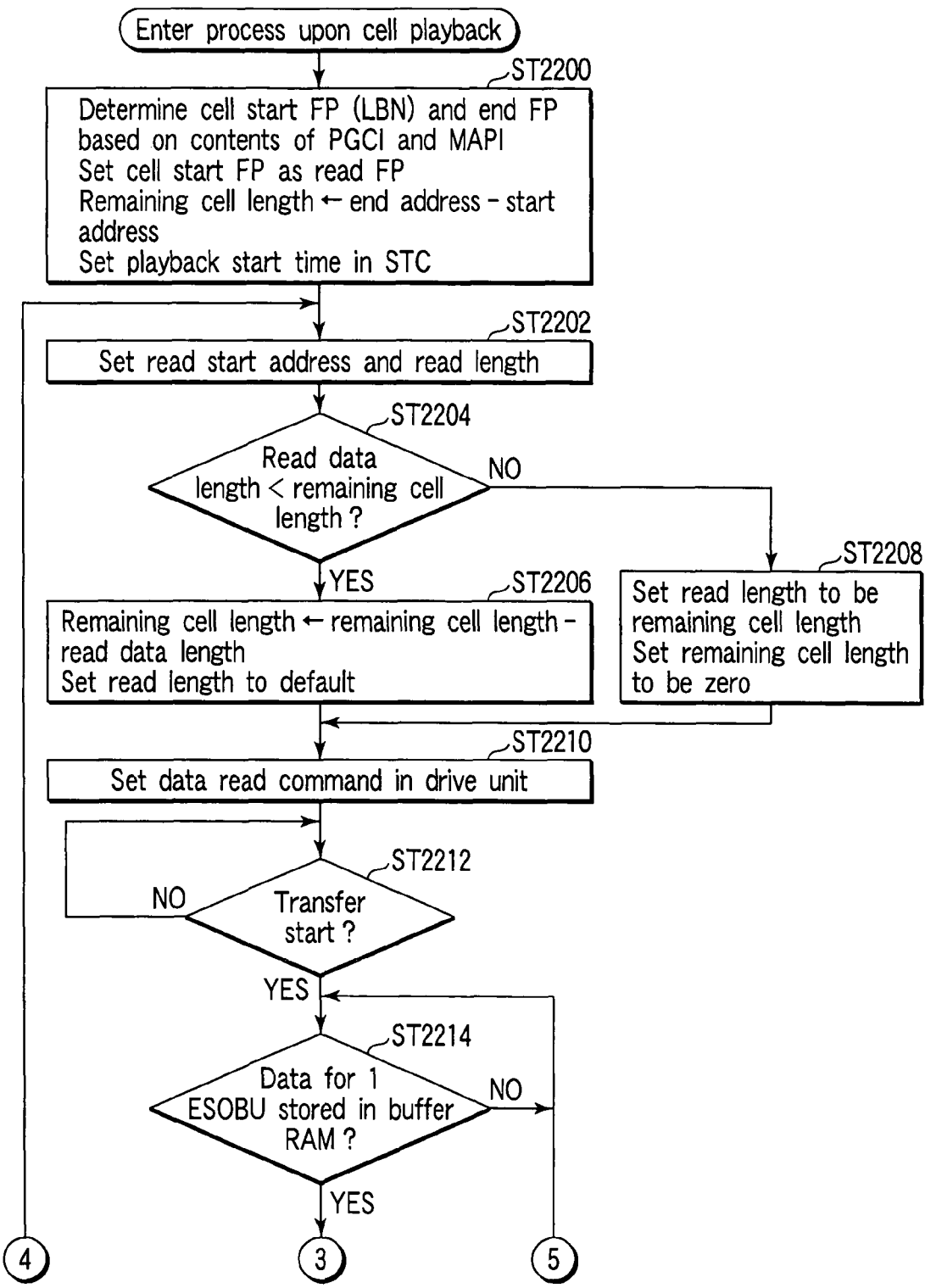
F I G. 32

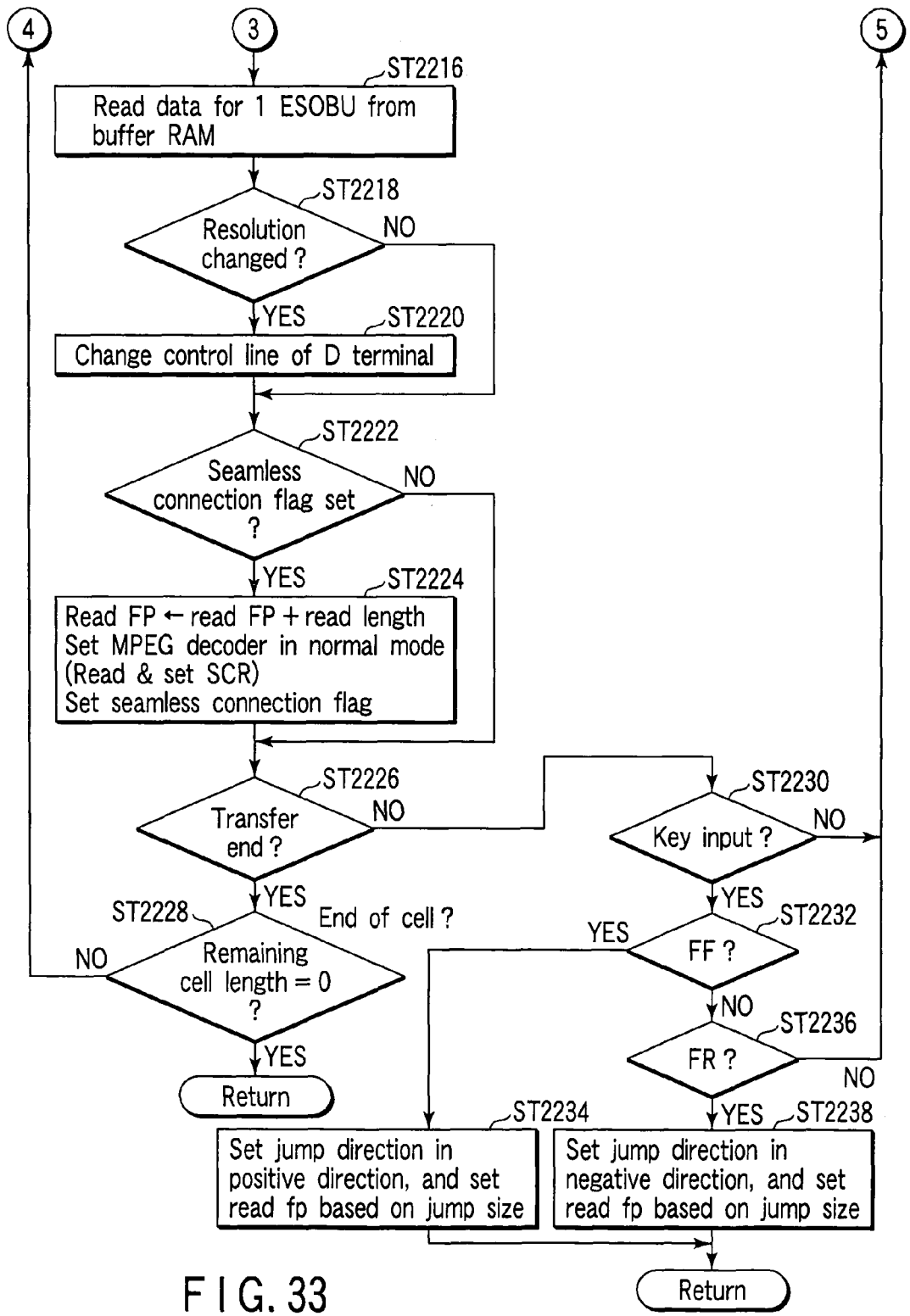
F I G. 33

| Field name | Contents |
|---|---|
| Descriptor tag | 0xC1 |
| Descriptor length | Descriptor length |
| Digital recording control | Copy generation control data |
| Maximum bit rate flag | 0 : not describe maximum transfer rate of service of interest<br>1 : describe maximum transfer rate |
| Component control flag | 0 : specify entire program (in case of PMT)<br>1 : other |
| Copy control type | Copy generation control data |
| APS control data | Analog output control data |
| Maximum bit rate | Maximum transfer rate |
| ... | ... |

F I G. 35

For video data (CP_CTRL_INFO)

| Digital copy control | Analog copy control | Digital recording control | Copy control type (CCI) | APS control data (APS) |
|---|---|---|---|---|
| Unlimited copy permission | Unlimited copy permission | 01 | 00 | Don't care |
| Copy inhibition | Copy inhibition, but no Microvision copy protection is applied (analog copy permitted) | 01 | 11 | 00 |
| | Copy inhibition | 01 | 11 | Other than 00 |
| Copy permission of only one generation | Copy permission of only one generation, but no Microvision copy protection is applied (analog copy permitted) | 01 | 10 | 00 |
| | Copy inhibition after copy of one generation | 01 | 10 | Other than 00 |

F I G. 36

For audio data (CP_CTRL_INFO)

| Digital copy control | Digital recording control | Copy control type (CCI) |
|---|---|---|
| Unlimited copy permission | 01/11 | 00 |
| Copy permission of only one generation | 01/11 | 10 |
| Copy inhibition | 01/11 | 11 |

FIG. 37

| Field name | Contents |
|---|---|
| Descriptor tag | 0x50 |
| Descriptor length | Descriptor length |
| Stream contents | 0x01 : video |
| Component type | Component type |
| Component tag | Common in program |
| ISO_639 language code | Language code "jpn" |
| Text_Char | Video type name |

FIG. 38

| Component type | Contents |
|---|---|
| 0x01 | Video = 480i (525i), aspect ratio = 4 : 3 |
| 0x03 | Video = 480i (525i), aspect ratio = 16 : 9, pan vector = none |
| 0x04 | Video = 480i (525i), aspect ratio > 16 : 9 |
| 0xA1 | Video = 480p (525p), aspect ratio = 4 : 3 |
| 0xA3 | Video = 480p (525p), aspect ratio = 16 : 9, pan vector = none |
| 0xA4 | Video = 480p (525p), aspect ratio > 16 : 9 |
| 0xB1 | Video = 1080i (1125i), aspect ratio = 4 : 3 |
| 0xB3 | Video = 1080i (1125i), aspect ratio = 16 : 9, pan vector = none |
| 0xB4 | Video = 1080i (1125i), aspect ratio > 16 : 9 |

FIG. 39

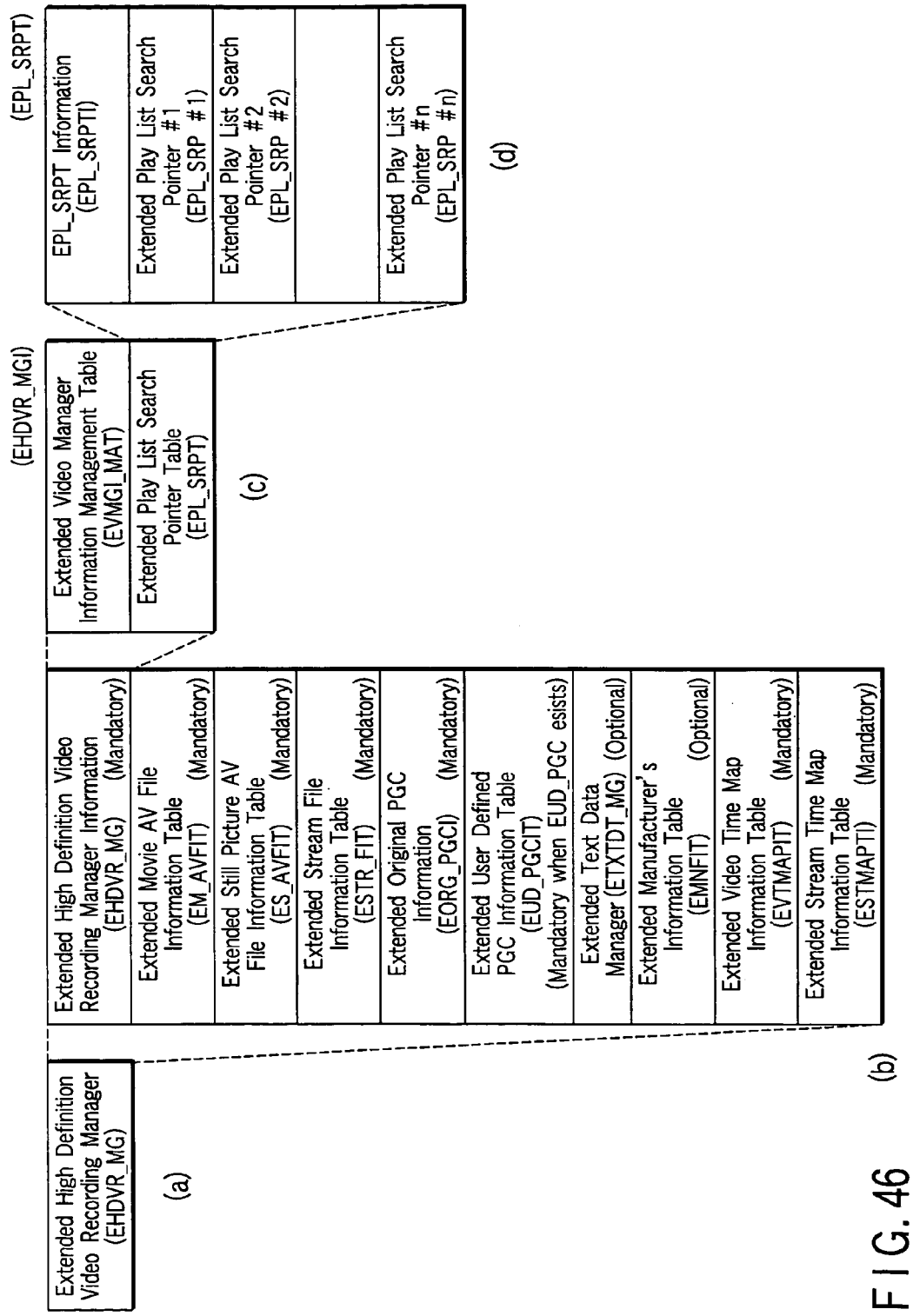
F I G. 46

EVMGI_MAT (Description order)

| RBP | Field Name | Contents | Number of bytes |
|---|---|---|---|
| 0 to 11 | EVMG_ID | EVMG Identifier | 12 bytes |
| 12 to 15 | EHR_MANGR_EA | End address of those Navigation Data which are recorded in EHR_MANGR.IFO | 4 bytes |
| 16 to 27 | reserved | reserved | 12 bytes |
| 28 to 31 | EHDVR_MGI_EA | End address of EHDVR_MGI | 4 bytes |
| 32 to 33 | VERN | Version number of this Book | 2 bytes |
| 34 to 63 | reserved | reserved | 30 bytes |
| 64 to 65 | TM_ZONE | Time Zone | 2 bytes |
| 66 | STILL_TM | Still Time for Still Pictures | 1 bytes |
| 67 | CHRS | Character Set Code for Primary Text | 1 bytes |
| 68 to 82 | RSM_MRKI | Resume Marker Information | 15 bytes |
| 83 to 97 | DISC_REP_PICTI | Disc Representative Picture Information | 15 bytes |
| 98 to 225 | DISC_REP_NM | Disc Representative Name | 128 bytes |
| 226 to 255 | reserved | reserved | 30 bytes |
| 256 to 259 | EM_AVFIT_SA | Start address of EM_AVFIT | 4 bytes |
| 260 to 263 | ES_AVFIT_SA | Start address of ES_AVFIT | 4 bytes |
| 264 to 275 | ETKI | Encrypted Title Key Information | 12 bytes |
| 276 to 277 | CPSI | Copy Protection Scheme Information | 2 bytes |
| 278 to 303 | reserved | reserved | 26 bytes |
| 300 to 303 | ESTR_FIT_SA | Start address of ESTR_FIT | 4 bytes |
| 304 to 307 | EORG_PGCI_SA | Start address of EORG_PGCI | 4 bytes |
| 308 to 311 | EUD_PGCIT_SA | Start address of EUD_PGCIT | 4 bytes |
| 312 to 351 | reserved | reserved | 40 bytes |
| 352 to 355 | ETXTDT_MG_SA | Start address of ETXTDT_MG | 4 bytes |
| 356 to 359 | EMNFIT_SA | Start address of EMNFIT | 4 bytes |
| 360 to 364 | EVTMAP_LAST_MOD_TM | EVTMAP Last Modification Time | 5 bytes |
| 365 to 369 | ESTMAP_LAST_MOD_TM | ESTMAP Last Modification Time | 5 bytes |
| 370 to 511 | reserved | reserved | 142 bytes |
| Total | | | 512 bytes |

FIG. 47

EPL_SRP (Description order)

| RBP | Field Name | Contents | Number of bytes |
|---|---|---|---|
| 0 to 1 | reserved | reserved | 2 bytes |
| 2 | PGCN | PGC number | 1 bytes |
| 3 to 7 | PL_CREATE_TM | Play List Creating Time | 5 bytes |
| 8 to 135 | PRM_TXTI | Primary Text Information | 128 bytes |
| 136 to 137 | IT_TXT_SRPN | IT_TXT Search Pointer number for this Play List | 2 bytes |
| 138 to 145 | REP_PICTI | Representative Picture Information | 8 bytes |
| 146 to 158 | EPL_RSM_MRKI | Extended Play List Resume Marker Information | 13 bytes |
| 159 to 160 | EPL_INDEX | Extended Play List Index | 2 bytes |
| 161 to 165 | EPL_LAST_MOD_TM | Extended Play List Modification Time | 5 bytes |
| Total | | | 166 bytes |

FIG. 48

EPL_RSM_MRKI (Description order)

| RBP | Field Name | Contents | Number of bytes |
|---|---|---|---|
| 146 to 147 | CN | Cell number | 2 bytes |
| 148 to 153 | PICT_PT | Picture Point | 6 bytes |
| 154 to 158 | MRK_TM | Marking Time | 5 bytes |
| Total | | | 13 bytes |

FIG. 49

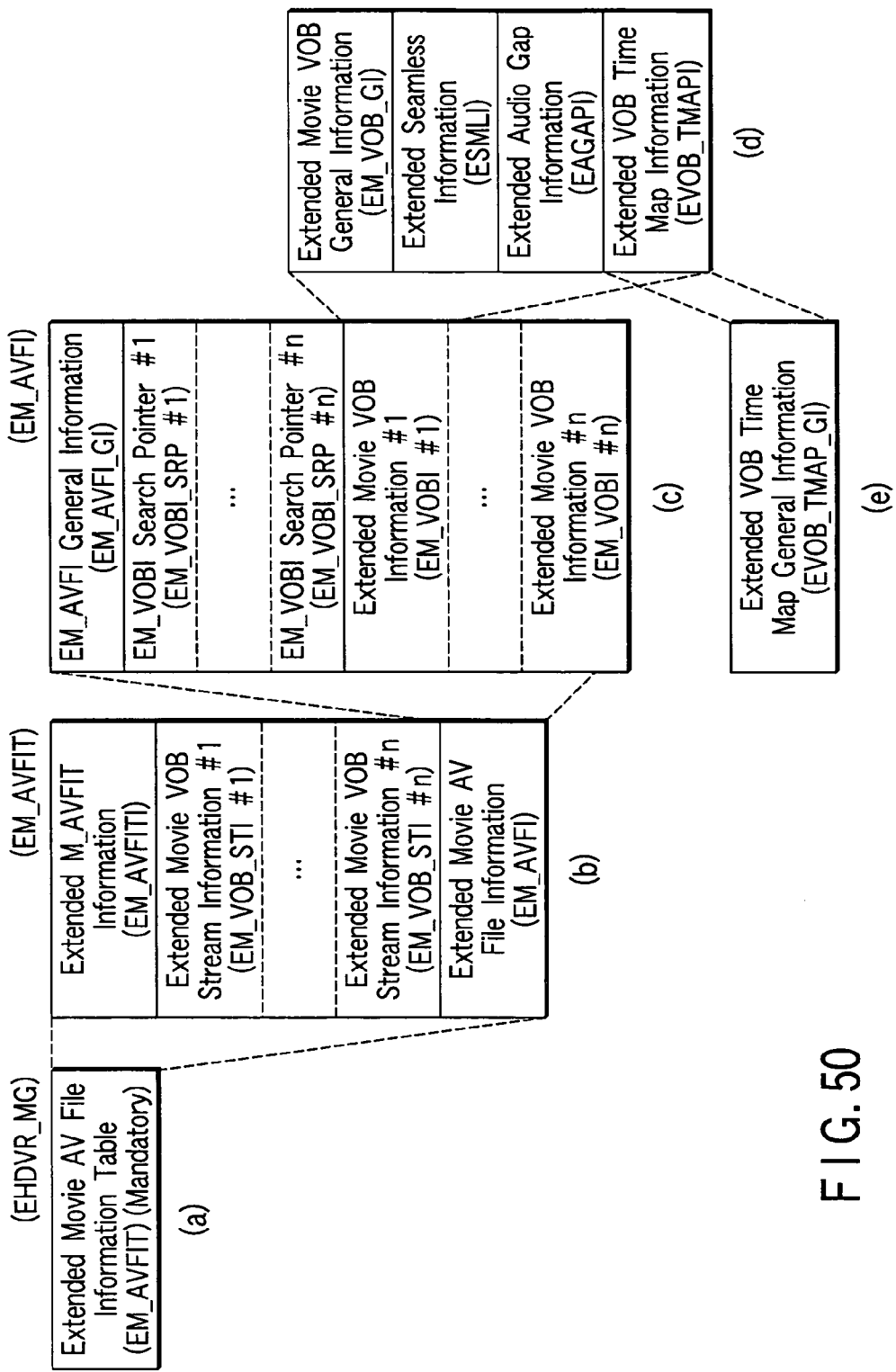
F I G. 50

EM_VOB_GI (Description order)

| RBP | Field Name | Contents | Number of bytes |
|---|---|---|---|
| 0 to 1 | VOB_TY | VOB Type | 2 bytes |
| 2 to 6 | VOB_REC_TM | Recording time of this VOB | 5 bytes |
| 7 | VOB_REC_TM_SUB | Sub-second information for VOB_REC_TM | 1 bytes |
| 8 | M_VOB_STIN | M_VOB_STI number | 1 bytes |
| 9 to 14 | VOB_V_S_PTM | Video Start PTM of this VOB | 6 bytes |
| 15 to 20 | VOB_V_E_PTM | Video End PTM of this VOB | 6 bytes |
| 21 to 22 | LOCAL_TM_ZONE | Time Zone of Recording this VOB | 2 bytes |
| Total | | | 23 bytes |

F I G. 51

EVOB_TMAP_GI (Description order)

| RBP | Field Name | Contents | Number of bytes |
|---|---|---|---|
| 0 to 1 | reserved | reserved | 2 bytes |
| 2 to 3 | VOBU_ENT_Ns | Number of VOBU Entries | 2 bytes |
| 4 to 5 | reserved | reserved | 2 bytes |
| 6 to 9 | ADR_OFS | Address Offset | 4 bytes |
| 10 | VOBU_PB_TM_RNG | Playback TIme Range of VOBU | 1 bytes |
| Total | | | 11 bytes |

(BRP 2 to 3) VOBU_ENT_Ns
Describes the number of VOBU Entries in the Video Time Map Information of this VOB, which are included in EHR_VTMAP.IFO file (BRP 6 to 9) ADR_OFS
Describes the start address of this VOB with F_RLBN from the first LB of the EHR_MOVIE.VRO file (BRP 10) VOBU_PB_TM_RNG
Describes the playback time range of VOBU
    00h : 0.4 to 1.0 sec
    others : reserved

F I G. 52

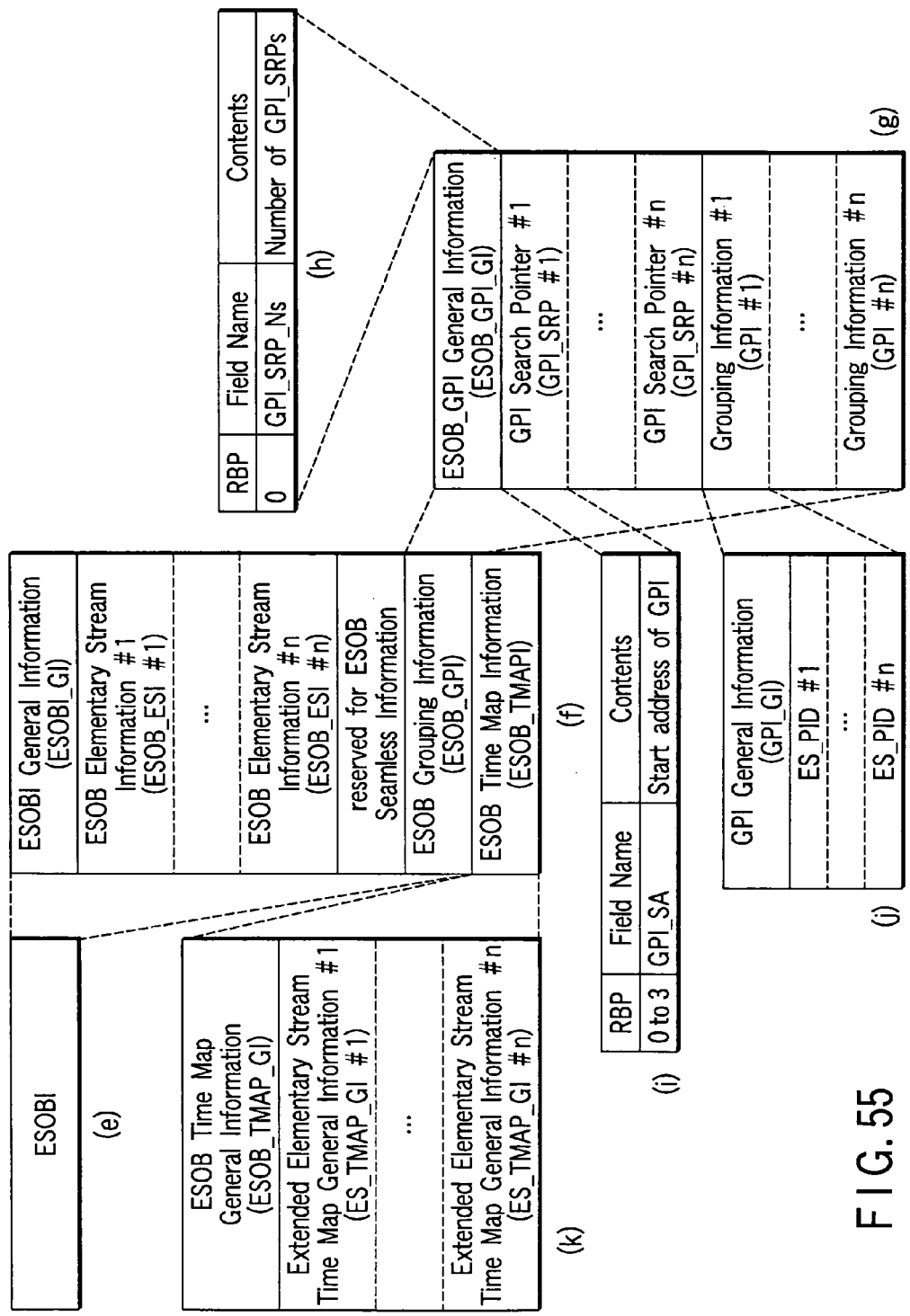
F I G. 55

ESOBI_GI  (Description order)

| RBP | Field Name | Contents | Number of bytes |
|---|---|---|---|
| 0 to 1 | ESOB_TY | ESOB Type | 2 bytes |
| 2 | AP_FORMAT2 | Application Format Name (Minor) | 1 byte |
| 3 | ESOB_PROFILE | Profile of this ESOB | 1 byte |
| 4 to 5 | PMT_PID | PID of PMT packet | 2 bytes |
| 6 to 7 | PCR_PID | PID of PCR packet | 2 bytes |
| 8 to 9 | NETWORK_ID | original_network_id | 2 bytes |
| 10 to 11 | TS_ID | transport_stream_id | 2 bytes |
| 12 to 13 | PROGRAM_NUMBER | program number (service_id) | 2 bytes |
| 14 to 17 | FORMAT_ID | ID of Registration Descriptor | 4 bytes |
| 18 | SERVICE_TYPE | service_type | 1 byte |
| 19 to 20 | CP_CTRL_INFO | Copy Control Information | 2 bytes |
| 21 to 30 | reserved | reserved | 10 bytes |
| 31 to 35 | ESOB_REC_TM | Recording time of this ESOB | 5 bytes |
| 36 | ESOB_REC_TM_SUB | Sub-second information for ESOB_REC_TM | 1 byte |
| 37 to 38 | LOCAL_TM_ZONE | Local Time Zone | 2 bytes |
| 39 to 40 | ESOB_DEF_PID | Default PID of this ESOB | 2 bytes |
| 41 to 46 | ESOB_S_PTM | Start PTM of this ESOB | 6 bytes |
| 47 to 52 | ESOB_E_PTM | End PTM of this ESOB | 6 bytes |
| 53 to 55 | ESOB_DURATION | Duration of this ESOB | 3 bytes |
|  | (PCR_POS_COUNT) | Number of the preceding PCR packets indicated by PCR_POS | 1 byte |
|  | (PCR_POS_SHIFT) | Bit shift of PCR_POS for the designated PCR packet | 1 byte |
| 56 | ESOB_ES_Ns | Number of Elementary Streams in this ESOB | 1 byte |
| 57 | ESOB_V_ES_Ns | Number of Video Elementary Streams in this ESOB | 1 byte |
| 58 | ESOB_A_ES_Ns | Number of Audio Elementary Streams in this ESOB | 1 byte |
| Total |  |  | 59 bytes |

FIG. 56

<ESOB_TY>

| b15 | b14 | b13 | b12 | b11 | b10 | b9 | b8 |
|---|---|---|---|---|---|---|---|
| reserved | | TE flag | GPI flag | reserved | | | |
| b7 | b6 | b5 | b4 | b3 | b2 | b1 | b0 |
| SML flag | | | | | | | |

FIG. 57

<CP_CTRL_INFO>

| b15 | b14 | b13 | b12 | b11 | b10 | b9 | b8 |
|---|---|---|---|---|---|---|---|
| CCI | | APS | | EPN | ICT | reserved | |
| b7 | b6 | b5 | b4 | b3 | b2 | b1 | b0 |
| Retention | Retention_State | | | reserved | | | |

CCI     ··· 00b : Copy-free
               01b : No-more-copies
               10b : Copy-one-generation
               11b : Copy-Never APS     ··· 00b : Copy-free
               01b : APS is on : Type 1 (AGC)
               10b : APS is on : Type 2 (AGC+2L Colorstripe)
               11b : APS is on : Type 3 (AGC+4L Colorstripe)

EPN     ··· 0b : EPN-asserted
               1b : EPN-unasserted

ICT
(Image Constraint Token)     ··· 0b : High Definition Analog Output in the form of Constrained Image
               1b : High Definition Analog Output in High Definition Analog Form Retention     ··· 0b and CCI = '10b' : Move-mode
               0b and CCI = '11b' : Retention-mode
               0b and CCI = '00b' or '01b' : Non-Move-mode/Non-Retention-mode
               1b : Non-Move-mode/Non-Retention-mode Retention_State     ··· 000b : Retention Time Forever
               001b : Retention Time 1 week
               010b : Retention Time 2 days
               011b : Retention Time 1 day
               100b : Retention Time 12 hours
               101b : Retention Time 6 hours
               110b : Retention Time 3 hours
               111b : Retention Time 90 minutes

FIG. 58

ESOB Elementary Stream Information
(ESOB_ESI) for Video ES  (Description order)

| RBP | Field Name | Contents | Number of bytes |
|---|---|---|---|
| 0 | ES_TY | Type of Elementary Stream | 1 byte |
| 1 to 2 | ES_PID | Elementary Stream PID | 2 bytes |
| 3 | STREAM_TYPE | Stream Type in PMT | 1 byte |
| 4 | COMPONENT_TAG | component_tag in stream_identifier_descriptor | 1 byte |
| 5 | STREAM_CONTENT | stream_content in component_descriptor | 1 byte |
| 6 | COMPONENT_TYPE | component_type in component_descriptor | 1 byte |
| 7 to 9 | V_ATR | Attributes of Video | 3 bytes |
| 10 to 11 | CP_CTRL_INFO | Copy Control Information | 2 bytes |
| Total | | | 12 bytes |

FIG. 59

ESOB Elementary Stream Information
(ESOB_ESI) for Audio ES  (Description order)

| RBP | Field Name | Contents | Number of bytes |
|---|---|---|---|
| 0 | ES_TY | Type of Elementary Stream | 1 byte |
| 1 to 2 | ES_PID | Elementary Stream PID | 2 bytes |
| 3 | STREAM_TYPE | stream_Type in PMT | 1 byte |
| 4 | COMPONENT_TAG | component_tag in stream_identifier_descriptor | 1 byte |
| 5 | STREAM_CONTENT | stream_content in component_descriptor/ audio_component_descriptor | 1 byte |
| 6 | COMPONENT_TYPE | component_type in component_descriptor/ audio_component_descriptor | 1 byte |
| 7 | SIMULCAST_GP_TAG | simulcast_group_tag in audio_component_descriptor | 1 byte |
| 8 | A_ATR | Attributes of Audio Elementary Stream | 1 byte |
| 9 to 11 | LANG_CODE | Audio Language Code | 3 bytes |
| 12 to 14 | LANG_CODE2 | Audio Language Code2 | 3 bytes |
| 15 to 16 | CP_CTRL_INFO | Copy Control Information | 2 bytes |
| Total | | | 17 bytes |

FIG. 60

ESOB Elementary Stream Information
(ESOB_ESI) for Other ES                                    (Description order)

| RBP | Field Name | Contents | Number of bytes |
|---|---|---|---|
| 0 | ES_TY | Type of Elementary Stream | 1 byte |
| 1 to 2 | ES_PID | Elementary Stream PID | 2 bytes |
| 3 | STREAM_TYPE | Stream Type in PMT | 1 byte |
| 4 | COMPONENT_TAG | component_tag in stream_identifier_descriptor | 1 byte |
| 5 to 6 | DAT_COMP_ID | stream_content in component_descriptor | 2 bytes |
| 7 to N+6 | AD_DAT_COMP_IFO | component_type in component_descriptor | N bytes |
| N18 to N18 | CP_CTRL_INFO | Copy Control Information | 2 bytes |
| Total | | | N+9 bytes |

F I G. 61

(ES_TY)

| b7 | b6 | b5 | b4 | b3 | b2 | b1 | b0 |
|---|---|---|---|---|---|---|---|
| ST_TY | | reserved | | | | | |

ST_TY ··· 10b : Other Elementary Stream
        01b : Audio Elementary Stream
        00b : Video Elementary Stream

F I G. 62

<V_ATR>

| b23 | b22 | b21 | b20 | b19 | b18 | b17 | b16 |
|---|---|---|---|---|---|---|---|
| Application Flag | | Aspect Ratio | | | | reserved | |

| b15 | b14 | b13 | b12 | b11 | b10 | b9 | b8 |
|---|---|---|---|---|---|---|---|
| Horizontal Resolution | | | | reserved | | Frame Rate | |

| b7 | b6 | b5 | b4 | b3 | b2 | b1 | b0 |
|---|---|---|---|---|---|---|---|
| Vertical Resolution | | | | reserved | | | |

Application Flag ⋯ 00b : This video stream is coded with Aspect ratio specified in this V_ATR
01b : This video stream may be coded with Aspect ratio specified in this V_ATR.
The actual Aspect ratio is recorded in the stream
Others : reserved

FIG. 63

<A_ATR>

| b7 | b6 | b5 | b4 | b3 | b2 | b1 | b0 |
|---|---|---|---|---|---|---|---|
| multi_ling | main_comp | quality_indicator | | sampling_rate | | | reserved | multiling ⋯ 0b : No multi-lingual audio stream
1b : Bi-lingual audio stream in case of the stream is dual-mono main_comp ⋯ 0b : This audio stream is not main audio
1b : This audio stream is main audio quality_indicator ⋯ 00b : reserved
01b : Mode 1
10b : Mode 2
11b : Mode 3
Note : ("Mode 1/2/3" are defined according to digital broadcasting standard such as ARIB STD-B32 Part2, Chapter 2)

sampling_rate ⋯ 001b : 16 kHz
010b : 22.05 kHz
011b : 24 kHz
101b : 32 kHz
110b : 44.1 kHz
111b : 48 kHz

FIG. 64

GPI_GI (Description order)

| RBP | Field Name | Contents | Number of bytes |
|---|---|---|---|
| 0 | BLOCK_TY | Type of Block of Groups | 1 byte |
| 1 | GP_TY | Type of an ES Group | 1 byte |
| 2 | BLOCK_NUMBER | Number of Block | 1 byte |
| 3 | ES_PID_Ns | Number of ES_PID | 1 byte |
| Total | | | 3 bytes |

(RBP 0) BLOCK_TY
Described the type of the block information

BLOCK_TY ··· 00h : No definition
01h : Multi-view
02h : Rain Attenuation
11h : Multi-channel
others : reserved (RBP 1) GP_TY
Described the type of the grouping information GP_TY ··· 00h : No definition
01h : Main Group
02h : Sub Group
others : reserved (RBP 2) BLOCK_NUMBER
Describes the block number. If some groups have same
BLOCK_NUMBER, those groups share same attribute
Range : 1 ≤ BLOCK_NUMBER ≤ 32

(RBP 3) ES_PID_Ns
Described the number of ES_PIDs
Range : 1 ≤ ES_PID_Ns ≤ 32

FIG. 65

ES_PID (Description order)

| RBP | Field Name | Contents | Number of bytes |
|---|---|---|---|
| 0 to 1 | ES_PID | PID of Elementary Stream | 2 bytes |
| Total | | | 2 bytes |

(RBP 0 to 1) ES_PID
Describes the PID of the Elementary Stream which belong to
this group, which id described by RTR's PID Describing Format

FIG. 66

ESOB_TMAP_GI (Description order)

| RBP | Field Name | Contents | Number of bytes |
|---|---|---|---|
| 0 to 3 | ESOB_ADR_OFS | Address Offset of ESOB | 4 bytes |
| 4 to 7 | ESOB_SZ | Size of ESOB | 4 bytes |
| 8 | ESOB_S_PKT_POS | ESOB start packet position | 1 byte |
| 9 | ESOB_E_PKT_POS | ESOB end packet position | 1 byte |
| 10 | ESOBU_PB_TM_RNG | Playback Time Range of ESOBU | 1 byte |
| 11 | EES_TMAP_GI_Ns | Number of EES_TMAP_GIs | 1 byte |
| Total | | | 12 bytes |

(BRP 0 to 3) ESOB_ADR_OFS
Describes the start address of this ESOB with F_RLBN from the first LB of the EHR_STRxx.VRO file (BRP 4 to 7) ESOB_SZ
Described the size of this ESOB with the number of Packet Groups (BRP 8) ESOB_S_PKT_POS
Describes the start packet position of this ESOB, with PKTG_RPKTN in the first Packet Group of this ESOB
    1<=ESOB_S_PKT_POS<=PKT_Ns (BRP 9) ESOB_E_PKT_POS
Describes the end packet position of this ESOB, with PKTG_RPKTN in the last Packet Group of this ESOB
    1<=ESOB_E_PKT_POS<=PKT_Ns (BRP 10) ESOB_PB_TM_RNG
Describes the playback time range of ESOBU
    00h : 0.4 to 1.0 sec
    others : reserved The playback time of ESOBU may be less than the value specified by this field, if the ESOBU is the last ESOBU of this ESOB, or 1ST_REF_SZ of this ESOBU is filled with '0'

(BRP 11) EES_TMAP_GI_Ns
Describes the number of EES_TMAP_GIs for this ESOB. This value shall be the same as ETMAPI_Ns described in EHR_STMAP.IFO file

FIG. 67

EES_TMAP_GI (Description order)

| RBP | Field Name | Contents | Number of bytes |
|---|---|---|---|
| 0 to 1 | ES_PID | Elementary stream PID | 2 bytes |
| 2 to 7 | ES_S_PTM | Start PTM of this elementary stream | 6 bytes |
| 8 to 13 | ES_E_PTM | End PTM of this elementary stream | 6 bytes |
| 14 to 17 | ES_S_ADR_OFS | Start address offset for this elementary stream | 4 bytes |
| 18 | ES_LAST_ESOBU_E_PKT_POS | Last ESOBU end packet position | 1 byte |
| 19 to 20 | reserved | reserved | 2 bytes |
| 21 to 22 | ES_ESOBU_ENT_Ns | Number of ESOBU Entries for this elementary stream | 2 bytes |
| Total | | | 23 bytes |

(BRP 0 to 1) ES_PID
Describes PID of Video Elementary stream for which this Time Map is generated (BRP 2 to 7) ES_S_PTM
Describes the presentation start time of the first video field, which is coded as PTS, of this elementary stream in RTR's PTM Describing Format. When the PTS is not presented in the elementary stream, the presentation start time shall be calculated in the manner of MPEG specification Note : For the Video elementary stream whose PID is defined as ESOB_DEF_PID, the ES_S_PTM is the same as ESOB_S_PTM in ESOBI_GI (BRP 8 to 13) ES_E_PTM
Describes the presentation terminating time of the last video field of this elementary stream in RTR's PTM describing Format. This time is described with the same time basis as time stamps coded in the elementary stream Note : For the Video elementary stream whose PID is defined as ESOB_DEF_PID, the ES_E_PTM is the same as ESOB_E_PTM in ESOBI_GI (BRP 14 to 17) ES_S_ADR_OFS
Describes the start address of this elementary stream with the number of Packet Groups from the first Packet Group of ESOB
The following equation shall be fulfilled $$ES\_S\_ADR\_OFS + (\text{Total Sum of ESOBU\_SZ from ESOBU \#1 to ESOBU \#ES\_ESOBU\_ENT\_Ns}) + K \leq ESOBU\_SZ$$
where K=0 if ES_LAST_ESOBU_E_PKT_POS=PKT_Ns
K=1 if ES_LAST_ESOBU_E_PKT_POS≠PKT_Ns (BRP 18) ES_LAST_ESOBU_E_PKT_POS
Describes the end packet position of the last ESOBU, with PKTG_RPKTN in the last Packet Group of the last ESOBU of this ESOB
1<=ES_LAST_ESOBU_E_PKT<=PKT_Ns (BRP 21 to 22) ES_ESOBU_ENT_Ns
Describes the number of ESOBU Entries in the Stream Time Map Information of this elementary stream, which area included in EHR_STPAM.IFO file

FIG. 68

EPGC_GI (Description order)

| RBP | Field Name | Contents | Number of bytes |
|---|---|---|---|
| 0 | reserved | reserved | 1 byte |
| 1 | PG_Ns | Number of PGs | 1 byte |
| 2 to 3 | CI_SRP_Ns | Number of CI_SRPs | 2 bytes |
| Total | | | 4 bytes |

F I G. 70

EPGI (Description order)

| RBP | Field Name | Contents | Number of bytes |
|---|---|---|---|
| 0 | reserved | reserved | 1 byte |
| 1 | PG_TY | Program Type | 1 byte |
| 2 to 3 | C_Ns | Number of Cells in this PG | 2 bytes |
| 4 to 131 | PRM_TXTI | Primary Text Information | 128 bytes |
| 132 to 133 | IT_TXT_SRPN | IT_TXT Search Pointer number | 2 bytes |
| 134 to 141 | REP_PICTI | Representative Picture Information | 8 bytes |
| 142 to 154 | PG_RSM_MRKI | Program Resume Marker Information | 13 bytes |
| 155 to 156 | PG_INDEX | Program Index | 2 bytes |
| 157 to 161 | PG_LAST_MOD_TM | Program Last Modification Time | 5 bytes |
| Total | | | 162 bytes |

F I G. 71

PG_RSM_MRKI (Description order)

| RBP | Field Name | Contents | Number of bytes |
|---|---|---|---|
| 142 to 143 | CN | Cell number | 2 bytes |
| 144 to 149 | PICT_FT | Picture Point (ES_VOB_ENTN) | 6 bytes |
| 150 to 154 | MRK_TM | Marking Time | 5 bytes |
| Total | | | 13 bytes |

F I G. 72

INFORMATION RECORDING MEDIUM, INFORMATION RECORDING/PLAYBACK METHOD, AND INFORMATION RECORDING/PLAYBACK APPARATUS

CROSS-REFERENCE TO RELATED APPLICATIONS

This application is based upon and claims the benefit of priority from prior Japanese Patent Application No. 2003-083631, filed Mar. 25, 2003, the entire contents of which are incorporated herein by reference.

BACKGROUND OF THE INVENTION

1. Field of the Invention

The present invention relates to an information recording medium/information storage medium (or data structure), an information recording/playback method, and an information recording/playback apparatus, which are suited to record/play back a digital stream signal (MPEG-TS) used in satellite digital TV broadcast or terrestrial digital TV broadcast.

2. Description of the Related Art

In recent years, TV broadcast has entered the era of digital broadcasts having Hi-Vision programs as principal broadcast contents. The current digital broadcast adopts an MPEG transport stream (to be abbreviated as MPEG-TS as needed hereinafter). In the field of digital broadcast using moving pictures, MPEG-TS will be used as a standard format in the future.

At the start of such digital TV broadcast, market needs for a streamer that can directly record digital TV broadcast contents (without digital/analog conversion) are increasing. As a currently, commercially available, typical streamer that directly records digital broadcast data (MPEG-TS or the like), a video cassette recorder (D-VHS streamer) named D-VHS® is known.

Upon stream-recording digital broadcast data, MPEG-TS data of digital broadcast received by a tuner system (normally, a set-top box called an STB) is input to a D-VHS streamer via an IEEE1394 cable. The streamer executes required encoding processes, and records the encoded data on a D-VHS tape. Note that IEEE1394 is the interface standard, which specifies exchange of commands and transmission/reception of data.

Upon playing back broadcast data, the D-VHS streamer reads recorded data (MPEG-TS data or the like) from the recorded D-VHS tape, and sends the read MPEG-TS data to a data expansion unit in the STB via the IEEE1394 cable. In this way, the recorded data is played back.

Since the D-VHS streamer directly records the broadcasted bitstream on a tape, a plurality of programs are multiplexed and recorded on the tape. For this reason, upon playback of the multiplexed recorded programs, the D-VHS streamer sends all data to the STB regardless of whether they are to be played back from the beginning or middle of a program. In this case, the user selects and plays back a desired one of a plurality of multiplexed recorded programs.

Since a tape is used as a recording medium, the D-VHS streamer can make sequential playback but cannot make a random access to the recorded contents. For this reason, it is difficult to quickly jump to a desired position in the desired recorded program and to start playback from that position (difficulty of special playback).

In addition to D-VHS, in recent years, STBs that use hard disc drives (HDD) are put on the marker as a digital broadcast streamer. This STB saves stream data in an HDD and realizes excellent random access performance. However, in this apparatus, the user cannot easily exchange the HDD. For this reason, such apparatus is not suited to preserve a large volume of recorded data as a library over a long term.

As a prevailing solution to the problems (difficulty of random access/difficulty of special playback) of D-VHS, and that (difficulty of media exchange) of the HDD, a currently, commercially available streamer that uses large-capacity disc media such as a DVD-RAM and the like may be used.

As an example of the "streamer using the DVD-RAM", "Digital Video Recording System" disclosed in Jpn. Pat. Appln. KOKAI Publication No. 2000-268537 (patent reference 1) is known.

"Digital Video Recording System" disclosed in patent reference 1 is premised on a specific streamer standard. As an example of this streamer standard, the DVD stream recording standard (Version 1.0) developed February of 2001 (although it is not open to the public) is known (but, no product using this standard is yet commercially available).

This streamer standard aims at scrambled contents and also broadcast contents of various worldwide broadcast stations. For this reason, a minimum playback unit in video contents is defined by a data amount with reference to ECC blocks. For this reason, upon making special playback, even when data is read out from a target address, I-picture data that can be played back is not found, and the playback start position may shift considerably. That is, it is very difficult for this standard to attain special playback.

The streamer standard has contents unsuitable for special playback. However, in patent reference 1 above, special playback is facilitated by matching the head of a data unit (VOBU/SOBU) with that of I-picture data (paragraph 0117) or recording the head position of each I-picture data in a management area (paragraph 0118).

The streamer standard packetizes and records irrespective of contents to be recorded. For this reason, upon playback, the arrival time of packets that store the recorded contents can be detected, but the playback time of the recorded contents cannot be directly detected. Hence, it is not easy for the user to designate the playback start position on a time basis, and playback operations such as time search and the like are inconvenient.

As a disc recorder standard free from the above inconvenience (of time search and the like), the DVD video recording (DVD-VR) standard is known, and many products based on this DVD video recording standard are currently commercially available. This video recording standard adopts time map information. With this time map information (which is not available in the streamer standard), it is easy for the user to designate the playback start position on a time basis.

However, the video recording standard is not compatible to stream recording of digital TV broadcast (in order to record digital broadcast contents using a recorder based on the video recording standard, an analog video signal that has temporarily undergone D/A conversion is sent from the STB to the analog video input of the recorder and is MPEG-encoded in the recorder again, and the encoded data is digitally recorded on a DVD-RAM disc or the like). Therefore, the existing video recording standard cannot meet needs of users who want to air-check digital TV broadcast contents (especially, Hi-Vision programs) while maintaining their quality.

BRIEF SUMMARY OF THE INVENTION

An information medium to which the system of an embodiment of the present invention can be applied is configured to separately record data of a digital stream signal as a plurality of objects (ESOB). Each object (ESOB) may include data units (ESOBU), each of which may be formed with reference to an integer number of groups of picture (GOP) or based on data for integer seconds as a playback time. One data unit (ESOBU) may be made up of pack/packet groups each of which may be formed by grouping a plurality of transport stream packets (TS packets). The pack/packet group may be formed of a pack/packet group header and pack/packet group data containing TS packets having data of the digital stream signal.

BRIEF DESCRIPTION OF THE SEVERAL VIEWS OF THE DRAWING

FIG. 1 is a view for explaining the data structure according to an embodiment of the present invention;

FIG. 2 is a view for explaining the relationship among a playback management information layer, object management information layer, and object layer in the data structure according to the embodiment of the present invention;

FIG. 7 is a view for explaining an example of the configuration of some fields (MAP_Group_GI and MAP_ENT#1 to MAP_ENT#r) of map group information (one of MAP_GroupI#1 to MAP_GroupI#n) contained in the object information (ESOB#1) shown in FIG. 6;

FIG. 8 is a view for explaining an example of the configuration of another field (ESOBU_ENT#1 to ESOBU_ENT#q) of the map group information (one of MAP_Group#1 to MAP_Group#n) contained in the object information (ESOB#1) shown in FIG. 6;

FIG. 9 is a view for explaining an example of the contents of information (PCR_Pack number or 1st_Ref_PIC_PTM), which is contained in another field (ESOBU_ENT#1) of the map group information (MAP_Group#n) shown in FIG. 8 and is associated with the location of a program clock reference, depending on the availability of video and audio data;

FIG. 12 is a view for explaining an example of the configuration of play list information as another field of another management information (RTR_ESMG) recorded on AV data management information recording area 130 shown in FIG. 1;

FIG. 22 is a view for explaining an example of the configuration of the contents of stream information (one of ESOBI_STI#1 to ESOBI_STI#m) contained in management information (ESFIT) shown in FIG. 21;

FIG. 23 is a view for explaining an example of the configuration of the contents of video attribute information (V_ATR) contained in stream information shown in FIG. 22;

FIG. 30 is a flow chart (overall playback operation flow) for explaining an example of a playback operation (part 1) of the apparatus shown in FIG. 20;

FIG. 32 is a flow chart (process flow upon cell playback) for explaining an example of a process upon cell playback (part 1) in the apparatus shown in FIG. 20;

FIG. 33 is a flow chart (process flow upon cell playback) for explaining an example of a process upon cell playback (part 2) in the apparatus shown in FIG. 20;

FIG. 35 is a view showing an example of the contents of a digital copy control descriptor that can be used by the PMT shown in FIG. 34 and the like (service description table SDT, event information table EIT, and the like);

FIG. 36 is a view for explaining an application example of digital copy control to video data;

FIG. 37 is a view for explaining an application example of digital copy control to audio data;

FIG. 38 is a view showing an example of the contents of a component descriptor that can be used by the PMT shown in FIG. 34 and the like (event information table EIT and the like);

FIG. 39 is a view for explaining an example of the contents of component types shown in FIG. 38;

FIG. 46 is a view for explaining another example of the configuration of management information (EHDVR_MG) recorded on AV data management information recording area 130 shown in FIG. 1;

FIG. 47 exemplifies contents of the extended video manager information management table (EVMGI_MAT) shown in FIG. 46;

FIG. 48 exemplifies contents of the extended play list search pointer (EPL_SRP) shown in FIG. 46;

FIG. 49 exemplifies contents of the play list resume marker information (EPL_SRP) shown in FIG. 46;

FIG. 50 exemplifies contents of the extended movie AV file information table (EM_AVFIT) shown in FIG. 46;

FIG. 51 exemplifies contents of the extended movie video object general information (EM_VOB_GI) shown in FIG. 50;

FIG. 52 exemplifies contents of the extended video object time map general information (EVOB_TMAP_GI) shown in FIG. 50;

FIG. 55 exemplifies contents of the extended stream object information (ESOBI) shown in FIG. 54;

FIG. 56 exemplifies contents of the extended stream object information general information (ESOBI_GI) shown in FIG. 55;

FIG. 57 exemplifies contents of the extended stream object type (ESOB_TY) shown in FIG. 56;

FIG. 58 exemplifies contents of the copy control information (CP_CTRL_INFO) shown in FIG. 56;

FIG. 59 exemplifies contents of extended stream object elementary stream information (ESOB_ESI for video ES) shown in FIG. 55;

FIG. 60 exemplifies contents of extended stream object elementary stream information (ESOB_ESI for audio ES) shown in FIG. 55;

FIG. 61 exemplifies contents of extended stream object elementary stream information (ESOB_ESI for other ES) shown in FIG. 55;

FIG. 62 exemplifies contents of stream type information (ES_TY) shown in each of FIGS. 59 to 61;

FIG. 63 exemplifies contents of the video attribute information (V_ATR) shown in FIG. 59;

FIG. 64 exemplifies contents of the audio attribute information (A_ATR) shown in FIG. 60;

FIG. 65 exemplifies contents of the grouping information general information (GPI_GI) shown in FIG. 55;

FIG. 66 exemplifies contents of the elementary stream packet identifier (ES_PID) shown in FIG. 55;

FIG. 67 exemplifies contents of the extended stream object time map general information (ESOB_TMAP_GI) shown in FIG. 55;

FIG. 68 exemplifies contents of the extended elementary stream time map general information (EES_TMAP_GI) shown in FIG. 55;

FIG. 70 exemplifies contents of the extended program chain general information (EPGCI_GI) shown in FIG. 69;

FIG. 71 exemplifies contents of the extended program information (EPGI) shown in FIG. 69;

FIG. 72 exemplifies contents of the program resume marker information (PG_RSM_MRKI) shown in FIG. 71;

DETAILED DESCRIPTION OF THE INVENTION

Figure 3:
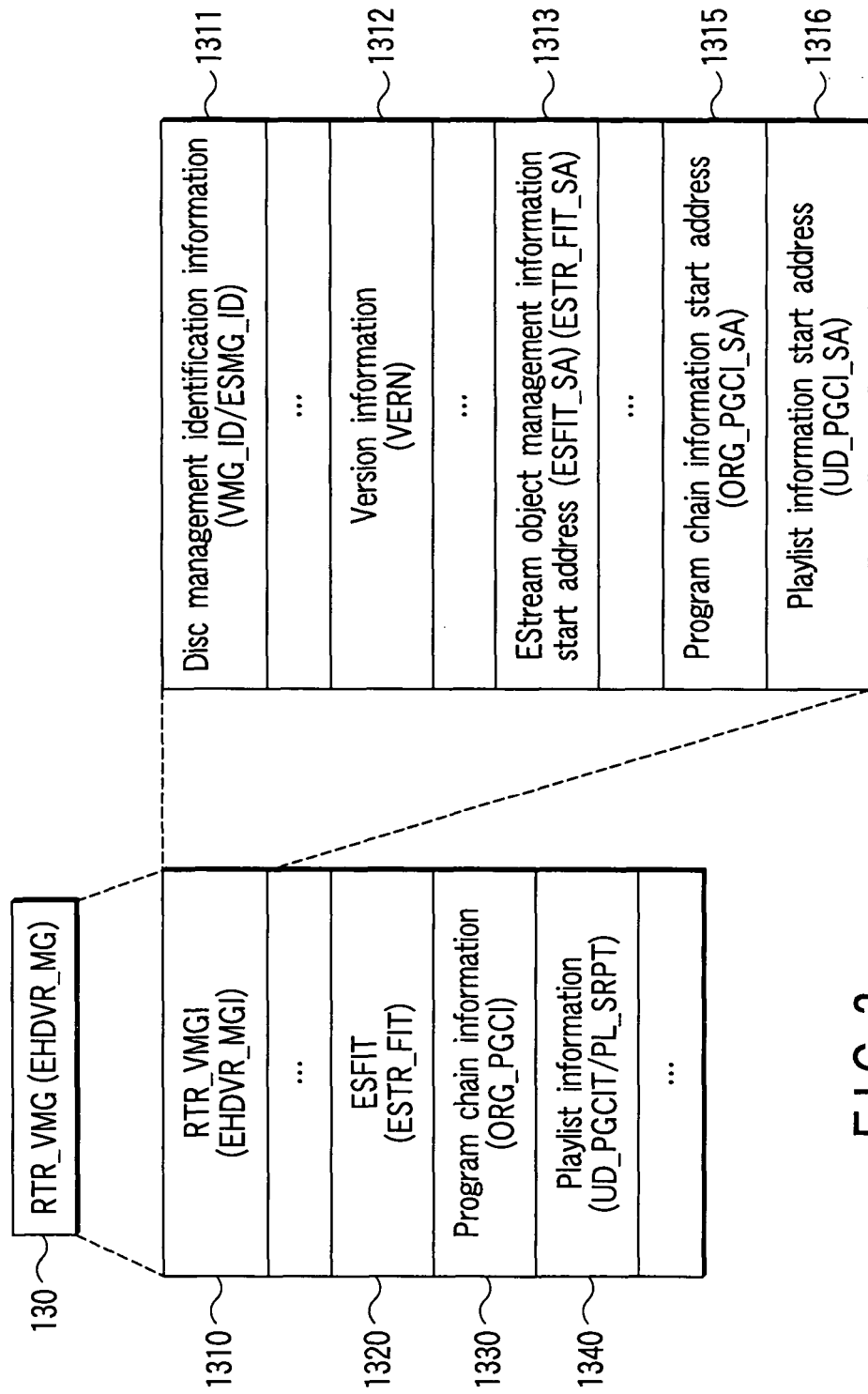
FIG. 3 is a view for explaining an example of the configuration of a field (RTR_VMGI/EHDVR_MGI) of one management information (RTR_VMG/EHDVR_MG) recorded on AV data management information recording area 130 shown in FIG. 1.

Preferred embodiments of the present invention will be described in detail hereinafter with reference to the accompanying drawings.

FIG. 1 is a view for explaining the data structure according to an embodiment of the present invention. As disc-shaped information recording medium 100 (FIG. 1(*a*)), recordable optical discs such as a DVD-RAM, DVD-RW, DVD-R, and the like, and recordable magnetic discs such as a hard disc and the like are available. The following explanation will be given taking an optical disc such as a DVD-RAM or the like as an example.

Disc 100 has lead-in area 110, volume/file structure information area 111, data area 112, and lead-out area 113 from its inner periphery side toward the outer periphery side (FIG. 1(*b*)). Volume/file structure information area 111 stores a file system. The file system includes information indicating the recording locations of files. Recorded contents are stored in data area 112 (FIG. 1(c)).

Data area 112 is divided into areas 120 that record general computer data, and area 121 that records AV data. AV data recording area 121 includes AV data management information area 130 that stores a file (VMG/ESMG file) used to manage AV data, VR object group recording area 122 that records object data (VOBS) files (VRO files) complying with the video recording standard, and EStream object group recording area 131 that records stream objects (ESOBS: Extend Stream Object Stream) compatible to digital broadcast (FIG. 1(d)). That is, in this embodiment, stream objects of digital broadcast are recorded as EStream objects 132 (ESOBS) as files independent from VR objects (FIG. 1(e)).

Each EStream object 132 is made up of one or more data units (ESOBU: Extend Stream Object Unit) 134 each of which serves as an access unit to disc 100 (FIG. 1(f)). Each data unit (ESOBU) 134 is made up of one or more pack groups (Pack_Group), each of which includes a group of a plurality of packs (FIG. 1(g)). In this embodiment, each pack group 140 includes a group of eight packs. If one pack size is 2 kbytes, the size of each pack group 140 is 16 kbytes. This size is equal to the ECC block size in the video recording standard. If the ECC block size is 32 kbytes, each pack group 140 can include 16 packs (corresponding to 32 kbytes). If the ECC block size is 64 kbytes, each pack group 140 can include 32 packs (corresponding to 64 kbytes).

Each pack group 140 forms packet recording area (DVD-TS packet recording area) 160 in stream recording proposed by the present invention (FIG. 1(h)). DVD-TS packet recording area 160 can be formed of pack group header 161, a plurality of (e.g., 85) MPEG-TS packets 162, and a plurality of (e.g., 84) pieces of packet arrival time difference information (IAPAT: Incremental Packet Arrival Time) (FIG. 1(i)). The contents of pack group 140 will be described in detail later with reference to FIG. 14.

FIG. 2 is a view for explaining the relationship among a playback management information layer, object management information layer, and object layer in the data structure according to the embodiment of the present invention. Management information (VMG/ESMG file) recorded on AV data management information recording area 130 in FIG. 1 has playback management information layer 10 used to manage the playback sequences of both the recorded contents based on the video recording standard and the stream recording recorded contents based on the present invention.

That is, a group of one or more cells 13 each of which serves as a playback unit of stream-recorded objects forms program 12, and a group of one or more cells 13* each of which serves as a playback unit of video-recorded objects forms program 12*. A sequence (playback sequence) of these programs 12 and 12* is managed by management information (PGCI) of program chain (PGC) 11.

Even when the user wants to start playback from the middle of either cell 13 on the stream recording side or cell 13* on the video recording side, he or she can designate the playback location using a playback time (PTS).

That is, when playback is to start from the middle of cell 13 on the stream recording side using the playback time (PTS), stream object ESOB 132 in stream object layer 30 is designated via stream object information ESOBI 21 in stream object management information layer 20, and stream object unit ESOBU 134 in stream object layer 30 is designated via stream object unit information ESOBUI 22 in stream object management information layer 20. When ESOB 132 and its ESOBU 134 are designated, the playback start location is specified. (ESOBUI in this case may be restated as global information 22.)

This ESOBU 134 is formed of one or more pack groups 140. ESOBU 134 corresponds to, e.g., 1 or 2 GOP data. If no GOP delimiter is found, ESOBU 134 is delimited in units corresponding to a data amount for a maximum of 1 sec as a playback time. In this way, overflow of each information field is prevented. Each pack group 140 may be formed of 8 packs (16384 bytes), and has pack group header 161 at its head position. Pack group header 161 is followed by a plurality of transport stream packets (TS_Packet) 162 and a plurality of pieces of packet arrival time difference information (IAPAT) 163. These TS packets 162 store stream recording-recorded contents.

On the other hand, when playback is to start from the middle of cell 13* on the video recording side using the playback time (PTS), video object VOB 36 in video object layer 35 is designated via video object information VOBI 24 in video object (VOB) management information layer 23, and video object unit VOBU 37 in video object layer 35 is designated via video object unit information VOBUI 25 in video object management information layer 23. When VOB 36 and its VOBU 37 are designated, the playback start location is specified. VOBU 37 may be formed of a plurality of packs 38, which store video recording recorded contents.

As will be described in detail later, when playback is to start from the middle of cell 13 on the stream recording side, the playback start location can be designated using a time in units of the number of fields by ESOBU_PB_TM (FIG. 8). On the other hand, when the playback is to start from the middle of cell 13* on the video recording side, the playback start location can be designated by VOBU_PB_TM (not shown) in time map information (TMAPI) specified by the video recording standard.

The contents of FIG. 2 can be summarized as follows. That is, stream recording management data (PCGI) can be recorded in a file common to video recording, and stream recording can be controlled common to video recording. Also, stream recording and video recording can be linked for respective cells, and the playback location in each of stream recording and video recording can be designated by a playback time.

Irrespective of the recording method (stream or video recording), after a given broadcast program (program) is recorded on disc 100, special playback requirements (e.g., the user wants to start playback (time search) from a desired time or to make fast-forwarding (FF)/fast-rewinding (FR) in a desired program) are often generated. To meet such requirements, special management information is required to manage recorded data.

This management information will be described below with reference to FIGS. 3 to 13.

FIG. 3 is a view for explaining an example of the configuration of a field (RTR_VMGI) of one management information (RTR_VMG) recorded on AV data management information recording area 130 shown in FIG. 1.

Note that stream recording in this embodiment will be abbreviated as ESR (Extended Stream Recording), and video recording will be abbreviated as VR. Then, management information of ESR data is saved in RTR_VMG 130, and is managed in the same way as VR data, as shown in FIG. 3.

RTR_VMG 130 includes video manager information (RTR_VMGI) 1310, stream file information table (ESFIT: Extend Stream File Information Table) 1320, (original) program chain information (ORG_PGCI) 1330, and play list information (PL_SRPT: or user-defined program information table: UD_PGCIT) 1340.

Note that the play list and user-defined program chain have substantially equivalent meanings although they have different names, and are synonymous with a play list and user-defined program chain used in the video recording standard. Hence, in the following description, play list related information (PL_SRP and the like) and user-defined program chain related information (UD_PGCIT_SRP and the like) are included as needed.

RTR_VMGI 1310 includes disc management identification information (VMG_ID/ESMG_ID) 1311, version information (VERN) 1312, EStream object management information start address (ESFIT_SA) 1313, program chain information start address (ORG_PGCI_SA) 1315, and play list information start address (UD_PGCIT_SA) 1316. ESR stream management information is saved in ESFIT 1320.

Figure 4:
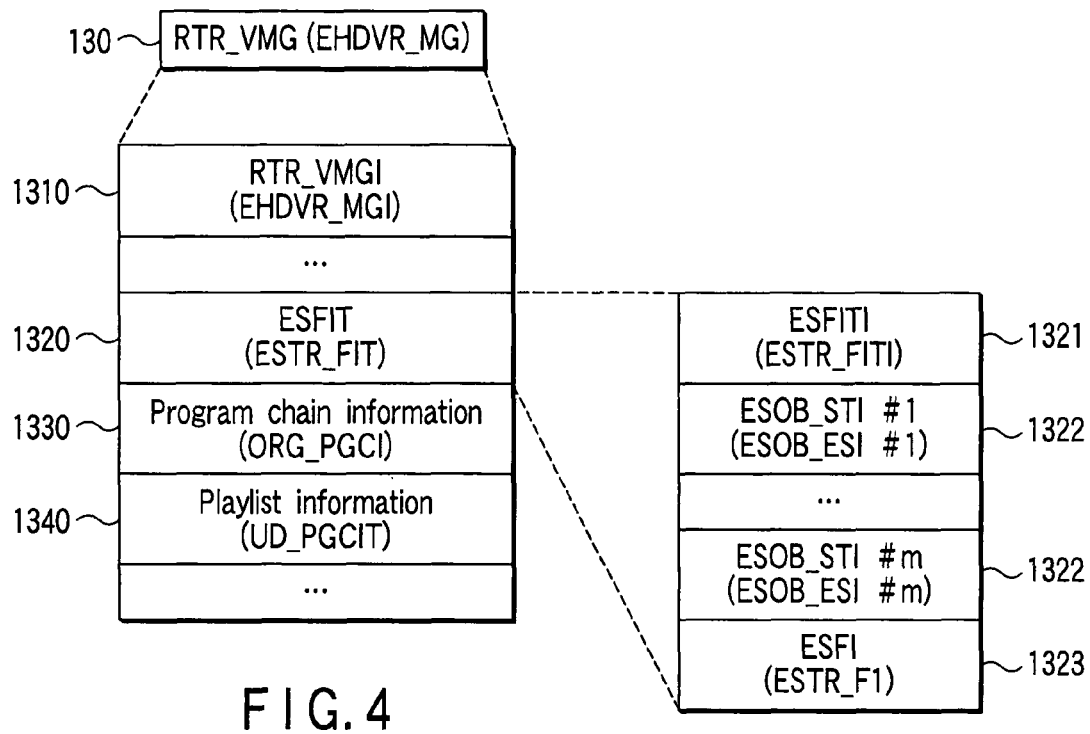
FIG. 4 is a view for explaining an example of the configuration of another field (ESFIT/ESTR_FIT) of one management information (RTR_VMG/EHDVR_MG) in the data structure according to the embodiment of the present invention.

FIG. 4 is a view for explaining an example of the configuration of ESFIT 1320 in FIG. 3. This ESFIT 1320 includes stream file information table information (ESFITI) 1321, one or more pieces of ESOB stream information (ESOB_STI#1 to ESOB_STI#m) 1322, and stream file information (ESFI) 1323. (Note that 1321 may be considered as general information.)

Figure 5:
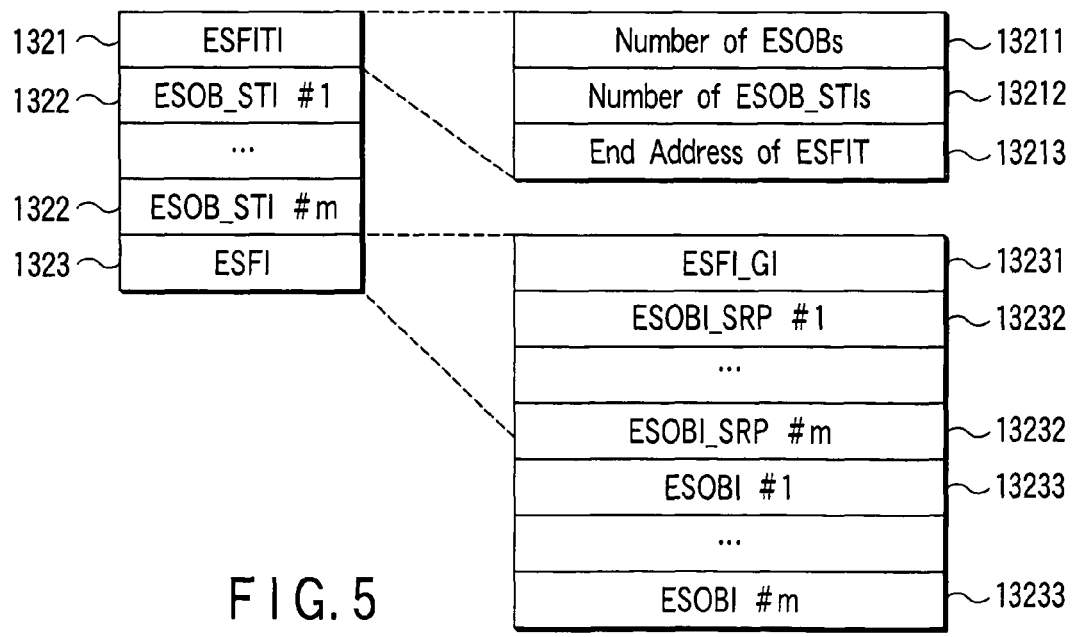
FIG. 5 is a view for explaining an example of the configuration of the contents of respective elements in the other field (ESFIT) of the management information shown in FIG. 4.

FIG. 5 is a view for explaining an example of the configuration of ESFITI 1321 and ESFI 1323 in FIG. 4. ESFITI 1321 includes information 13211 indicating the number of ESOBs, information 13212 indicating the number of pieces of ESOB_STI, and information 13213 indicating the end address of the ESFIT. ESFI 1323 includes general information ESFI_GI 13231, one or more pieces of stream object information (ESOBI#1 to ESOBI#m) 13233, and one or more search pointers (ESOBI_SRP#1 to ESOBI_SRP#m) 13232 for these (ESOBI#1 to ESOBI#m).

Figure 6:
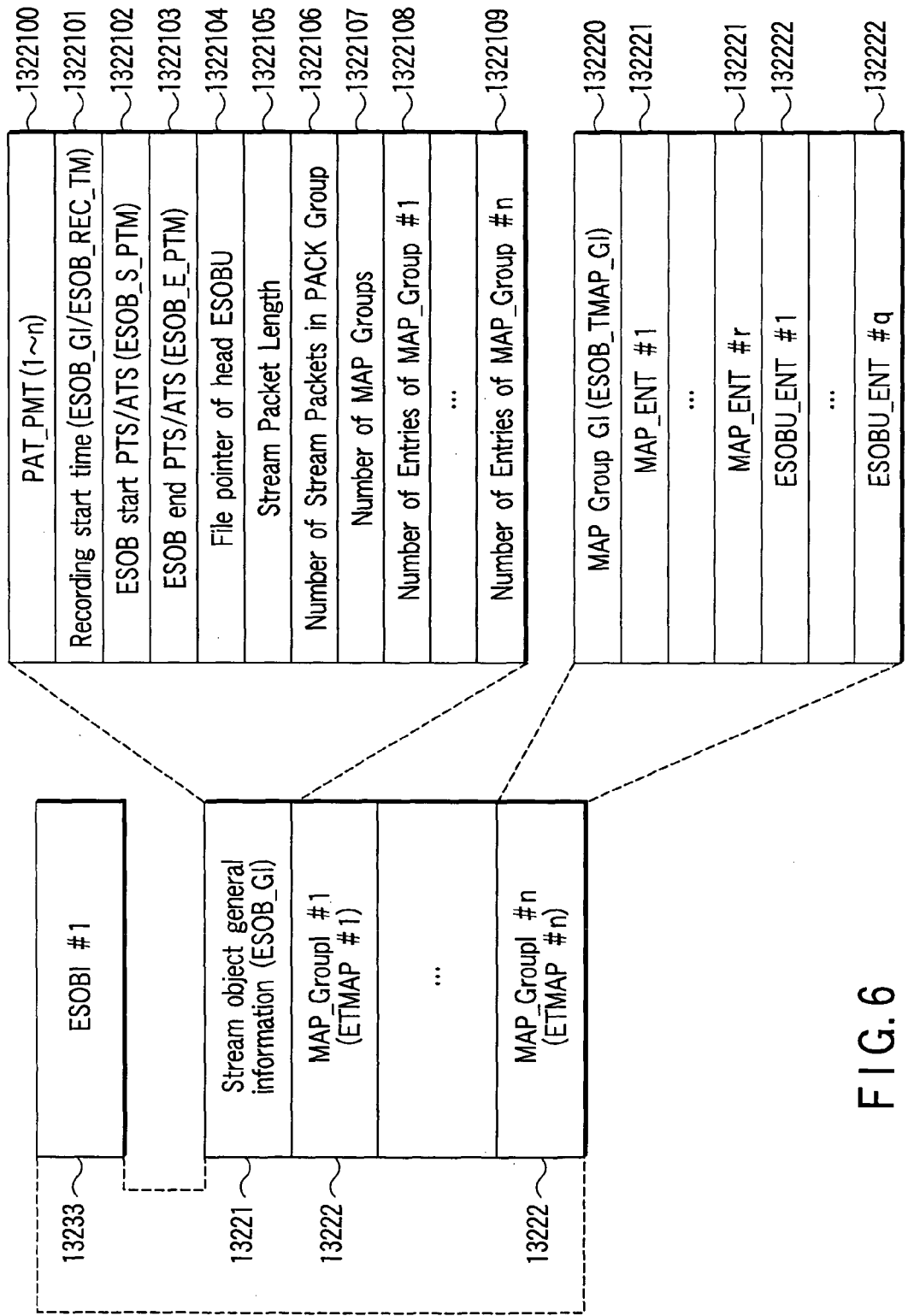
FIG. 6 is a view for explaining an example of the configuration of object information (one of ESOBI#1 to ESOBI#m) of the elements in other field (ESFIT) of the management information shown in FIG. 5.

FIG. 6 is a view for explaining the configuration of each stream object information (e.g., ESOBI#1) 13233 in FIG. 5. This ESOBI#1 13233 includes stream object general information (ESOB_GI) 13221, and one or more pieces of map group information (MAP_GroupI#1 to MAP_GroupI#n) 13222.

ESOB_GI 13221 includes PAT/PMT (Program Association Table/Program Map Table) 1322100 for all of one or more streams, recording start time information 1322101, ESOB start PTS/ATS (Presentation Time Stamp/Arrival Time Stamp; presentation time stamp/first TS packet arrival time) 1322102, ESOB end PTS/ATS 1322103, file pointer (relative address) 1322104 of the first ESOBU in that ESOB, received stream packet length (188 bytes for TS packets) 1322105, number (85 for TS packets) of stream packets 1322106 in a pack group, the number of map groups 1322107, and the number of entries 1322108 of map group #1 to the number of entries 1322109 of map group #n for one or more map groups.

Also, each map group information (e.g., MAP_GroupI#n) 13222 includes map group general information (MAP_Group_GI) 132220, one or more map entries (MAP_ENT#1 to MAP_ENT#r) 132221, and one or more ESOBU entries (ESOBU_ENT#1 to ESOBU_ENT#q).

FIG. 7 is a view for explaining an example of the configuration of MAP_Group_GI 132220 and each map entry (e.g., MAP_ENT#r) 132221 in FIG. 6.

MAP_Group_GI 132220 includes the number of map entries (M_ENT_NUMs) 1322201, the number of ESOBU entries (ESOBU_ENT_NUMs) 1322202, time offset information (TM_OFS) 1322203, address offset information (ADD_OFS) 1322204, ESOBU type information 1322205, and PMT_ID/program ID information 1322206.

Note that ESOBU type information 1322205 includes:

type information="00" . . . video data available;

type information="01" . . . video data not available, audio data available;

type information="10" . . . other.

MAP_ENT#r 132221 includes ESOBU entry number (ESOBU_ENTN) 1322221, time difference (TM_DIFF) 1322222, and target ESOBU address (Target ESOBU_ADR) 1322223. This Target ESOBU_ADR 1322223 can be expressed by the number of TS packets or the number of packs (the number of sectors) of a disc.

FIG. 8 is a view for explaining an example of the configuration of ESOBU_ENT#1 132222 shown in FIG. 6. ESOBU_ENT#1 132222 includes information 132231 indicating the number of packs or the number of TS packets of 1st_Ref_PIC, ESOBU playback time (ESOBU_PB_TM: corresponding to the number of video fields) 132232, ESOBU size (ESOBU_SZ; which can be expressed by the number of TS packets or the number of packs) 132233, and playback time (1st_Ref_PIC_PTM) 132234 of PCR_Pack number or 1st_Ref_PIC.

Note that there are three types of ESOBU, i.e., a case wherein video data is available, a case wherein no video data is available but audio data is available, and a case of only other kinds of information. These types are respectively expressed by <1>, <2>, and <3>. That is, there are three types of ESOBU entry information in accordance with the aforementioned types.

FIG. 9 is a view for explaining an example of the contents of ESOBU entry information 132222 shown in FIG. 8 depending on the availability of video and audio data.

<1> When video data is available, ESOBU entry information includes the end address information of the first reference picture (I picture or the like) in an entry from the head of ESOBU, ESOBU playback time (the number of fields), ESOBU size, and pack number with the PCR, or reference picture playback time (the number of fields from the head of ESOBU). Note that the PCR is the closest one which is located before the position of the reference picture.

*More specifically, when video data is available:

ESOBU is delimited (a) at randomly accessible positions, (b) in units corresponding to an integer multiple of GOP, or (c) within a maximum of 1 sec as a playback time.

The number of packs of 1st_Ref_PIC is that from the head of ESOBU to the end of the reference picture (Ref_PIC). When the number of packs is "0xffffffff", it indicates that Ref_PIC is not present or found in that SOBU. In this case, this SOBU cannot be used as an access point upon special playback.

The PCR_Pack number indicates the number of packs from the head of ESOBU closest to 1st_Ref_PIC to a pack that stores the PCR. The first bit of the PCR_Pack number is used as a (flag (e.g., "0" indicates "+ direction"; "1" indicates "− direction"). If no PCR is available, the PCR_Pack number is set to be "0xfff", or the playback time of 1st_Ref_PIC (1st_Ref_PIC_PTM) can be adopted instead.

<2> When video data is not available and audio data is available, ESOBU entry information includes the end address information of the first audio frame in an entry from the head of ESOBU, ESOBU playback time (the number of fields), ESOBU size, and pack number with the PCR.

*More specifically, when video data is not available and audio data is available:

ESOBU is delimited at 1-sec intervals.

The number of packs of 1st_Ref_PIC is the number of last packs of the audio frame at the head of ESOBU.

The PCR_Pack number indicates the number of packs from the head of SOBU closest to an audio frame at the head of ESOBU to a pack that stores the PCR. The first bit of the PCR_Pack number is used as a (flag (e.g., "0" indicates "+ direction"; "1" indicates "– direction"). If no PCR is available, the PCR_Pack number is set to be "0xffff".

<3> When only other kinds of information are available, since entry information cannot be formed, all data are padded with "FF"s.

*More specifically, when neither video data nor audio data are available, and only other kinds of information (data broadcast information and the like) are available:

ESOBU is delimited at 1-sec intervals.

The number of packs of 1st_Ref_PIC is fixed to "0xffffffff".

The PCR_Pack number is fixed to "0xffffffff".

Figure 10:
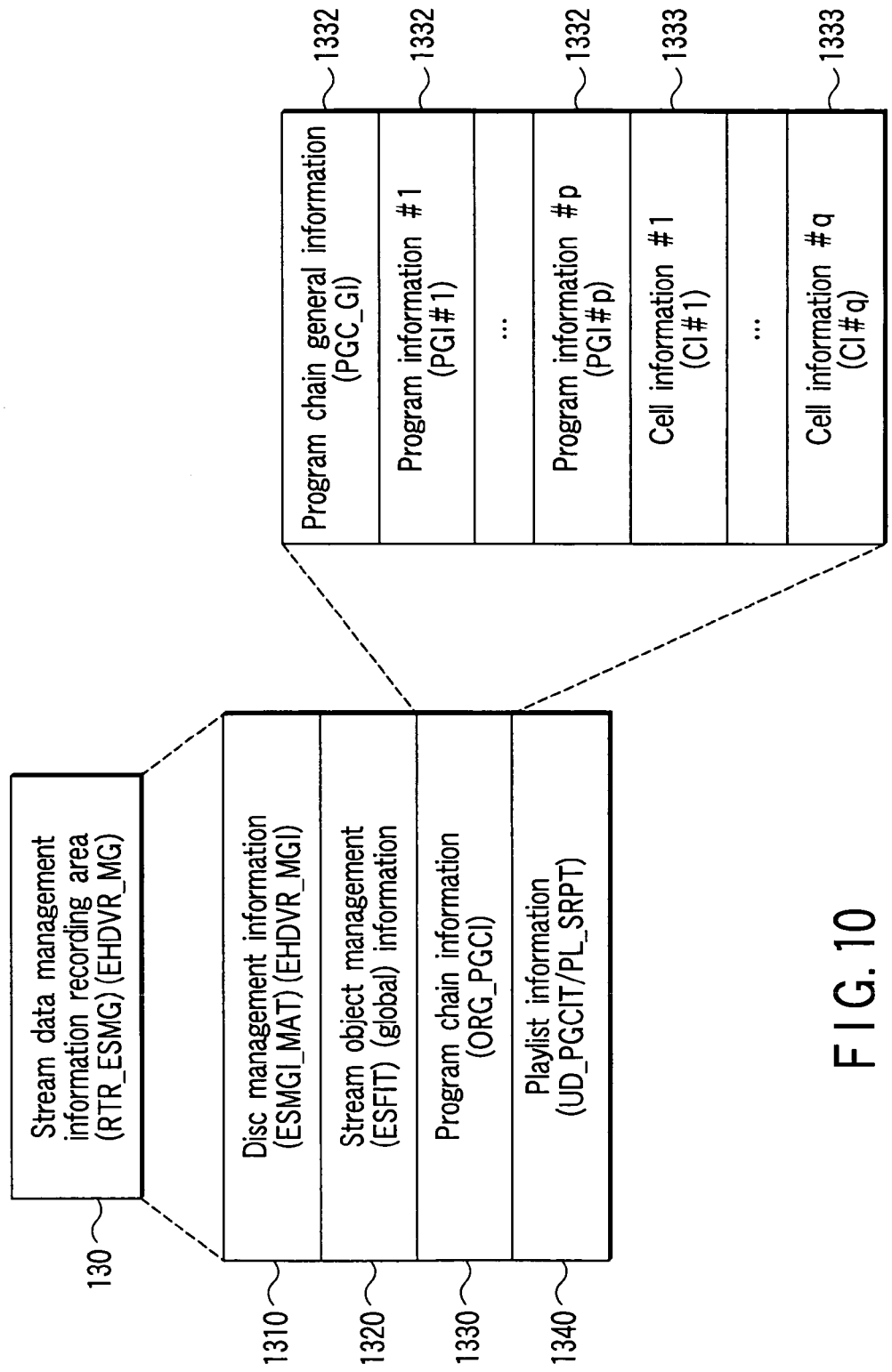
FIG. 10 is a view for explaining an example of the configuration of program chain information as one field of another management information (RTR_ESMG) recorded on AV data management information recording area 130 shown in FIG. 1.

FIG. 10 is a view for explaining an example of the configuration of another management information (stream data management information RTR_ESMG) recorded on AV data management information recording area 130 shown in FIG. 1. That is, stream data management information recording area 130 as a part of AV data management information recording area 130 includes disc management information (ESMGI_MAT) 1310, stream object management information (ESFIT; global information) 1320, program chain information (ORG_PGCI) 1330, and play list information (UD_PGCIT) 1340.

Program chain information (PGCI) 1330 includes program chain general information (PGC_GI) 1331, one or more pieces of program information (PGI#1 to PGI#p) 1332, and one or more pieces of cell information (CI#1 to CI#q) 1333. This PGCI data structure has substantially the same format as that of the video recording standard, except for its contents (cell information CI) (this difference will be explained below with reference to FIG. 11).

Figure 11:
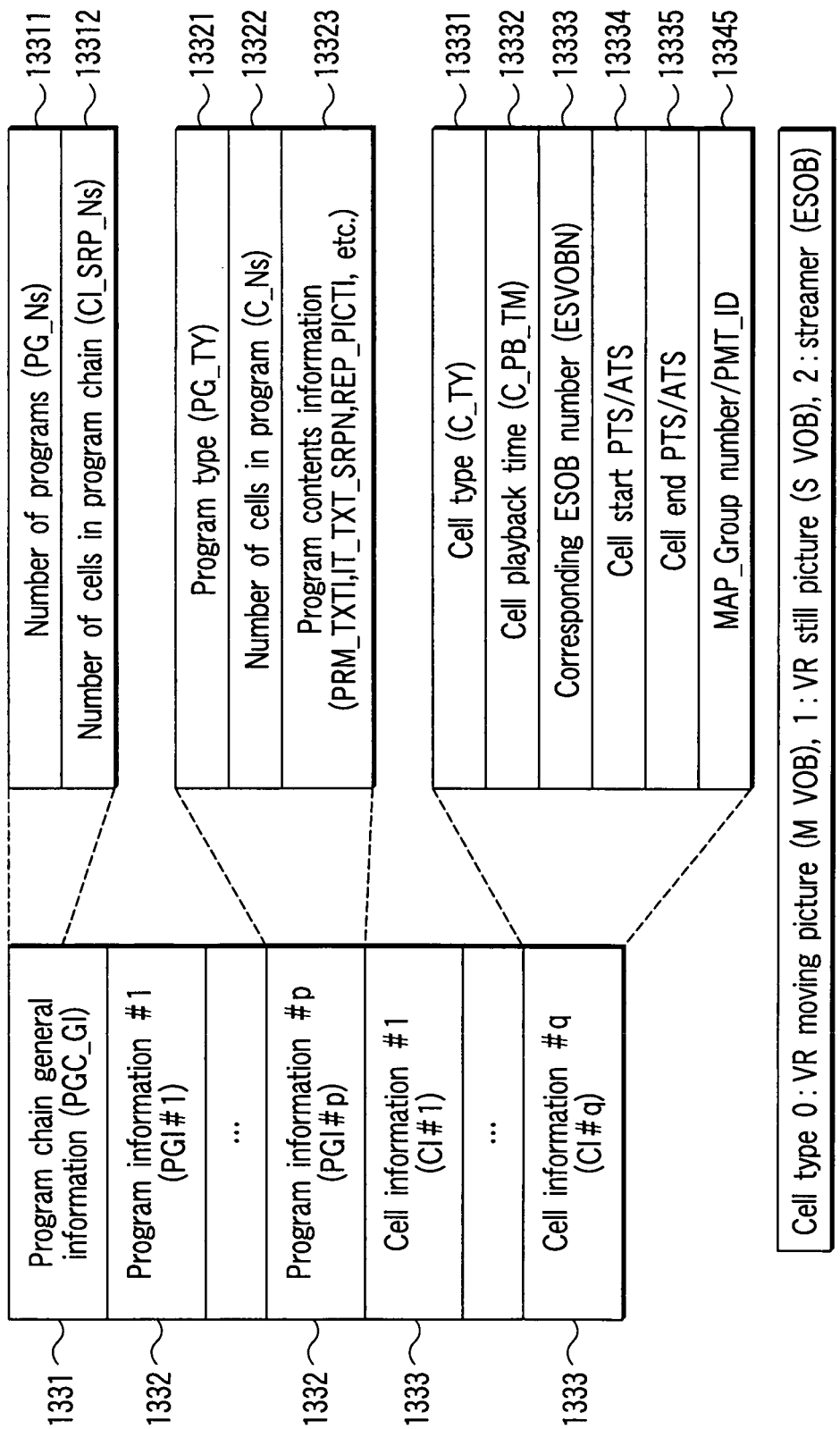
FIG. 11 is a view for explaining an example of the configuration of the contents of respective elements of the program chain information shown in FIG. 10.

FIG. 11 is a view for explaining an example of the contents of respective elements of the program chain information shown in FIG. 10.

Program chain general information 1331 includes the number of programs (PG_Ns) 13311, and the number of cells (CI_SRP_Ns) 13312 in the program chain.

Each program information 1332 includes program type (PG_TY) 13321, the number of cells (C_Ns) 13322 in the program, and program contents information (primary text information PRM_TXTI, item text search pointer number IT_TXT_SRPN, representative picture information REP_PICTI, and the like) 13323.

Each cell information 133 includes cell type (C_TY) 13331, cell playback time 13332, corresponding ESOB number 13333, cell start PTS/ATS (presentation time stamp/ESOBU arrival time) 13334, cell end PTS/ATS 13335, and map group number/PMT_ID 13345. Note that an embodiment in which cell playback time 13332 in cell information is omitted is also available.

Note that cell type 13331 includes:
C_TY="0" ... VR moving picture (M_VOB);
C_TY="1" ... VR still picture (S_VOB);
C_TY="2" ... streamer (ESOB).

FIG. 12 is a view for explaining an example of the configuration of the contents of the play list information shown in FIG. 10.

The play list information (PL_SRPT or user-defined PGC information table UD_PGCIT) includes play list general information (PL_SRPT$_1$ or UD_PGCITI) 1341, one or more play lists (their search pointers PL_SRP#1 to PL_SRP#r or UD_PGCI_SRP#1 to UD_PGCI_SRP#r) 1342, and one or more pieces of cell information (CI#1 to CI#s) 1343.

Figure 13:
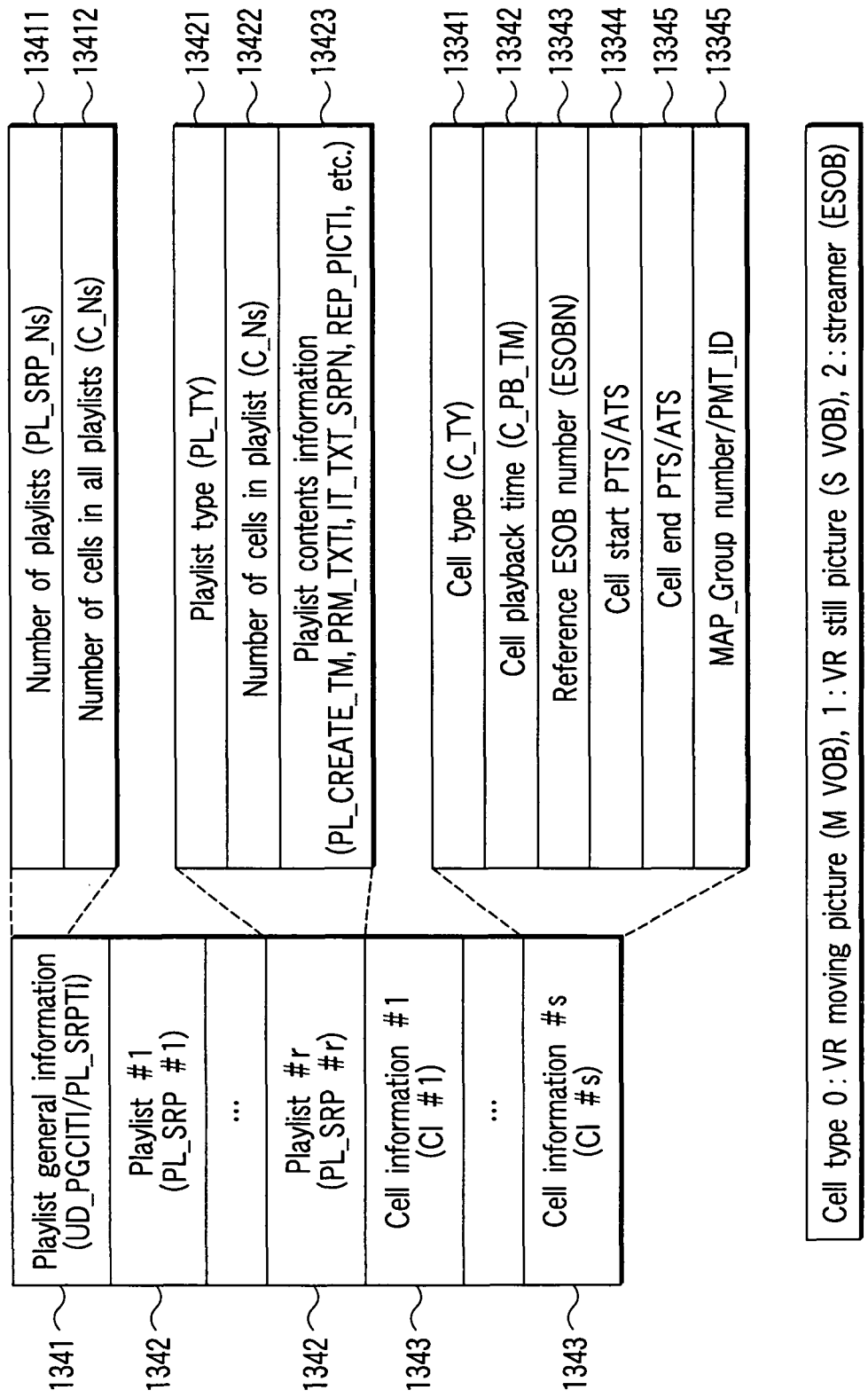
FIG. 13 is a view for explaining an example of the configuration of the contents of respective elements of the play list information shown in FIG. 12.

FIG. 13 is a view for explaining an example of the configuration of respective elements of the play list information shown in FIG. 12.

Play list general information 1341 includes the number of play lists (PL_SRP_Ns) 13411, and the number of cells (C_Ns) 13412 in all the play lists. Each play list 1342 includes play list type (PL_TY) 13421, the number of cells (C_Ns) 13422 in the play list, and play list contents information (play list creation time PL_CREATE_TM, primary text information PRM_TXTI, item text search pointer number IT_TXT_SRPN, representative picture information REP_PICTI, and the like) 13423. Each cell information 1343 includes cell type (C_TY) 13341, cell playback time 13342, reference ESOB number (ESOBN) 13343, cell start PTS/ATS (presentation time stamp/ESOBU arrival time) 13344, cell end PTS/ATS 13345, and map group number/PMT_ID 13345. Note that an embodiment in which cell playback time 13342 in cell information is omitted is also available.

Note that cell type 13341 includes:
C_TY="0" ... VR moving picture (M_VOB);
C_TY="1" ... VR still picture (S_VOB);
C_TY="2" ... streamer (ESOB).

In the embodiment of the present invention, PGC information is used as playback information, and has the same format as that of video recording. However, in the cell information shown in FIGS. 11 and 13, the ESOB type is added to the cell type. Furthermore, the ESOB number is designated, and two types of the playback start time and end time, i.e., start PTS and ATS (or APAT) and end PTS and ATS are assumed. Moreover, the map group number or stream number is assumed.

Figure 14:
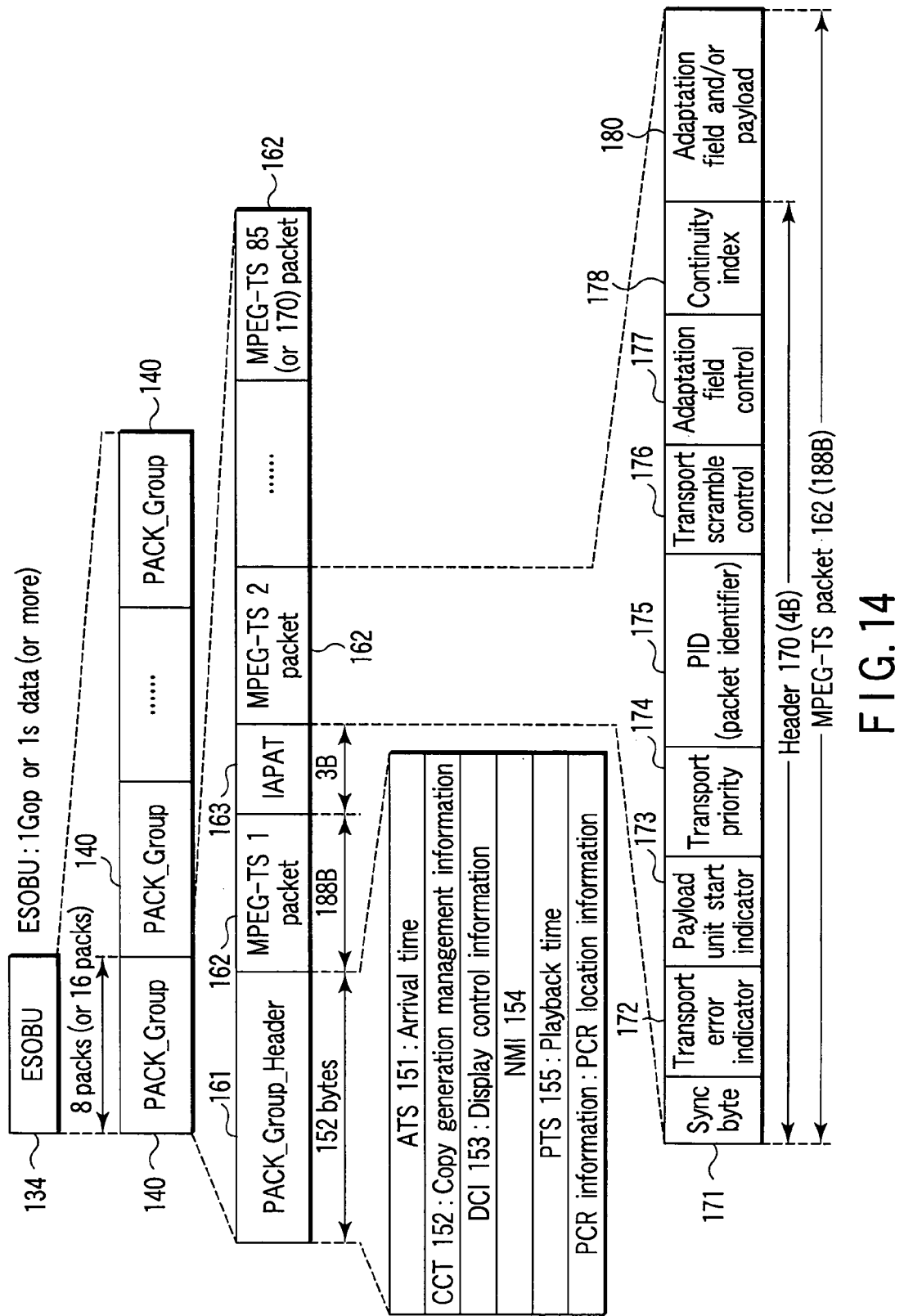
FIG. 14 is a view for explaining an example of the configuration of a data unit (ESOBU) for a stream object shown in FIG. 1 or 2.

In the embodiment of the present invention, the structure of the extend stream object set (ESOBS) is made up of one or more extend stream objects (ESOB), each of which corresponds to, e.g., one program. Each ESOB includes one or more ESOBUs (Extend Stream Object Units), each of which corresponds to object data for 1 sec as a playback time or one or two GOP data FIG. 14 is a view for explaining an example of the configuration of the stream object data unit (ESOBU) shown in FIG. 1 or 2.

One ESOBU includes one or more pack groups 140, each of which includes, e.g., 8 packs (1 pack=1 sector: 2048 bytes).

Each pack group 140 includes pack group header (152 bytes) 161, one or more (85 in this case) MPEG-TS packets (188 bytes) 162, and one or more (84 in this case) IAPAT (Incremental Packet Arrival Time; 3 bytes) data 163.

Pack group header 161 includes pack arrival time (ATS) 151, copy generation management information (or copy control information CCI) 152, display control information (DCI) 153, manufacturer's information (MNI) 154, presentation time information (PTS) 155, and PCR location information (PCRI; Program Clock Reference Information) 156.

Each MPEG-TS packet 162 includes 4-byte header 170 and adaptation field and/or payload 180. Note that header 170 includes sync byte 171, transport error indicator 172, payload unit start indicator 173, transport priority 174, packet identifier (PID) 175, transport scramble control 176, adaptation field control 177, and continuity index 178.

A TS stream (FIG. 14) as a common basic format in systems that broadcast (distribute) compressed moving picture data such as digital TV broadcast data and broadcast data using a wired network such as the Internet or the like is divided into a packet management data field (170) and payload (180).

The payload includes data to be played back in a scrambled state. According to the digital broadcast standard ARIB, the PAT (Program Association Table), PMT (Program Map Table), and SI (Service Information) are not scrambled. Also, various kinds of management information can be generated using the PMT and SI (SDT: Service Description Table, EIT: Event Information Table, BAT: Bouquet Association Table).

Data to be played back includes MPEG video data, Dolby AC3(audio data, MPEG audio data, data broadcast data, and the like. As information required upon playback, a plurality of pieces of information (program information and the like) such as PAT, PMT, SI, and the like are used although they are not directly related to data to be played back.

The PAT includes the PID (Packet Identification) of the PMT for each program, and the PMT records the PIDs of video data and audio data.

In this way, a normal playback sequence of the STB (Set Top Box) is as follows. That is, when the user determines a program from EPG (Electronic Program Guide) information, the PAT is loaded at the beginning of the target program, and determines the PID of the PMT, which belongs to the desired program, on the basis of that data. The target PMT is read out in accordance with that PIT, and the PIDs of video and audio packets to be played back, which are contained in the PMT, are determined. Video and audio attributes are read out based on the PMT and SI and are set in respective decoders. The video and audio data are extracted and played back in accordance with their PIDs. Note that the PAT, PMT, SI, and the like are transmitted at intervals of several 100 ms since they are used during playback.

Upon recording on a disc medium such as a DVD-RAM or the like using these data, it is advantageous to directly record broadcast data as digital data.

If a plurality of streams are to be recorded at the same time, the number of streams to be recorded may be stored in SOBI, PMT data corresponding to respective streams may be saved, special playback map information (map group information) may be stored for each stream, and the numbers of streams to be played back (channel numbers or PID data of PMT data) may be recorded in cell information.

Figure 15:
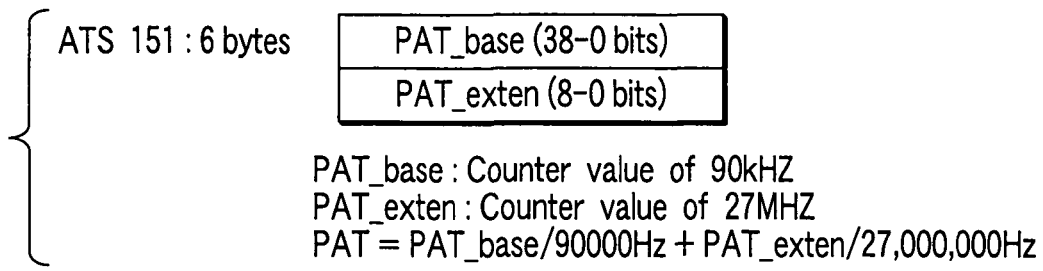
FIG. 15 is a view for explaining an example of the configuration of an arrival time (ATS) of a pack contained in a pack group header shown in FIG. 14.

FIG. 15 is a view for explaining an example of the configuration of pack arrival time (ATS) 151 contained in the pack group header shown in FIG. 14. For example, 6 bytes are assigned to ATS 151. The upper bytes of ATS 151 represent PAT-base (e.g., a counter value of 90 kHz) and the lower byte represents PAT-extend (e.g., a counter value of 27 MHz).

Practical arrival time PAT is expressed by PAT_base/90000 Hz+PAT_exten/27,000,000 Hz. In this manner, ATS 151 can be finely expressed for, e.g., respective video frames.

Figure 16:
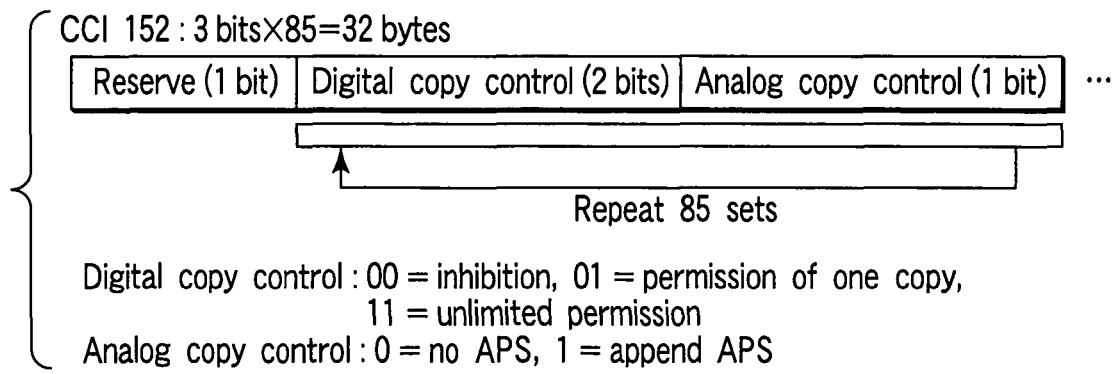
FIG. 16 is a view for explaining an example of the configuration of copy generation management information (or copy control information CCI) contained in the pack group header shown in FIG. 14.

FIG. 16 is a view for explaining an example of the configuration of copy generation management information (or copy control information CCI) contained in the pack group header shown in FIG. 14. In this case, 32 bytes are assigned to CCI 152. As the contents, a reserve bit (1 bit) is assigned at the head of the information, and a set (3 bits) of digital copy control information (2 bits) and analog copy control information (1 bit) is repetitively assigned 85 times.

Note that the digital copy control information indicates "copy never" if it is "00"; "copy once" if it is "01"; and "copy free" if it is "11". Also, the analog copy control information indicates "copy free" (no analog protection system APS) if it is "0"; and "copy never" (with APS) if it is "1". The copy control information value can be set based on a value (see FIGS. 35 to 37) recorded in SI in a stream (contents).

Figure 17:
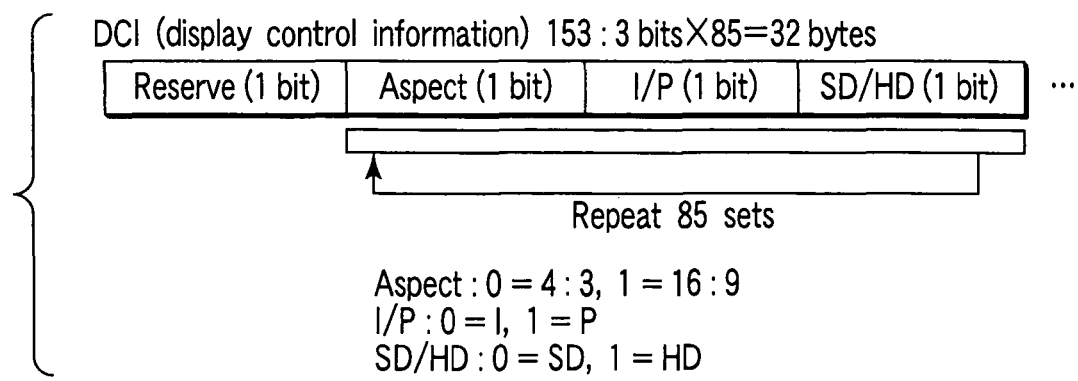
FIG. 17 is a view for explaining an example of the configuration of display control information (DCI) contained in the pack group header shown in FIG. 14.

FIG. 17 is a view for explaining an example of the configuration of display control information (DCI) 153 contained in the pack group header shown in FIG. 14. In this case, 32 bytes are assigned to DCI 153. As the contents, a reserve bit (1 bit) is assigned at the head of the information, and a set (3 bits) of aspect information (1 bit), interlaced/progressive (I/P) information (1 bit), and standard/high-definition (SD/HD) information (1 bit) is repetitively assigned 85 times.

Note that the aspect information indicates an aspect ratio 4:3 if it is "0"; and 16:9 if it is "1". The I/P information indicates interlaced display if it is "0"; and progressive display if it is "1". The SD/HD information indicates standard image quality (image quality of standard NTSC or PAL class) if it is "0"; and high-definition image quality (image quality of high-definition or Hi-Vision class) if it is "1". The aspect information value can be set based on a value (see FIGS. 38 and 39) recorded in SI in a stream (contents).

Figure 18:
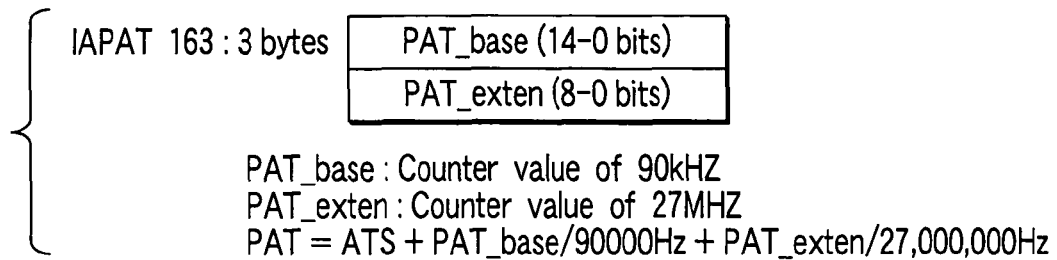
FIG. 18 is a view for explaining an example of the configuration of an increment (IAPAT) of the packet arrival time contained in a pack group shown in FIG. 14 after the pack group header.

FIG. 18 is a view for explaining an example of the configuration of increment (IAPAT) 163 of the packet arrival time contained in the pack group shown in FIG. 14 after the pack group header. In this case, for example, 3 bytes are assigned to IAPAT 163. The upper 2 bytes of IAPAT 163 express PAT-base (e.g., a counter value of 90 kHz) and the lower 1 byte represents PAT-extend (e.g., a counter value of 27 MHz). Since IAPAT 163 can be expressed by an increment (change) from ATS 151 in place of an absolute time, the data size of IAPAT can be smaller than that of ATS.

Practical arrival time PAT in IAPAT 163 is expressed by ATS+PAT_base/90000 Hz+PAT_exten/27,000,000 Hz. In this manner, IAPAT 163 can be finely expressed for, e.g., respective video frames. As another embodiment, a difference from the arrival time of the immediately preceding TS packet may be used.

Note that "PAT" in "PAT-base and PAT-exten" shown in FIG. 15 or 18 means not "Program Association Table" but "Packet Arrival Time".

Figure 19:
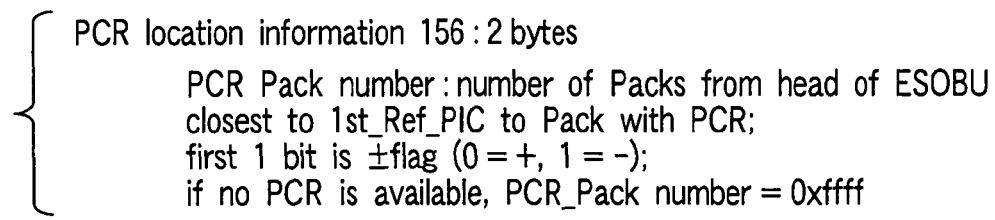
FIG. 19 is a view for explaining an example of the configuration of PCR location information (PCR_Pack number or the like) contained in the pack group header shown in FIG. 14.

FIG. 19 is a view for explaining an example of the configuration of PCR location information (PCR_Pack number or the like) contained in the pack group header shown in FIG. 14. In this case, PCR (Program Clock Reference) location information 156 is used as PCR information (PCRI).

This PCR location information 156 is expressed by, e.g., 2 bytes. These 2 bytes can express a PCR pack number. This PCR pack number can be expressed by the number of packs from the head of ESOBU closest to first reference picture (i.e., first I-picture) 1st_Ref_PIC to a pack that stores the PCR. The first bit of the PCR pack number is used as a (flag (e.g., "0" indicates "+ direction"; "1" indicates "– direction"). If no PCR is available, the PCR_Pack number is set to be "0xfff".

Figure 20:
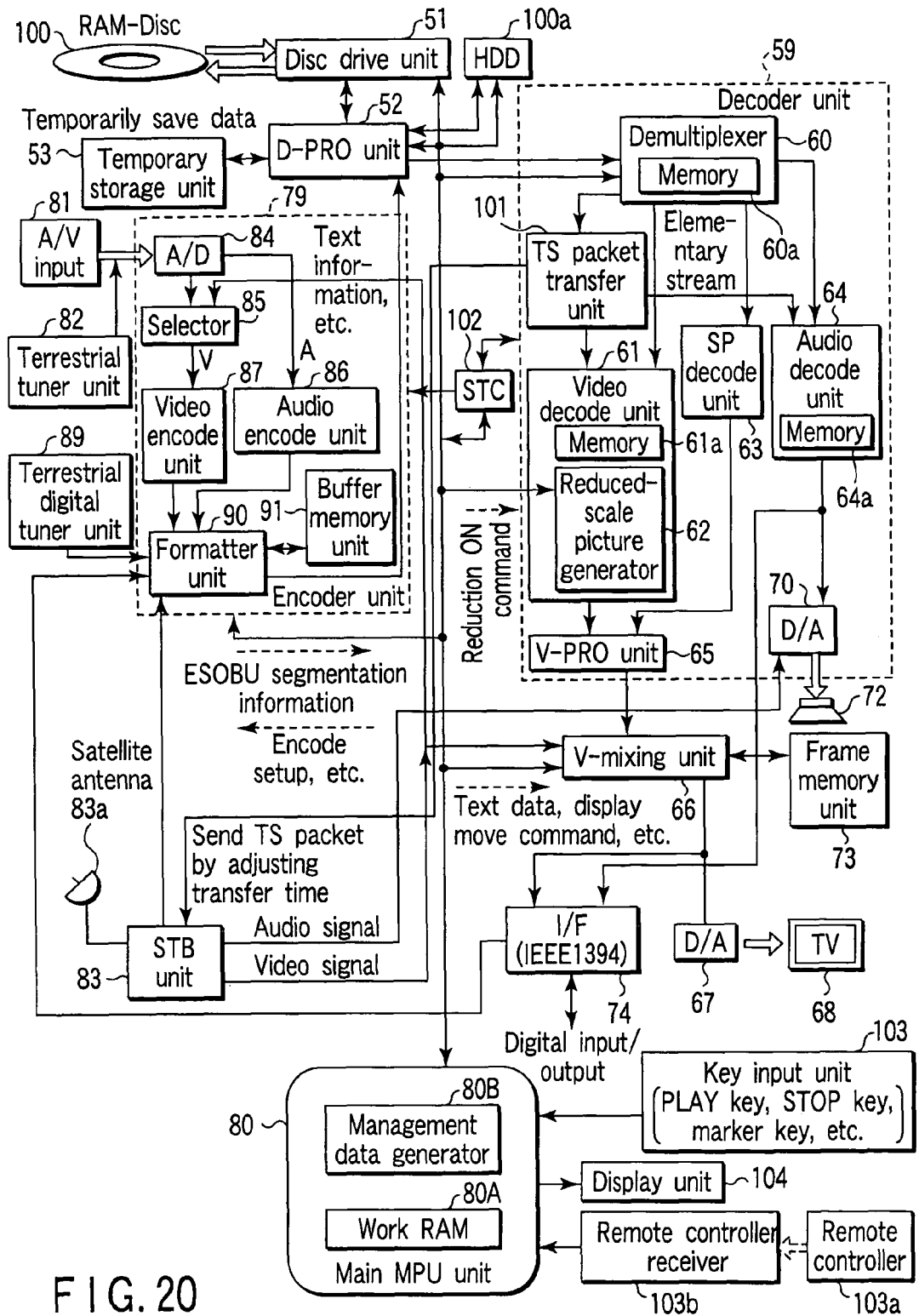
FIG. 20 is a block diagram for explaining an example of an apparatus for recording and playing back AV information (digital TV broadcast program and the like) on and from an information recording medium (optical disc, hard disc, or the like) using the data structure according to the embodiment of the present invention.

FIG. 20 is a block diagram for explaining an example of the apparatus which records and plays back AV information (digital TV broadcast program or the like) on an information recording medium (optical disc, hard disc, or the like) using the data structure according to the embodiment of the present invention.

As shown in FIG. 20, this apparatus (digital video recorder/streamer) comprises MPU unit 80, key input unit 103, remote controller receiver 103b for receiving user operation information from remote controller 103a, display unit 104, decoder unit 59, encoder unit 79, system time counter (STC) unit 102, data processor (D-PRO) unit 52, temporary storage unit 53, disc drive unit 51 for recording/playing back information on/from recordable optical disc 100 (e.g., a DVD-RAM or the like), hard disc drive (HDD) 100a, video mixing (V-mixing) unit 66, frame memory unit 73, analog TV D/A converter 67, analog TV tuner unit 82, terrestrial digital tuner unit 89, and STB (Set Top Box) unit 83 connected to satellite antenna 83*a*. Furthermore this apparatus comprises digital I/F 74 (e.g., IEEE1394) to cope with digital inputs/outputs as a streamer.

Note that STC unit 102 counts clocks on a 27-MHz basis in correspondence with PAT_base shown in FIG. 15 or 18.

STB unit 83 decodes received digital broadcast data to generate an AV signal (digital). STB unit 83 sends the AV signal to TV 68 via encoder unit 79, decoder unit 59, and D/A converter 67 in the streamer, thus displaying the contents of the received digital broadcast. Alternatively, STB unit 83 directly sends the decoded AV signal (digital) to V-mixing unit 66, and can send an analog AV signal from it to TV 68 via D/A converter 67.

The apparatus shown in FIG. 20 forms a recorder comprising both the video and stream recording functions. Hence, the apparatus comprises components (IEEE1394 I/F and the like) which are not required in video recording, and those (AV input A/D converter 84, audio encode unit 86, video encode unit 87, and the like) which are not required in stream recording.

Encoder unit 79 includes A/D converter 84, video encode unit 87, input selector 85 to video encode unit 87, audio encode unit 86, a sub-picture encode unit (as needed although not shown), format unit 90, and buffer memory unit 91.

Decode unit 59 comprises demultiplexer 60 which incorporates memory 60*a*, video decode unit 61 which incorporates memory 61*a* and reduced-scale picture (thumbnail or the like) generator 62, sub-picture (SP) decode unit 63, audio decode unit 64 which incorporates memory 64*a*, TS packet transfer unit 101, video processor (V-PRO) unit 65, and audio D/A converter 70. An analog output (monaural, stereo, or AAC 5.1CH surround) from this D/A converter 70 is input to an AV amplifier or the like (not shown) to drive a required number of loudspeakers 72.

In order to display contents, whose recording is in progress, on TV 68, stream data to be recorded is sent to decoder unit 59 simultaneously with D-PRO unit 52, and can be played back. In this case, MPU unit 80 makes setups upon playback in decoder unit 59, which then automatically execute a playback process.

D-PRO unit 52 forms ECC groups by combining, e.g., every 16 packs, appends ECC data to each group, and sends them to disc drive unit 51. When disc drive unit 51 is not ready to record on disc 100, D-PRO unit 52 transfers the ECC groups to temporary storage unit 53 and waits until disc drive unit 51 is ready to record. When disc drive unit 51 is ready, D-PRO unit 52 starts recording. Temporary storage unit 53 may be assured by using a given area of HDD 10*a*.

Note that MPU unit 80 can make read/write access to D-PRO unit 52 via a dedicated microcomputer bus.

The apparatus shown in FIG. 20 assumes optical disc 100 such as DVD-RAM/-RW/-R/Blue media (recordable media using blue laser) and the like as primary recording media, and hard disc drive (HDD) 100*a* (and/or a large-capacity memory card (not shown) or the like) as its auxiliary storage device.

These plurality of types of media can be used as follows. That is, stream recording is done on HDD 10*a* using the data structure (format) shown in FIGS. 1 to 19. Of stream recording contents which are recorded on HDD 100*a*, programs that the user wants to preserve directly undergo stream recording (direct copy or digital dubbing) on disc 100 (if copying is not inhibited by copy control information CCI). In this manner, only desired programs having quality equivalent to original digital broadcast data can be recorded together on disc 100. Furthermore, since the stream recording contents copied onto disc 100 exploit the data structure of the present invention, they allow easy special playback processes (to be described later with reference to FIG. 44) such as time search and the like, although these contents are recorded by stream recording.

A practical example of a digital recorder having the aforementioned features (a streamer/video recorder using a combination of a DVD-RAM/-RW/-R/Blue media and HDD) is the apparatus shown in FIG. 20. The digital recorder shown in FIG. 20 is configured to roughly include a tuner unit (82, 83, 89), disc unit (100, 100*a*), encoder unit 79, decoder unit 59, and a controller (80).

Satellite digital TV broadcast data is delivered from a broadcast station via a communication satellite. The delivered digital data is received and played back by STB unit 83. This STB 83 expands and plays back scrambled data on the basis of a key code distributed from the broadcast station. At this time, scramble from the broadcast station is descrambled. Data is scrambled to prevent users who are not subscribers of the broadcast station from illicitly receiving broadcast programs.

In STB unit 83, the broadcast digital data is received by a tuner system (not shown). When the received data is directly played back, it is descrambled by a digital expansion unit and is decoded by an MPEG decoder unit. Then, the decoded received data is converted into a TV signal by a video encoder unit, and that TV signal is externally output via D/A converter 67. In this manner, the digital broadcast program received by STB unit 83 can be displayed on analog TV 68.

Terrestrial digital broadcast data is received and processed in substantially the same manner as satellite broadcast data except that it does not go through any communication satellite (and is not scrambled if it is a free broadcast program). That is, terrestrial digital broadcast data is received by terrestrial digital tuner unit 89, and the decoded TV signal is externally output via D/A converter 67 when it is directly played back. In this way, a digital broadcast program received by terrestrial digital tuner unit 89 can be displayed on analog TV 68.

Terrestrial analog broadcast data is received by terrestrial tuner unit 82, and the received analog TV signal is externally output when it is directly played back. In this way, an analog broadcast program received by terrestrial tuner unit 82 can be displayed on analog TV 68.

An analog video signal input from external AV input 81 can be directly output to TV 68. Also, after the analog video signal is temporarily A/D-converted into a digital signal by A/D converter 84, and that digital signal is then re-converted into an analog video signal by D/A converter 67, that analog video signal may be output to the external TV 68 side. In this way, even when an analog VCR playback signal that includes many jitter components is input from external AV input 81, an analog video signal free from any jitter components (that has undergone digital time-base correction) can be output to the TV 68 side.

A digital video signal input from digital I/F (IEEE1394 interface) 74 is output to the external TV 68 side via D/A converter 67. In this way, a digital video signal input to digital I/F 74 can be displayed on TV 68.

A bitstream (MPEG-TS) input from satellite digital broadcast, terrestrial digital broadcast, or digital I/F 74 can undergo stream recording in stream object group recording area 131 (FIG. 1(*d*)) of disc 100 (and/or HDD 100*a*) as stream object 132 in FIG. 1(*e*).

An analog video signal from terrestrial analog broadcast or AV input 81 can undergo video recording on VR object group recording area 122 (FIG. 1(*d*)) of disc 100 (and/or HDD 100*a*).

Note that the apparatus may be configured to temporarily A/D-convert an analog video signal from terrestrial analog broadcast or AV input 81 into a digital signal, and to make stream recording of the digital signal in place of video recording. Conversely, the apparatus may be configured to make video recording of a bitstream (MPEG-TS) input from satellite digital broadcast, terrestrial digital broadcast, or digital I/F 74 (after it undergoes required format conversion) in place of stream recording.

Recording/playback control of stream recording or video recording is done by firmware (control programs and the like corresponding to operations shown in FIGS. 24 to 44 to be described later) of main MPU unit 80. MPU unit 80 has management data generation unit 80B for stream recording and video recording, generates various kinds of management data (FIGS. 2 to 19 and the like) using work RAM 80A as a work area, and records the generated management information on AV data management information recording area 130 in FIG. 1(*d*) as needed. MPU unit 80 plays back management information recorded on AV data management information recording area 130, and executes various kinds of control (FIGS. 24 to 44) on the basis of the played back management information.

The features of medium 100 (100*a*) used in the apparatus of FIG. 20 will be briefly summarized below. That is, this medium has management area 130 and data area 131. Data is separately recorded on the data area as a plurality of object data (ESOB), and each object data is made up of a group of data units (ESOBU). One data unit (ESOBU) includes pack groups each of which is formed by converting a MPEG-TS compatible digital broadcast signal into TS packets and packing a plurality of packets (see FIGS. 1 and 14). On the other hand, management area 130 has PGC information (PCGI) as information used to manage the playback sequence. This PGC information contains cell information (CI) (see FIGS. 10 to 13). Furthermore, management area 130 includes information used to manage object data (ESOB) (see FIGS. 4 to 9).

The apparatus shown in FIG. 20 can make stream recording on medium 100 (100*a*) with the above data structure in addition to video recording. In this case, in order to extract program map table PMT and service information SI from a TS packet stream, MPU unit 80 has a service information extraction unit (not shown; firmware that forms management data management unit 80B). Also, MPU unit 80 has an attribute information generation unit (not shown; firmware that forms management data management unit 80B) that generates attribute information (PCR_Pack number and the like in FIG. 8) on the basis of information extracted by the service information extraction unit.

Figure 21:
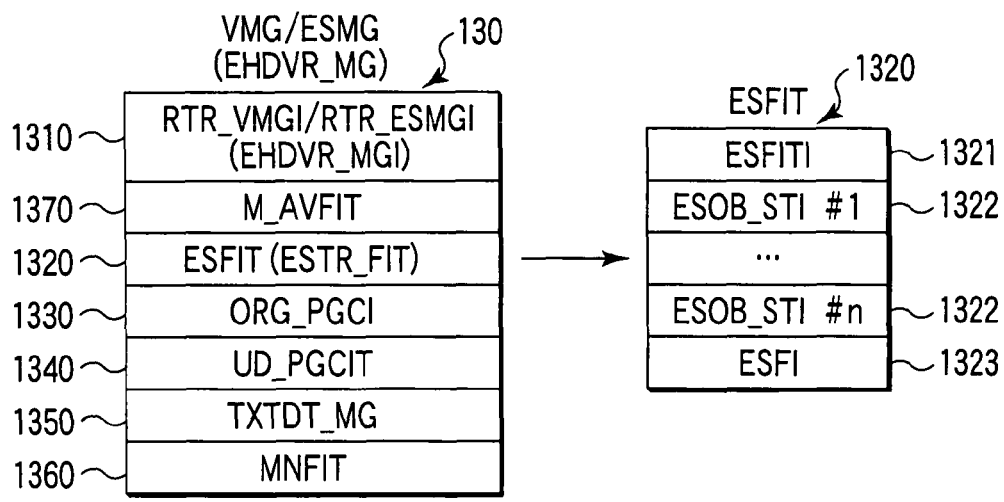
FIG. 21 shows an example of management information to be stored in AV data management information recording area 130 shown in FIG. 1, and is a view for explaining the data structure as a combination of video recording management information VMG and stream recording management information ESMG.

FIG. 21 shows an example of management information stored in AV data management information recording area 130 shown in FIG. 1, and is a view for explaining the data structure as a combination of video recording management information VMG and stream recording management information ESMG according to the embodiment of the present invention. FIG. 21 shows an embedding example of information (ESFIT) used to manage MPEG-TS (one of AV data) of recorded digital TV broadcast data of management information stored in AV data management information recording area 130 shown in FIG. 1. In FIG. 21, stream file information table (ESFIT) 1320 that has been explained using FIGS. 4 and 5 is allocated after movie AV file information table (M_AVFIT) 1370. After ESFIT, original program chain information (ORG_PGCI) 1330, user-defined PGC information table (UD_PGCIT) 1340, text data manager (TXTDT_MG) 1350, manufacturer's information table (MNFIT) 1360 are allocated as in video recording management information VMG. Upon adopting such data structure of management information (similar to the video recording standard), it becomes easier to effectively utilize existing control software resources that have been developed for recorders based on the existing video recording standard (by partially modifying them).

FIG. 22 is a view for explaining an example of the configuration of the contents of stream information (one of ESOBI_STI#1 to ESOBI_STI#m) included in management information (ESFIT) 1322 shown in FIG. 21. This ESOBI_STI includes, in turn from lower relative byte positions, video attribute V_ATR, the number AST_Ns of audio stream, the number SP_Ns of sub-picture streams, attribute A_ATR0 of audio stream #0, attribute A_ATR1 of audio stream #1, and pallet data SP_PLT of sub-picture data.

FIG. 23 is a view for explaining an example of the configuration of the contents of video attribute information (V_ATR) included in the stream information shown in FIG. 22. This V_ATR includes information (MPEG1, MPEG2, or the like) indicating a video compression mode, information (NTSC, PAL, or the like, or SD, HD, or the like) indicating a TV mode, information indicating an aspect ratio, information indicating a video resolution, and interlaced/progressive identification information I/P.

If the information indicating an aspect ratio is "00b", it indicates an aspect ratio=4:3; if the information is "01b", it indicates an aspect ratio=16:9. If identification information I/P is "00", it indicates progressive display; if the information is "01", it indicates interlaced display.

If the information indicating a video resolution is "000", it indicates horizontal*vertical resolutions=720*480; if the information is "001", it indicates horizontal*vertical resolutions=704*480; if the information is "010", it indicates horizontal*vertical resolutions=352*480; if the information is "011", it indicates horizontal*vertical resolutions=352*240; if the information is "100", it indicates horizontal*vertical resolutions=544*480; if the information is "101", it indicates horizontal*vertical resolutions=480*480; and if the information is "110", it indicates horizontal*vertical resolutions=1920*1080. Note that 720*480 progressive display or 1920*1080 interlaced or progressive display corresponds to the HD resolution of Hi-vision or equivalent. Other resolutions correspond to the SD resolutions.

Figure 24:
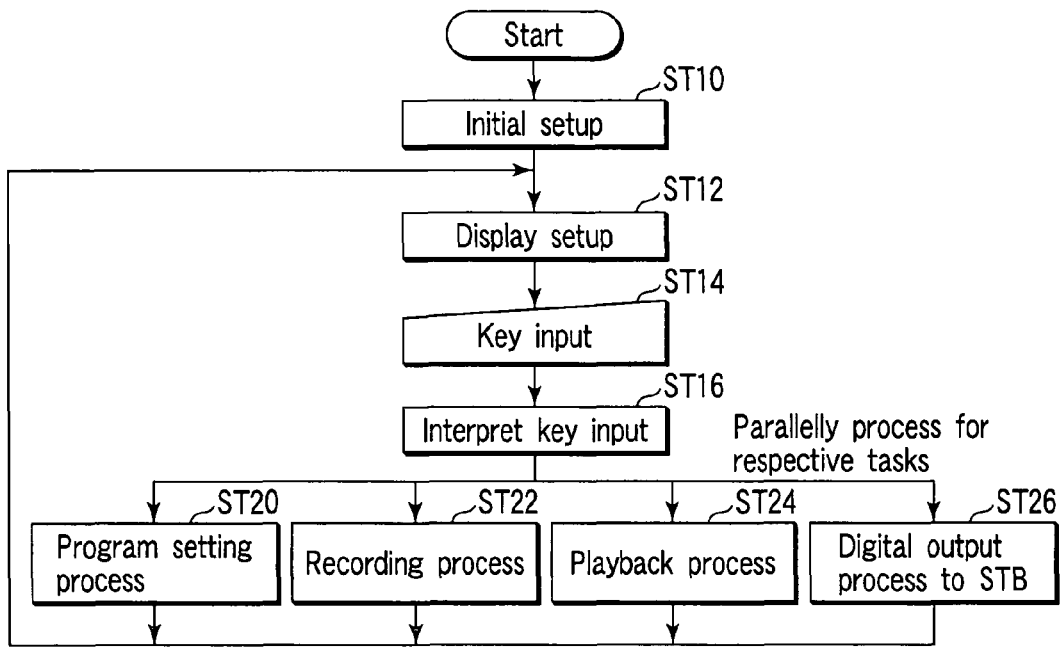
FIG. 24 is a flow chart (overall operation process flow) for explaining an example of the overall operation of the apparatus shown in FIG. 20.

FIG. 24 is a flow chart (overall operation process flow) for explaining an example of the overall operation of the apparatus shown in FIG. 20. For example, when the power switch of the apparatus in FIG. 20 is turned on, MPU unit 80 makes initial setups (upon factory shipment or after user's setups (step ST10). MPU unit 80 also makes display setups (step ST12) and waits for a user's operation. If the user has made a key input from key input unit 103 or remote controller 103*a* (step ST14), MPU unit 80 interprets the contents of that key input (step ST16). The following four data processes are executed as needed in accordance with this input key interpretation result.

That is, if the key input is, for example, a key operation made to set timer program recording, a program setting process starts (step ST20). If the key input is a key operation made to start recording, a recording process starts (step ST22). If the key input is a key operation made to start playback, a playback process starts (step ST24). If the key input is a key input made to output digital data to the STB, a digital output process starts (step ST26). The processes in steps ST20 to ST26 are parallel executed as needed for respective tasks. For example, the process for outputting digital data to the STB (ST26) is parallel executed during the playback process (ST24). Or a new program setting process (ST20) can be parallel executed during the recording process (ST22) which is not timer program recording. Or by utilizing the feature of disc recording that allows high-speed access, the playback process (ST24) and digital output process (ST26) can be parallel executed during the recording process (ST22).

Figure 25:
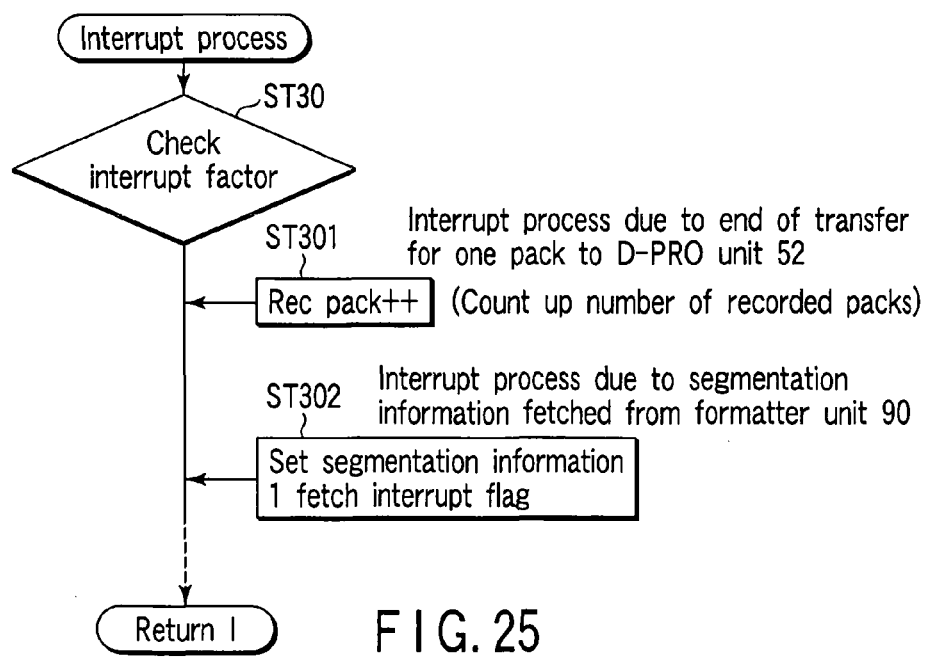
FIG. 25 is a flow chart (interrupt process flow) for explaining an example of an interrupt process in the operation of the apparatus shown in FIG. 20.

FIG. 25 is a flow chart (interrupt process flow) for explaining an example of an interrupt process in the operation of the apparatus shown in FIG. 20. In the interrupt process in the control operation of MPU unit 80, an interrupt factor is checked (step ST30). If the interrupt factor indicates that an interrupt is generated due to "completion of transfer for one pack to D-PRO unit 52", the number of video recording packs is incremented by 1 (step ST301). If the interrupt factor indicates that an interrupt is generated due to "fetching of segmentation information from formatter unit 90", a fetch interrupt flag (not shown) of segmentation information 1 is set (step ST302).

Figure 26:
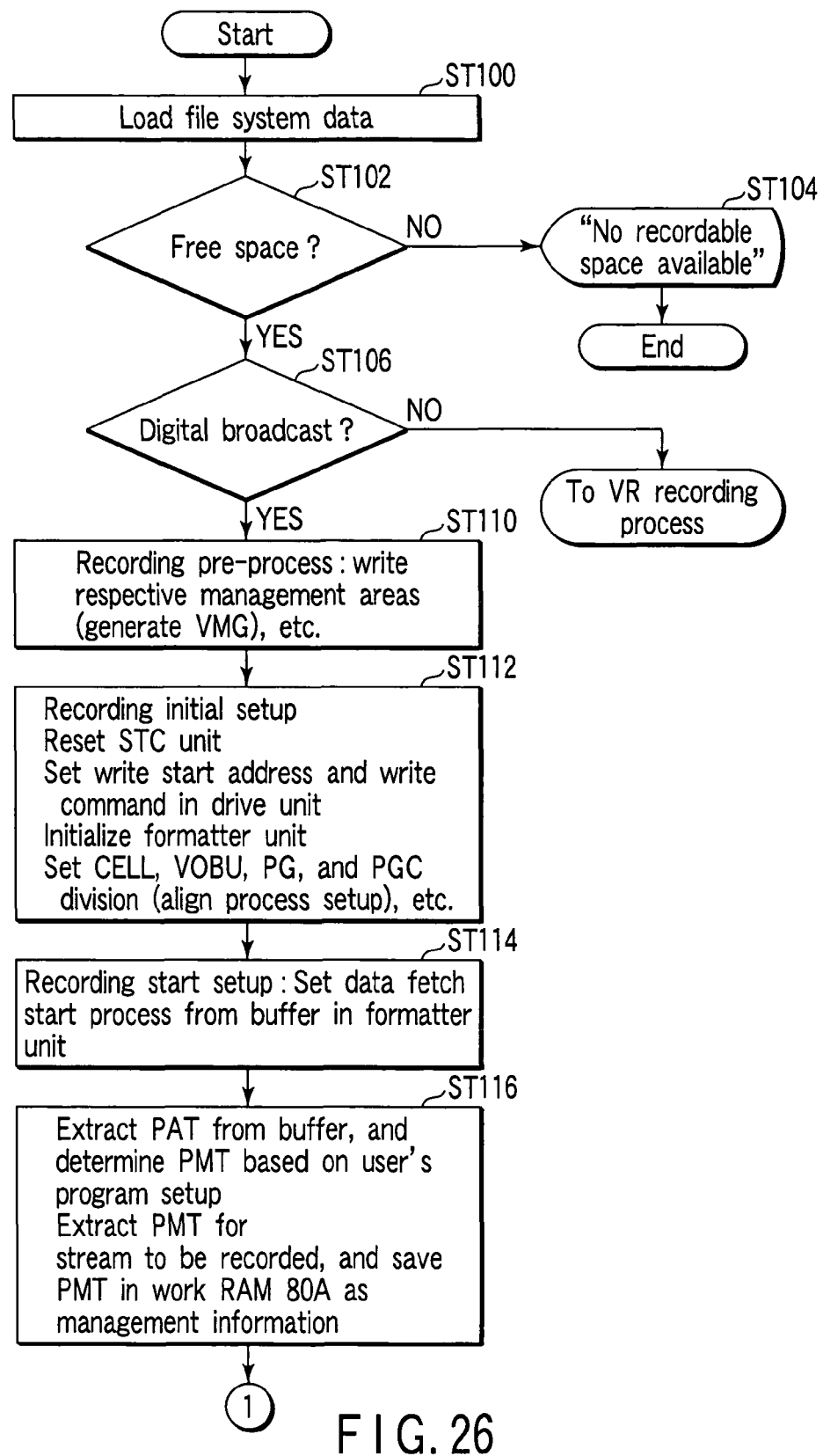
FIG. 26 is a flow chart (recording flow) for explaining an example of a recording operation (part 1) of the apparatus shown in FIG. 20.
Figure 27:
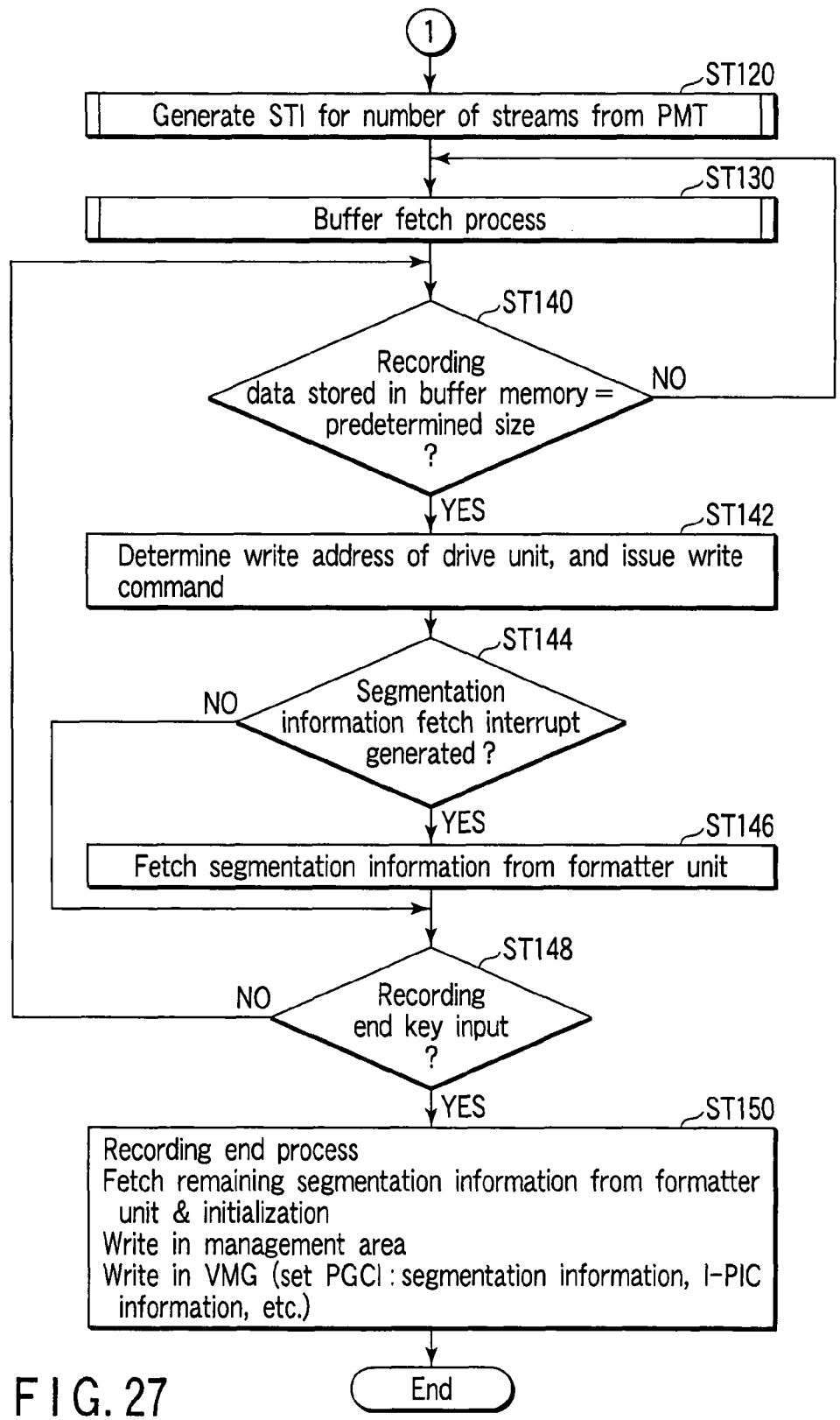
FIG. 27 is a flow chart (recording flow) for explaining an example of a recording operation (part 2) of the apparatus shown in FIG. 20.

FIGS. 26 and 27 are flow charts (recording flow) for explaining an example of the recording operation (ST22 in FIG. 24) of the apparatus shown in FIG. 20.

<01> Upon reception of a recording command from the key input unit, MPU unit 80 loads management data from disc drive unit 51 (step ST100) and determines an area to be read. At this time, MPU unit 80 checks the file system to determine whether or not recording can be proceeded (if a recordable space remains on disc 100 or HDD 10a). If recording cannot be proceeded (NO in step ST102), a message that advises accordingly is displayed for the user (step ST104), thus aborting the recording process.

If recording can be proceeded (YES in step ST102), MPU unit 80 checks if recording to be made is stream recording of a digital broadcast signal or video recording of an analog broadcast signal (or video recording of an analog signal obtained by D/A-converting a digital broadcast signal). If recording to be made is not stream recording of a digital broadcast signal (NO in step ST106), a recording process based on the video recording standard starts. If recording to be made is stream recording of a digital broadcast signal (YES in step ST106), a recording start position is determined based on the management data loaded in step ST100.

<02> The contents of the management area are set to write data in the determined area, and the write start address of video data is set in disc drive unit 51, thus preparing for data recording (step ST110).

<03> As part of initial setups for recording, the time of STC unit 102 is reset (step ST112). Note that STC unit 102 is a system timer, and recording/playback is done (for respective frames) with reference to the count value of this timer.

<04> The PAT (included in an MPEG-TS stream from STB unit 83) of a program to be recorded is loaded to determine the PID required to fetch the PMT of the target program. Then, the target PMT is loaded to determine the PIDs of data (video, audio) to be decoded (to be recorded). At this time, the PAT and PMT are saved in work RAM 80A of MPU unit 80, and are written in the management information (step ST116). VMG file data is written in the file system, and required information (FIG. 3) is written in VMGI.

<05> As part of initial setups for recording, recording setups of respective units are made (step ST112). At this time, a segmentation setup of data and reception setup of TS packets are made in formatter unit 90. Also, the PID of data to be recorded is set to record only a target video stream. Also, buffer memory unit 91 is set to start holding of TS packets.

As part of recording start setups, a buffer data fetch start process from buffer memory unit 91 is set in formatter unit 90 (step ST114). Then, formatter unit 90 starts a buffer fetch process (to be described later with reference to FIG. 29).

<06> STI is generated based on the PMT (step ST120 in FIG. 27; details of this step will be described later using FIG. 28). Next, a storage process in buffer memory unit 91 starts (step ST130).

<07> If data stored in buffer memory unit 91 reaches a predetermined size (for one continuous data area CDA) (YES in step ST140), a predetermined ECC process (which generates an ECC block for 8 sectors/16 kbytes or for 32 sectors/64 kbytes) is done via D-PRO unit 52, thus recording the data on the disc (step ST142).

<08> During recording, segmentation information is saved in work RAM 80A of MPU unit 80 (step ST146) periodically (before buffer RAM 91 of formatter unit 90 becomes full of data; YES in step ST144). The segmentation information to be saved is that of ESOBU data, i.e., the start address or pack length of each ESOBU, the end address of I-picture data, the ESOBU arrival time (ATS), or the like may be saved.

<09> The remaining space of disc 100 (or 100a) during recording is checked. If the remaining space becomes equal to or smaller than a predetermined value (e.g., 150 Mbytes), a small remaining space process may be executed (not shown). As the small remaining space process, a process for erasing, if erasable unerased data (temporarily erased data thrown into a trash box file) remain on the disc, these data to increase the remaining space is known. Alternatively, as the small remaining space process, a process for increasing a recordable duration by lowering the recording rate (or by switching MPEG2 recording to MPEG1 recording) if the physical remaining space remains the same is also known. Also, when dummy packs used in after recording are recorded on disc 100, a process for aborting recording of these dummy packs may be executed as part of the small remaining space process. Alternatively, a process for continuing relay recording on an unrecorded data of HDD 100a when the remaining space of disc 100 becomes small may be executed as part of the small remaining space process.

<10> It is checked if recording is to end (if the user has pressed a recording end key or if no recordable space remains). If recording is to end (YES in step ST148), remaining segmentation information is fetched from formatter unit 90, and is added to work RAM 91. These data are recorded in management data (VMGI), and remaining information is recorded in the file system (step ST150).

<11> If recording is not to end (NO in step ST148), the flow returns to step ST140 to continue the data fetch process (step ST130) and write process (step ST142).

Figure 28:
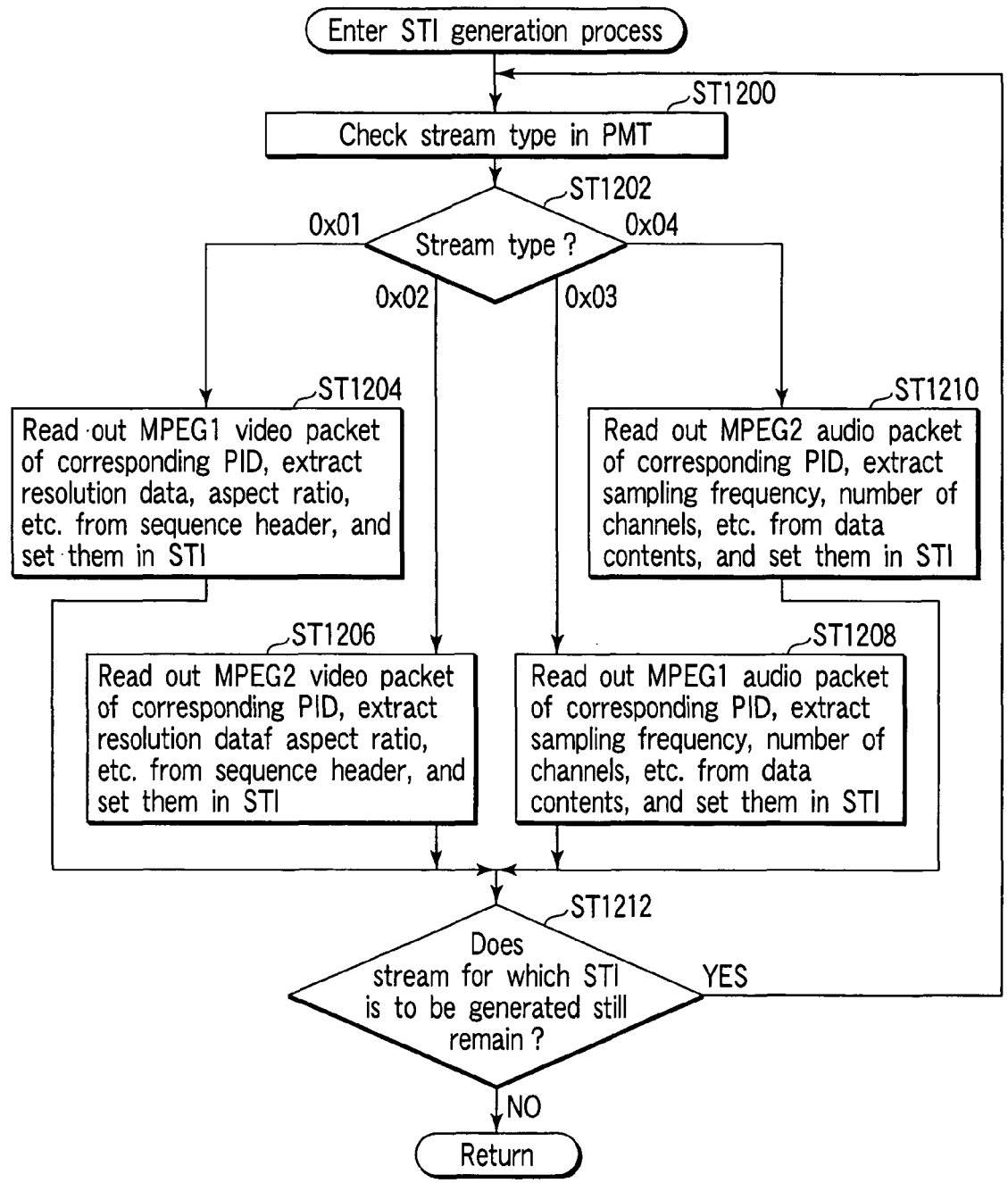
FIG. 28 is a flow chart (STI setting process flow) for explaining an example of the contents of a stream information generation process (ST120) shown in FIG. 27.

FIG. 28 is a flow chart (STI setting process flow) for explaining an example of the contents of the stream information generation process (ST120) shown in FIG. 27. In stream recording that records an MPEG-TS stream, a stream to be recorded contains the PMT, which describes a stream type (to be described later with reference to FIG. 34).

In the stream information generation process (ST120), the stream type in the PMT (FIG. 34) is checked (steps ST1200 and ST1202). If the stream type is "0x01", an MPEG1 video STI setting process is executed (step ST1204); if the stream type is "0x02", an MPEG2 video STI setting process is executed (step ST1206); if the stream type is "0x03", an MPEG1 audio STI setting process is executed (step ST1208); or if the stream type is "0x04", an MPEG2 audio STI setting process is executed (step ST1210). Inner data are checked for these stream types, and various kinds of attribute information are set. Upon completion of generation (setting process) of STI for all streams (NO in step ST1212), the control exits the process in FIG. 28 and advances to step ST130 in FIG. 27.

In the flow of signals upon recording shown in FIGS. 26 to 28, TS packet data received by STB unit 83 (or terrestrial digital tuner 82) are converted into pack groups by formatter unit 90, and these pack groups are saved in buffer RAM 91. When TS packet data as pack groups stored the buffer RAM 91 reach a predetermined size (for one or an integer multiple of CDA size), they are recorded on disc 100. At this time, upon reception of TS packets, a group is formed every 85 packets, and a pack group header is generated, as will be described below with reference to FIG. 29.

Figure 29:
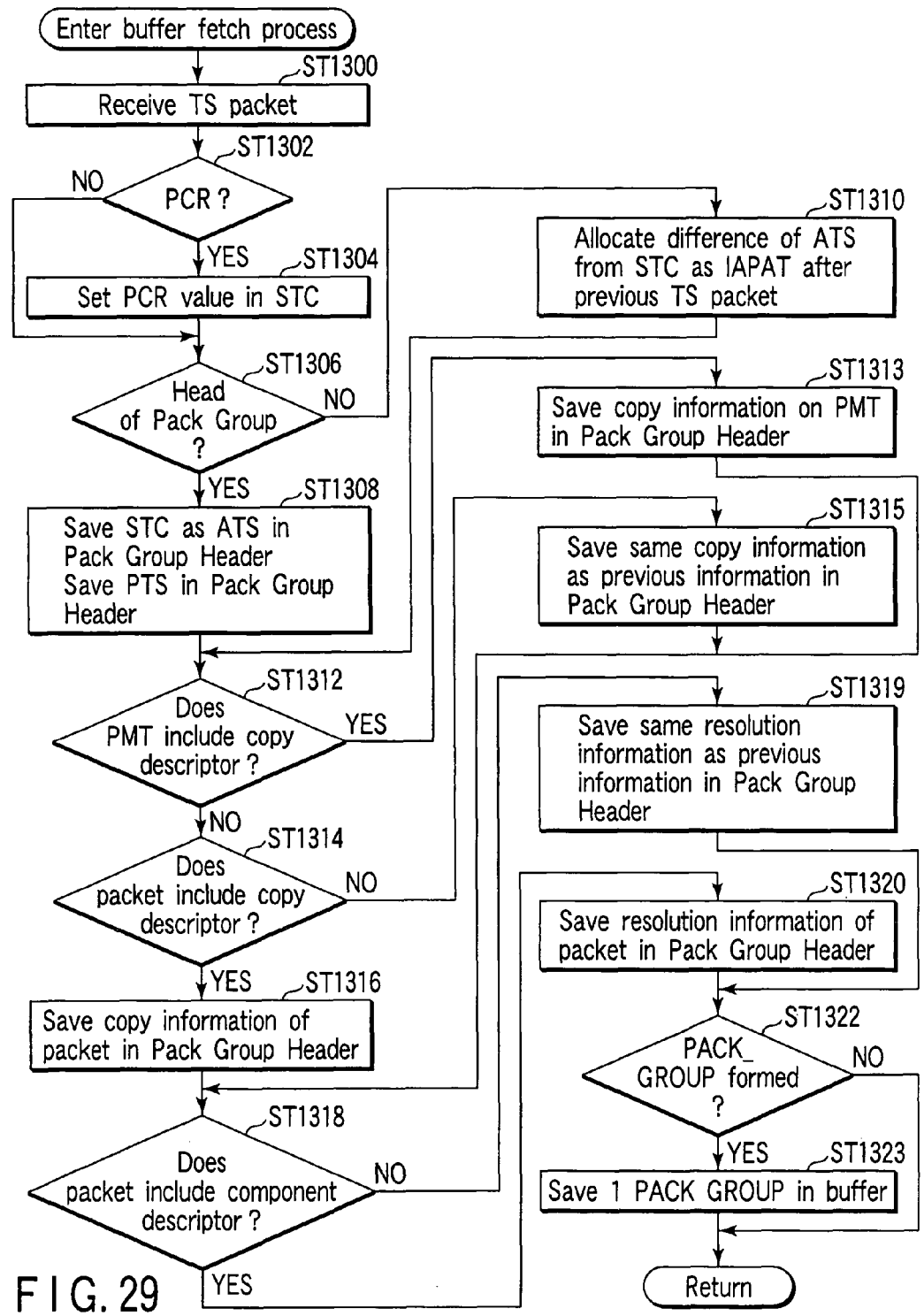
FIG. 29 is a flow chart (buffer fetch process flow) for explaining an example of the contents of a buffer fetch process (ST130) shown in FIG. 27.

FIG. 29 is a flow chart (buffer fetch process flow) for explaining an example of the contents of the buffer fetch process (ST130) shown in FIG. 27.

<01> A TS packet is received (step ST1300).

<02> If the fetched TS packet includes a PCR (YES in step ST1302), STC unit 102 is corrected (step ST1304).

<03> If the packet of interest corresponds to the head of a pack group (YES in step ST1306), its arrival time is fetched from the STC and is saved as ATS data (step ST1308). If the packet of interest does not correspond to the head of a pack group (NO in step ST1306), the difference between the value of the ATS of the head packet and its arrival time is allocated as IAPAT data before that TS packet (after the previous TS packet) (step ST1310).

<04> It is checked if the PMT that has been fetched initially and belongs to the current stream includes copy information. If the PMT includes copy information (YES in step ST1312), copy control information CCI (FIG. 16) is formed based on that information (FIGS. 36 and 37) and is saved in the pack group header (step ST1313) so as to write all pieces of information in the pack group header.

<05> If the PMT does not include any copy information (NO in step ST1312), and if the received TS packet does not include any copy descriptor (NO in step ST1314), copy information is formed based on the same information as that of the previous pack (step ST1315). If the received TS packet includes a copy descriptor (YES in step ST1314), copy control information CCI (FIG. 16) is formed based on that information and is saved in the pack group header (step ST1316).

<06> It is checked if the TS packet includes a component descriptor (FIG. 39). If the TS packet does not include any component descriptor (NO in step ST1318), the same information as that of the previous pack is saved in the pack group header (step ST1319). If the TS packet includes a component descriptor (YES in step ST1318), resolution information (FIG. 17) is formed based on the included information (FIG. 39), and is saved in the pack group header (step ST1320).

<07> It is determined whether or not a pack group is formed (more specifically, whether or not 85 TS packets are grouped). If a pack group is not formed yet (NO in step ST1322), the control returns to the head of buffer fetch process ST130; otherwise (YES in step ST1322), group data is temporarily saved in buffer RAM 91 (step ST1323).

If the head of a picture is included in a group, the PTS is saved with reference to the contents of the TS packet. If the TS packet contains no video data but audio data alone, CCI is formed in accordance with audio copy information. Furthermore, the availability of each information is detected and is saved in work RAM 80A. Upon completion of recording, the information saved in work RAM 80A is recorded on management information recording area 130 as management information (ST150 in FIG. 27).

Upon playback, demultiplexer 60 interprets pack data read out from disc 100 (or HDD 100a) and sends a pack that includes TS packets to TS packet transfer unit 101. After that, the readout pack data are sent to respective decoders (61, 63, 64) and undergo corresponding playback processes (video playback, sub-picture playback, audio playback).

Upon transferring TS packets to STB unit 83 (or to an external digital TV or the like via IEEE1394 I/F 74), TS packet transfer unit 101 transfers data of only TS packets at the same time intervals as they arrived.

Figure 31:
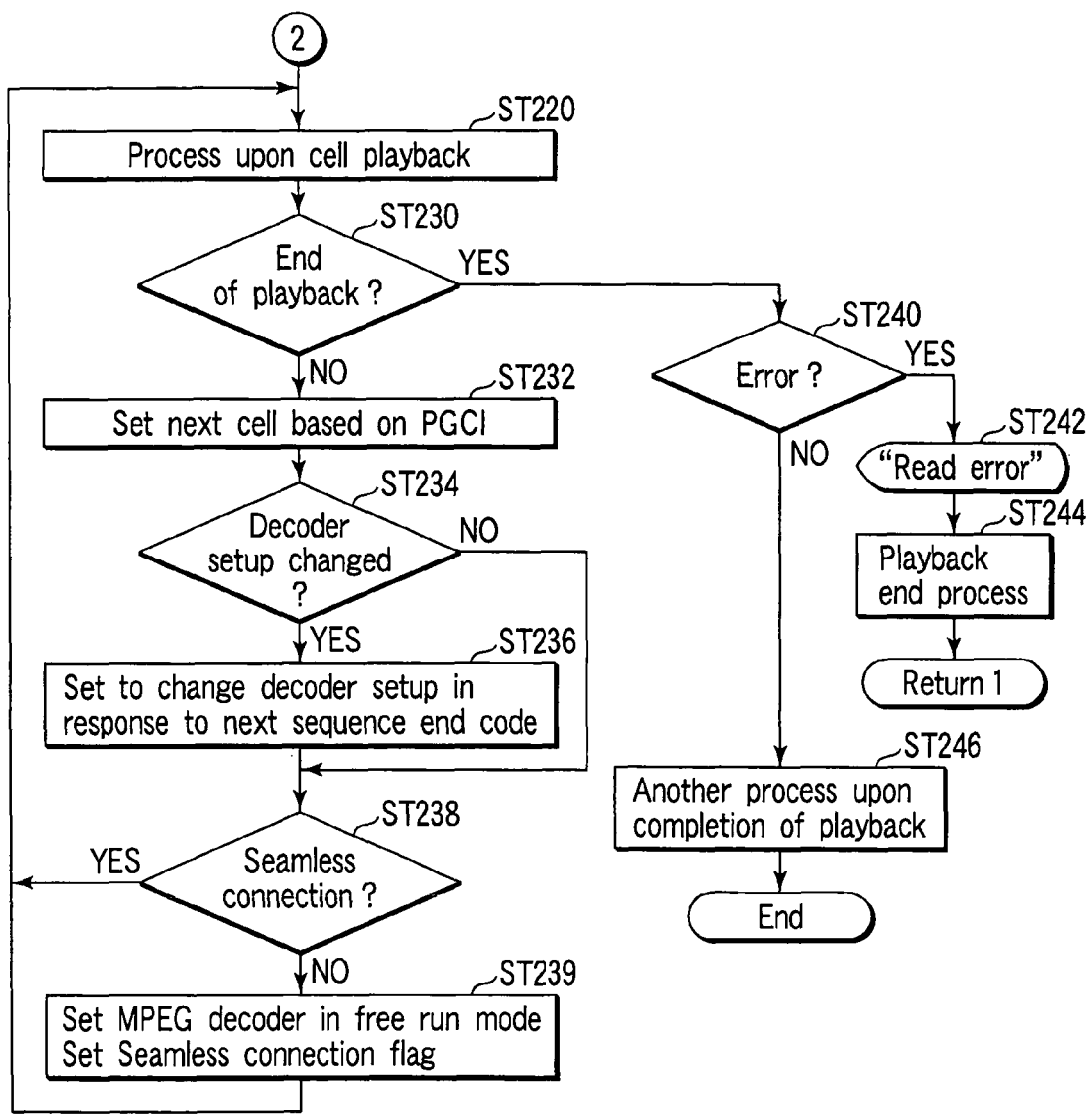
FIG. 31 is a flow chart (overall playback operation flow) for explaining an example of a playback operation (part 2) of the apparatus shown in FIG. 20.

FIGS. 30 and 31 are flow charts (overall playback operation flow) for explaining an example of the playback operation (ST24 in FIG. 24) of the apparatus shown in FIG. 20.

<01> A disc check process is made (step ST200) to check if the disc is a rewritable disc (R, RW, RAM). If the disc is not a rewritable disc (NO in step ST200), a message that advises accordingly is returned (step ST202), thus ending the process.

<02> If the disc is a rewritable disc (YES in step ST200), the file system of the disc is read out to check if data has already been recorded (step ST204). If no data is recorded (NO in step ST204), a message "no data is recorded" is displayed (step ST206), thus ending the process.

<03> If data has already been recorded (YES in step ST204), management information (VMG-file) 130 is loaded (step ST208) to determine programs and cells to be played back (by prompting the user to select them), and also to determine the playback start file pointer (logical address) (step ST210). If a playback process in the recorded order is selected, playback is made according to ORG_PGCI (e.g., 1330 in FIG. 10). If a playback process for respective programs is to be made (in the sequence of user's choice), playback is made according to UD_PGCI (or play list 1342 in FIG. 12) with a number corresponding to the program to be played back.

<04> A process upon starting playback is executed (step ST212).

<05> Initial setups of respective decoders are made (step ST214).

<06> A cell playback process (to be described later with reference to FIGS. 32 and 33) is executed (step ST220). It is checked if playback is to end (step ST230). If playback is to end (YES in step ST230), an error check process is executed (step ST240). If any error is found (YES in step ST240), a message that advises accordingly is displayed (step ST242), and a playback end process is executed (step ST244). If no error is found (NO in step ST240), a playback end process is executed (step ST246), thus ending this operation.

<07> If playback is not to end (NO in step ST230), the next cell is determined based on PGCI (step ST232) and it is checked if setups of decoders (61, 64, and the like) are changed (step ST234). If the setups are changed (YES in step ST234), change attributes are set in the decoders so as to change decoder setups in response to the next sequence end code (step ST236). After that, it is checked connection from playback of the previous cell to that of the next cell is seamless. If connection is not seamless (NO in step ST238), MPEG decoders (61 and the like) are set in a free run mode and a seamless connection flag is set (step ST239). The flow then returns to step ST220. If connection is seamless (YES in step ST238), the flow returns to step ST220.

<08> During the cell playback process (step ST220), it is checked if playback is to end (step ST230). If playback is not to end, the process in step ST220 is continued.

FIGS. 32 and 33 are flow charts (process flow upon cell playback) for explaining an example of the process upon cell playback in the apparatus shown in FIG. 20. The cell playback process is executed as follows.

<01> A start file pointer (logical block address) and end address file pointer (logical block address) of a cell are determined on the basis of program chain information PGCI and map information MAPI. A start FP (file pointer) of the cell is substituted in a read FP (file pointer), and a value obtained by subtracting the start file pointer from the end file pointer is set in a remaining cell length (step ST2200).

<02> In decoder unit 59, a setup is made to execute a decode process. At this time, the PID of a TS packet to be played back is set to determine a target to be decoded. Note that the PID to be set is loaded from the PMT in ESOBI. In case of ESOB data for a plurality of streams, the PID is determined using a program number in cell information.

<03> A read process during playback is executed to determine the read address and read size based on the start file pointer (step ST2202).

<04> The read size to be read out is compared with the remaining cell length. If the remaining cell length is larger than the read size (YES in step ST2204), a value obtained by subtracting the read size to be read out from the remaining cell length is set as the remaining cell length (step ST2206). If the remaining cell length is smaller than the read size (NO in step ST2204), the read size is set to be the remaining cell length, and the remaining cell length is set to be zero (step ST2208).

<05> The read length is set to be a read unit length, and the read address, read length, and read command are set in disc drive unit 51 (step ST2210). After that, transfer of readout data from disc drive unit 51 to D-PRO unit 52 starts (step ST2212).

<06> The control waits until readout data for one ESOBU are stored (in a buffer RAM (not shown) in D-PRO unit 52) (a loop formed if NO in step ST2214). If data for one ESOBU are stored (YES in step ST2214), the flow advances to step ST2216.

<07> In decoder unit 59, readout pack group data is received by demultiplexer 60 (step ST2216) and is demultiplexed into packets. In accordance with the stream ID and sub-stream ID, video packet data (MPEG video data) are transferred to video decode unit 61, audio packet data are transferred to audio decode unit 64, and sub-picture packet data are transferred to SP decode unit 63. TS transfer unit 101 converts readout pack group data into an elemental stream, and sends it to respective decoders (61, 64) via an internal bus, thus executing decode processes.

If the resolution of the video signal is changed (e.g., an SD signal is switched to an HD signal during playback) during the transfer process (YES in step ST2218), the control line of a D terminal arranged between D/A converter 67 and external TV 68 is changed (e.g., from D1 mode to D3 mode) (step ST2220).

If the seamless connection flag is set (YES in step ST2222), read file pointer+read length is set in the read file pointer, MPEG decoder 61 is set in a normal mode (to read and set SCR), and the seamless connection flag is set (step ST2224).

<08> During playback, the contents of STC 102 are displayed on display unit 104 as a playback time. If STB unit 83 can display a playback time based on the PTS in video data, that time can be used.

<09> It is checked if transfer is complete. If transfer does not start (NO in step ST2226), the flow returns to step ST2214.

<10> After the processes in steps ST2214 to ST2222, the sum of the read FP and the read length set in step ST2210 is substituted in the read FP (step ST2224).

<11> It is checked if transfer is complete. If transfer is complete (YES in step ST2226), the remaining cell length is checked. If the remaining cell length is not "00" (NO in step ST2228), the flow returns to step ST2202; otherwise, (YES in step ST2228), this process ends.

<12> If transfer is not complete yet (NO in step ST2226), it is checked if a key input is detected (step ST2230). If a special playback process is to be made (YES in step ST2232 or YES in step ST2236), its direction is set, read file pointer FP is calculated using map information MAPI, and a read process upon special playback (steps ST2234 and ST2238) is executed, thus ending this process. If no special playback process is to be made (NO in step ST2232, NO in step ST2236), the flow returns to step ST2214.

Target file pointer FT of special playback is calculated based on map information MAPI to skip a predetermined period of time. At this time, a method of calculating FP by skipping a predetermined number of ESOBU data in place of the predetermined period of time is available. If the end of a given cell is reached, the next cell information is read out based on program chain information PGCI, an ESOB number and MAPI that the next cell uses are selected, and the read FP is calculated similarly. If no cell to be played back remains, the process ends at that time.

Figure 34:
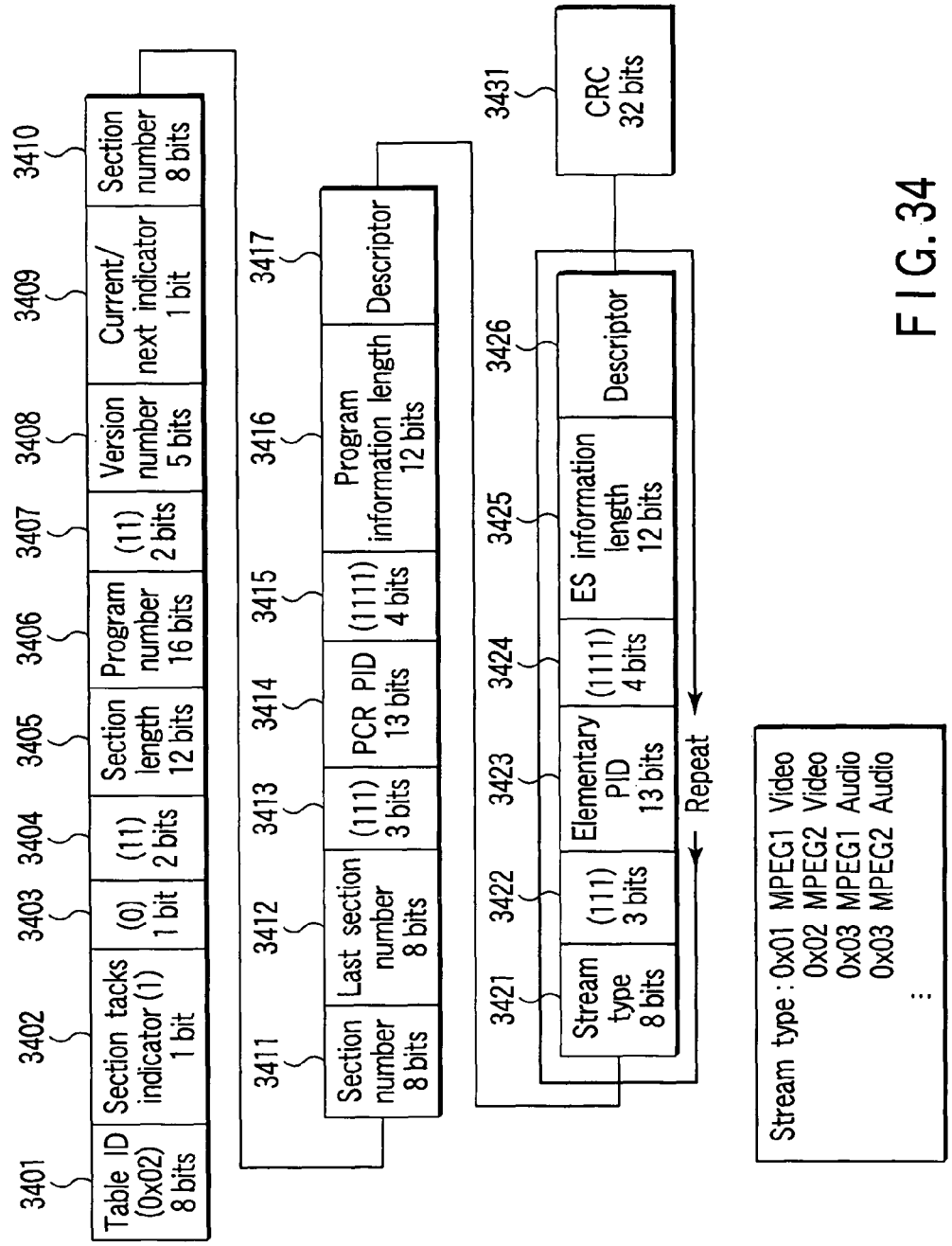
FIG. 34 is a view for explaining an example of the data structure of a program map table (PMT) that can be used by the apparatus shown in FIG. 20.

FIG. 34 is a view for explaining an example of the data structure of program map table PMT which can be used by the apparatus of FIG. 20. In this PMT, 8-bit stream type 3421 allows to identify various streams. For example, if the stream type is "0x01", it indicates an MPEG1 video stream; if the stream type is "0x02", it indicates an MPEG2 video stream (in case of Hi-Vision); if the stream type is "0x03", it indicates an MPEG1 audio stream; and if the stream type is "0x04", it indicates an MPEG2 audio stream (in case of AAC multichannel audio).

FIG. 35 is a view showing an example of the contents of a digital copy control descriptor that can be used in the PMT in FIG. 34 and the like (service description table SDT, event information table-EIT, and the like).

In this descriptor, a "descriptor tag" field is set to be, e.g., "0xC1", and a "descriptor length" field indicates the descriptor length. A "digital recording control" field describes "copy generation control data". A "maximum bit rate flag" field describes "whether or not the maximum transfer rate of the service of interest is to be described". If the maximum transfer rate is not described, the flag is set to be, e.g., "0"; otherwise, the flag is set to be, e.g., "1". When "0" is described in a "component control flag" field, for example, the overall program is specified (in case of PMT). If "1" is described in this field, another state is described. A "copy control type" field describes "copy generation control data" (see FIGS. 36 and 37). An "APS control data" field describes "analog output control data" (see FIG. 36). A "maximum bit rate" field describes a "maximum transfer rate" (when the maximum bit rate flag is "1").

FIG. 36 is a view for explaining an application example of digital copy control to video data. Copy control of video data is roughly categorized into three types, i.e., "unlimited copy permission (copy free)", "copy inhibition (copy never or copy no more)", and "copy permission of only one generation (copy once)".

In case of "unlimited copy permission", analog copy control is set to be "unlimited copy permission", digital recording control is set to be, e.g., "01", control type is set to be, e.g., "00", and APS control data is set to be, e.g., "Don't care (ignore)".

In case of "copy inhibition", (1) analog copy control is set to be "copy inhibition (digital copy is inhibited, but analog copy is not inhibited since no copy protection pulses of the Macrovision (system are inserted)", digital recording control is set to be, e.g., "01", control type is set to be, e.g., "11", and APS control data is set to be, e.g., "00".

In case of "copy inhibition", (2) analog copy control is set to be "copy inhibition (both analog copy and digital copy are inhibited)", digital recording control is set to be, e.g., "01", control type is set to be, e.g., "11", and APS control data is set to be, e.g., "other than 00".

In case of "copy permission of only one generation", (3) analog copy control is set to be "copy permission of only one generation (analog copy is permitted since no copy protection pulses are inserted)", digital recording control is set to be, e.g., "01", control type is set to be, e.g., "10", and APS control data is set to be, e.g., "00".

In case of "copy permission of only one generation", (4) analog copy control is set to be "copy permission of only one generation (both analog copy and digital copy of the next and subsequent generation are inhibited)", digital recording control is set to be, e.g., "01", control type is set to be, e.g., "10", and APS control data is set to be, e.g., "00".

FIG. 37 is a view for explaining an application example of digital copy control to audio data. Copy control of audio data is also roughly categorized into three types, i.e., "unlimited copy permission (copy free)", "copy inhibition (copy never or copy no more)", and "copy permission of only one generation (copy once)".

In case of "unlimited copy permission", digital recording control is set to be, e.g., "01/11", and control type is set to be, e.g., "00".

In case of "copy permission of only one generation", digital recording control is set to be, e.g., "01/11", and control type is set to be, e.g., "10".

In case of "copy inhibition", digital recording control is set to be, e.g., "01/11", and control type is set to be, e.g., "11".

FIG. 38 is a view showing an example of the contents of a component descriptor that can be used by the PMT shown in FIG. 34 and the like (event information table EIT and the like).

In this descriptor, a "descriptor tag" field is set to be, e.g., "0x50", and a "descriptor length" field indicates the descriptor length. A "stream contents" field describes, e.g., "0x01" indicating video. A "component type" field describes, e.g., a "type of component". A "component tag" field describes, e.g., a "common tag in a program". An "ISO_639 language code" field describes, e.g., "jpn" indicating a Japanese language code. A "Text_Char" field can describe character strings such as "video", "audio", and the like.

FIG. 39 is a view for explaining an example of the contents of component types shown in FIG. 38. When the component type is "0x01", it indicates, e.g., that "video=480 interlaced (or 525 interlaced) and aspect ratio=4:3". When the component type is "0x03", it indicates, e.g., that "video=480 interlaced (or 525 interlaced), aspect ratio=16:9, and pan vector none". When the component type is "0x04", it indicates, e.g., that "video=480 interlaced (or 525 interlaced) and aspect ratio>16:9 (e.g., wide screen with cinema scope size)".

When the component type is "0xA1", it indicates, e.g., that "video=480 progressive (or 525 progressive) and aspect ratio=4:3". When the component type is "0xA3", it indicates, e.g., that "video=480 progressive (or 525 progressive), aspect ratio=16:9, and pan vector=none". When the component type is "0xA4", it indicates, e.g., that "video=480 progressive (or 525 progressive) and aspect ratio>16:9 (e.g., wide screen with cinema scope size)".

When the component type is "0xB1", it indicates, e.g., that "video=1080 interlaced (or 1125 interlaced) and aspect ratio=4:3". When the component type is "0xB3", it indicates, e.g., that "video=1080 interlaced (or 1125 interlaced), aspect ratio=16:9, and pan vector=none". When the component type is "0xB4", it indicates, e.g., that "video=1080 interlaced (or 1125 interlaced) and aspect ratio>16:9 (e.g., wide screen with cinema scope size)".

Figure 40:
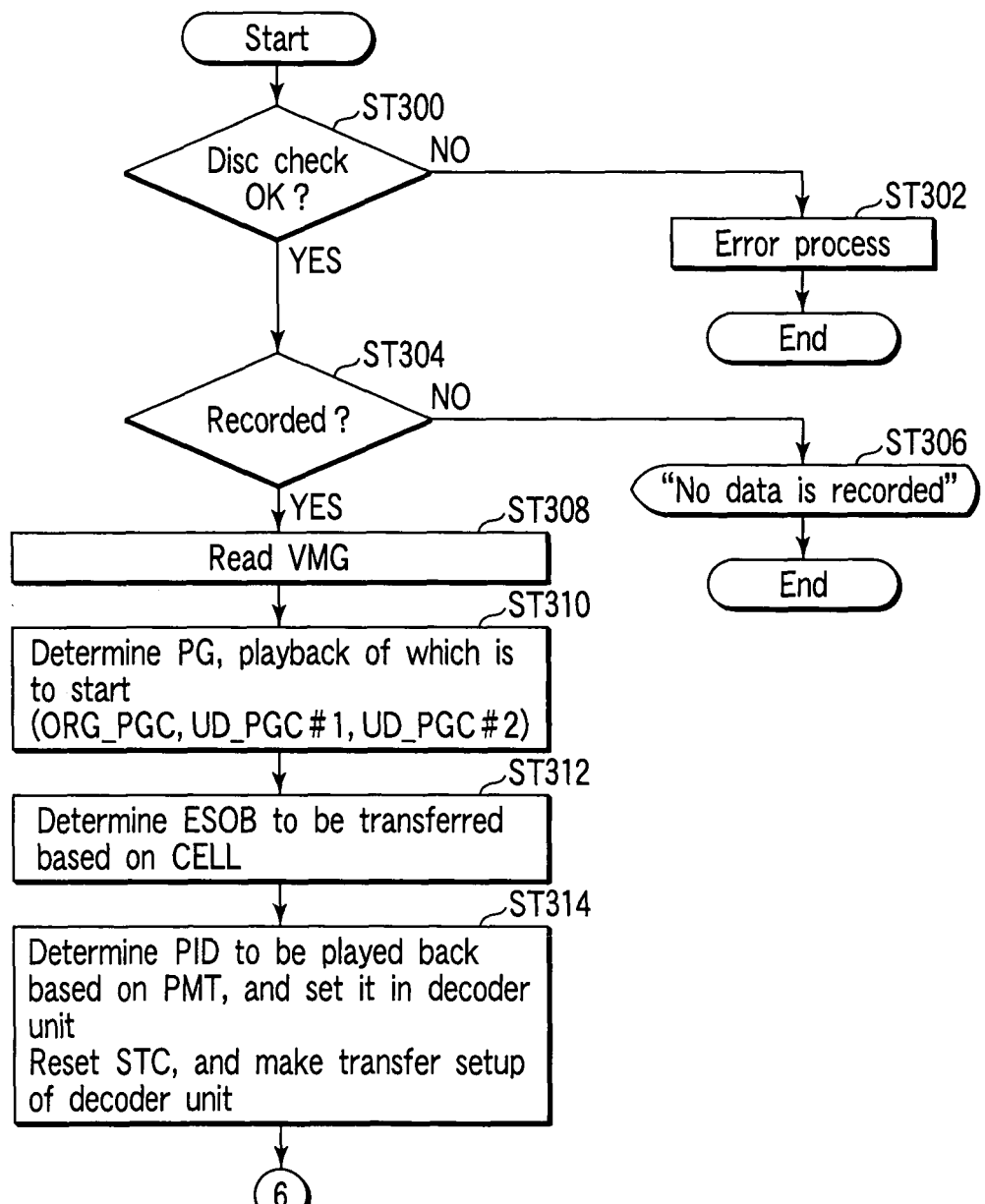
FIG. 40 is a flow chart (overall transfer operation flow) for explaining an example of the overall data transfer operation (part 1) in the apparatus shown in FIG. 20.
Figure 41:
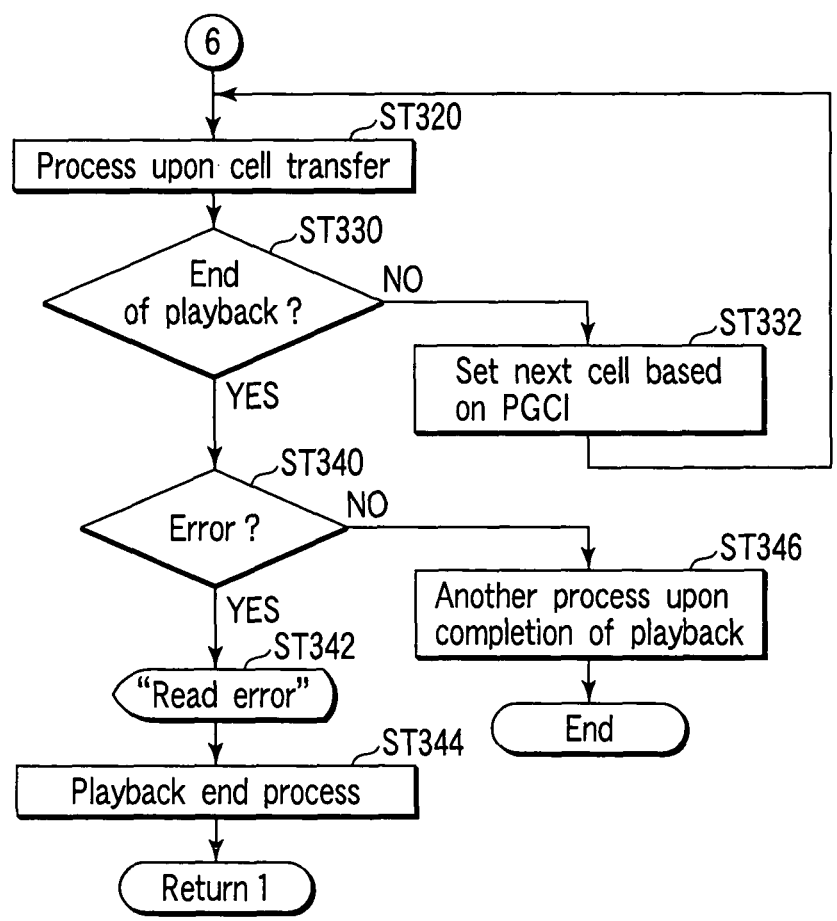
FIG. 41 is a flow chart (overall transfer operation flow) for explaining an example of the overall data transfer operation (part 2) in the apparatus shown in FIG. 20.

FIGS. 40 and 41 are flow charts (overall transfer operation flow) for explaining an example of the overall data transfer operation in the apparatus shown in FIG. 20. Steps ST300 to ST312 in FIG. 40 are the same processes as those in steps ST200 to ST212 shown in FIG. 30 above. In step ST314 in FIG. 40, the PID to be played back is determined based on the PMT, and is set in decoder unit 59. Also, STC 102 is reset, and a transfer setup is made in decoder unit 59. After that, a process upon cell transfer starts (step ST320). Steps ST320 to ST346 in FIG. 41 are the same processes as those in steps ST220 to ST246 in FIG. 31 above. In FIG. 41, however, processes corresponding to steps ST234 to ST239 in FIG. 31 are not executed.

As can be seen from comparison between FIGS. 30 and 31 and FIGS. 40 and 41, a process for externally transferring data is substantially the same as a normal playback process, except for the following difference in contents. That is, in the process shown in FIGS. 40 and 41, TS packet transfer unit 101 calculates the transfer time based on the ATS in a pack group and outputs TS packets within a time corresponding to the calculated transfer time in the cell playback process. Also, the PCR is read out based on PCR location information to adjust the time of STC 102 (STC reset in step ST314), thus synchronizing internal clocks (STC) and external clocks (PCR). In this manner, the user can designate a playback point on a time basis in the cell playback process of data recorded by stream recording.

Figure 42:
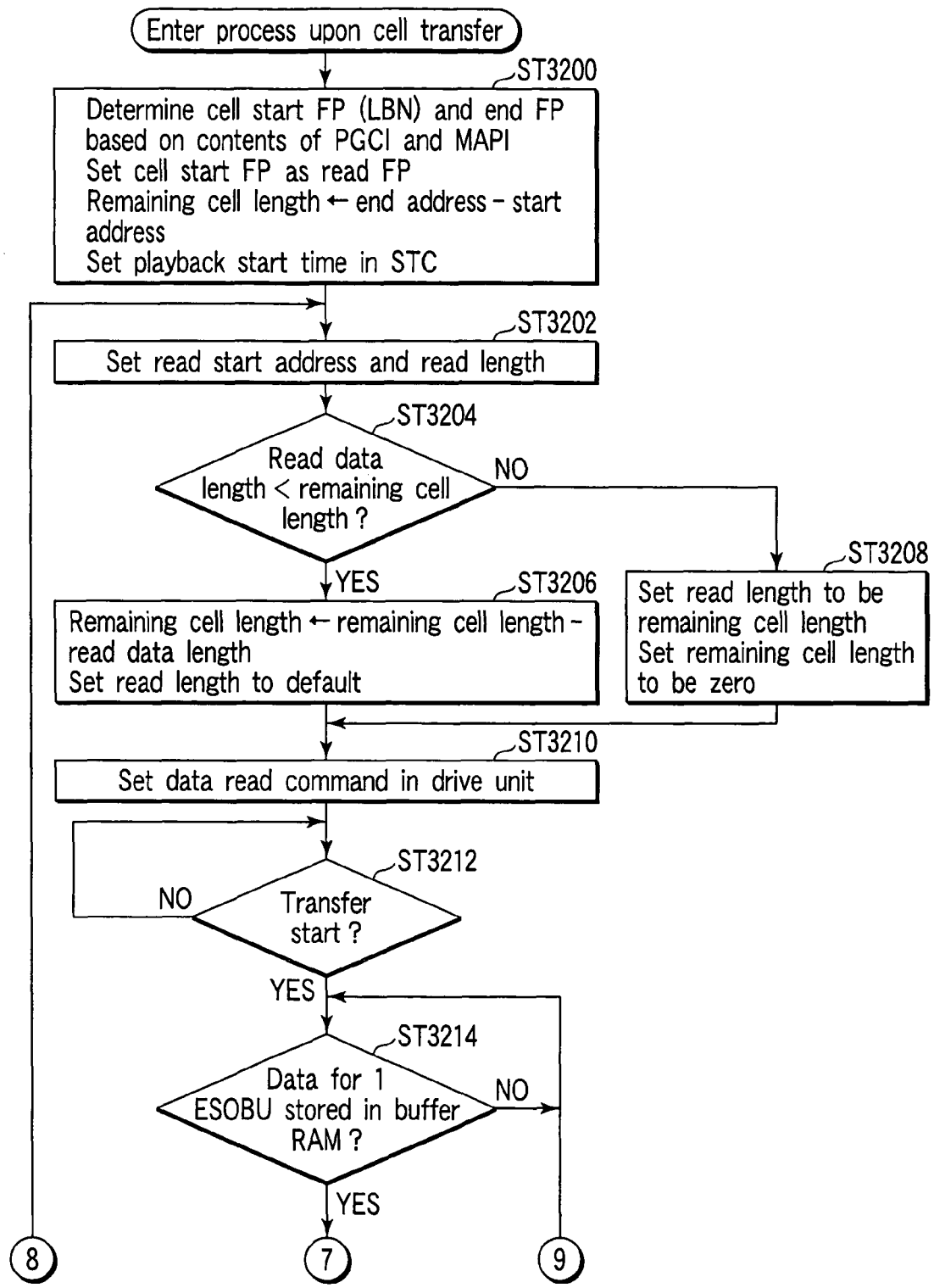
FIG. 42 is a flow chart (process flow upon cell transfer) for explaining an example (part 1) of the process upon cell transfer (ST320) shown in FIG. 41.
Figure 43:
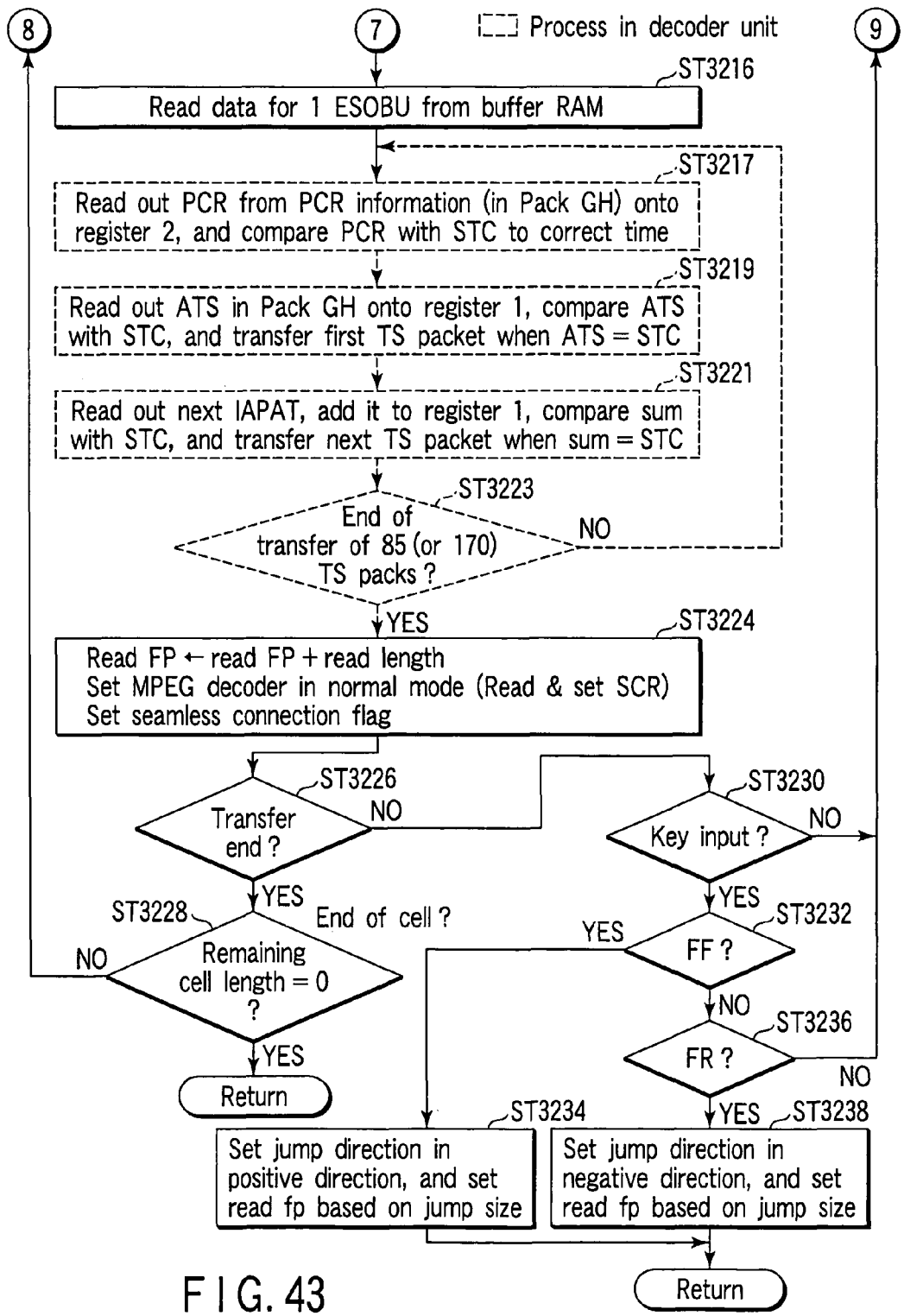
FIG. 43 is a flow chart (process flow upon cell transfer) for explaining an example (part 2) of the process upon cell transfer (ST320) shown in FIG. 41.

FIGS. 42 and 43 are flow charts (process flow upon cell transfer) for explaining an example of the process upon cell transfer (ST320) shown in FIG. 41. Steps ST3200 to ST3214 in FIG. 42 are the same processes as those in steps ST2200 to ST2214 in FIG. 32 above. Also, steps ST3216 to ST3238 in FIG. 43 are the same processes as those in steps ST2216 to ST2238 in FIG. 33 above, except for steps ST3217 to ST3224.

Steps ST3216 to ST3238 in FIG. 43 are processed by decoder unit 59 in FIG. 20. The PCR location is detected based on PCR information 156 in pack group header 161 shown in FIG. 14 and the like, and that PCR is read out onto register 2 (not shown). The PCR in register 2 is compared with the count value of STC 102. If they are different, the count value (corresponding to the playback time) of STC 102 is corrected (step ST3217). Next, ATS 151 in pack group header 161 is read out onto register 1 (not shown). The ATS in register 1 is compared with the count value of STC 102. If they match, the first TS packet is transferred (step ST3219). After that, the next IAPAT is read out and is added to the contents of register 1 (not shown). The sum is compared with the count value of STC 102, and when the two values match, the next TS packet is transferred (step ST3221).

To summarize the above description, the calculation associated with TS packet output can be made by the following method. That is, the first TS packet in a pack group is output when the ATS in the header matches the STC value. As for the second and subsequent TS packets, the sum of the ATS and IAPAT immediately before the TS packet of interest is compared with the value of STC 102, and the packet of interest is output when they match.

The above processes (steps ST3217 to ST3221) are repeated 85 times (NO in step ST3223) in case of pack group 140 shown in FIG. 14. Upon completion of transfer of 85 TS packets (YES in step ST3223), the next process in step ST3224 (the same process as in step ST2224 in FIG. 33) is executed. The subsequent processes are the same as those in FIG. 33.

Figure 44:
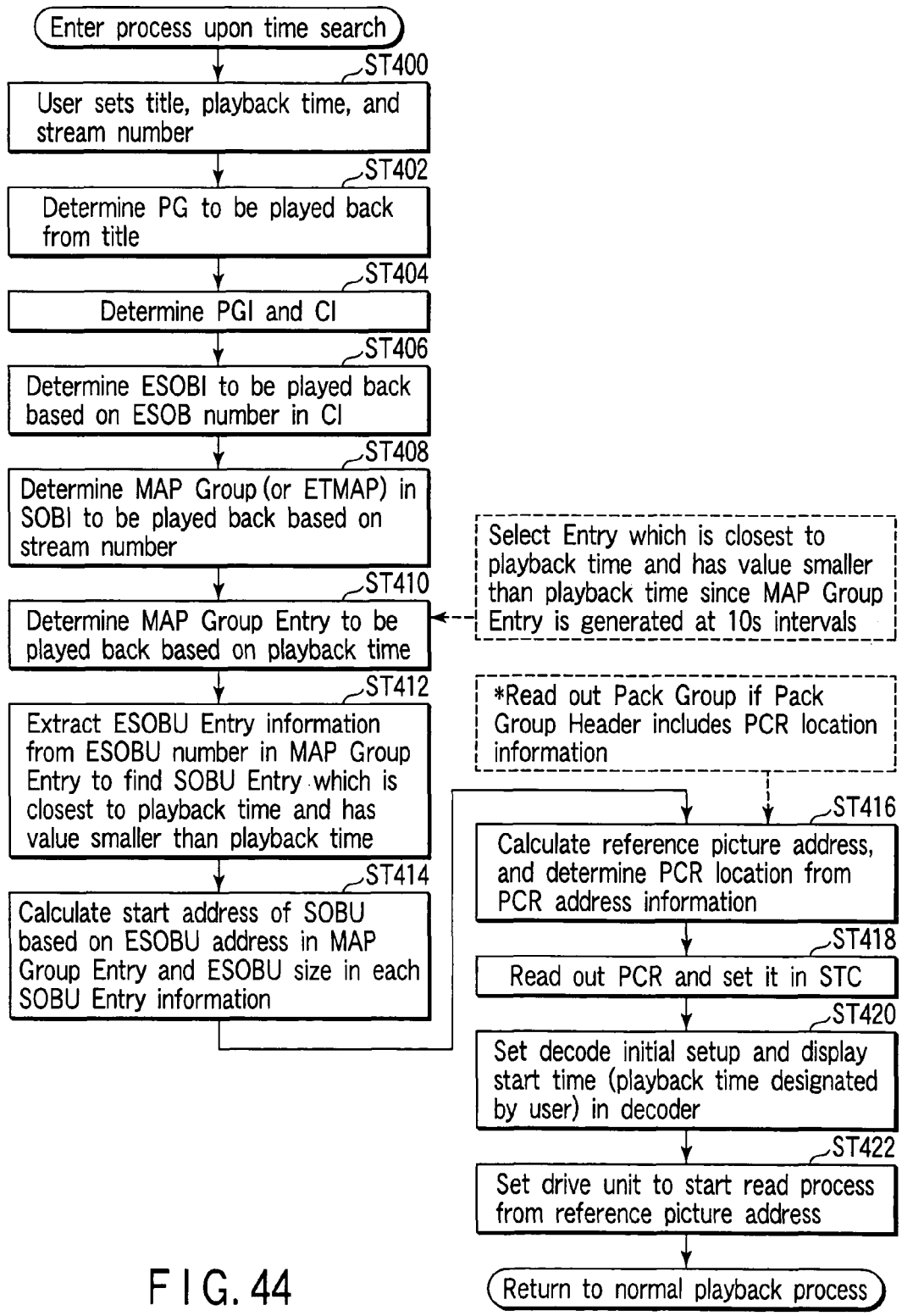
FIG. 44 is a flow chart (process flow upon time search) for explaining an example of a time search process (a search conducted based on a playback time designated by the user) with respect to already recorded stream information of a digital TV broadcast program or the like in the apparatus shown in FIG. 20.

FIG. 44 is a flow chart (process flow upon time search) for explaining an example of a time search process (a search conducted based on a playback time designated by the user) with respect to the already recorded stream information of a digital TV broadcast program or the like in the apparatus shown in FIG. 20.

<01> The user selects and determines a target title, playback start time, stream number (1 in case of one stream) (step ST400).

<02> Program chain PGC, programs PG, and cells to be played back are determined based on the information of user's choice, and corresponding program chain information PGCI, program information PGI, and cell information CI are read out from management information (PGCI in FIG. 10) (steps ST402 to ST404).

<03> ESOBI to be played back is determined based on a corresponding ESOB number (FIG. 11 or 13) in readout cell information CI (step ST406). Also, a map group number (e.g., MAP_Group#n in FIG. 6) in the ESOBI (e.g., ESOBI#1 in FIG. 6) to be played back is determined based on the stream number in the readout management information (ESFIT in FIG. 4) (step ST408).

<04> After a map group is determined in correspondence with the above map group number, a map group entry which is closest to the playback time and has a value smaller than the playback time is determined, and information (FIG. 7) of a map entry is read out (step ST410). Note that map group entries are assured at 10-sec intervals (as in video recording).

<05> A corresponding ESOBU entry (e.g., ESOBU_ENT#1 in FIG. 8) is read out based on the ESOBU number (ESOBU_ENT_NUMs in FIG. 7) in the map entry information. The ESOBU playback time (ESOBU_PB_TM in FIG. 8; the number of frames) is added to the playback time in the map group entry information to determine an ESOBU entry which is closest to the target playback time and has a value smaller than the target playback time (step ST412).

At this time, respective ESOBU sizes (ESOBU_SZ in FIG. 8) to a target ESOBU are summed up on the basis of ESOBU address information in the map entry information and ESOBU data designated by the map entry information, thus calculating an ESOBU address (step ST414).

<06> An address from which playback is to start is calculated on the basis of the address of a reference picture (I-picture) in the target ESOBU entry information and the target ESOBU address (step ST416). At this time, if a pack group header (FIG. 14) includes PCR information, the pack group header is read out.

<07> A PCR address is calculated based on the PCR information to load the PCR, and the PCR is set in STC 102 (step ST418)<

<08> Decoder unit 59 undergoes a decode initial setup process (step ST420) to set a display start time to be a target playback time.

<09> An instruction is issued to disc drive unit 51 to read out recorded data from the address calculated in step ST414, thus starting a data read process.

<10> After playback starts, the control then enters a normal playback process (e.g., a cell playback process in FIGS. 32 and 33 and the like).

The process in FIG. 44 is an example of special playback on a playback time basis in stream recording, which can be implemented since the data structure of the present invention has PCR location information (156 in FIG. 14 and/or 132234 in FIG. 8).

Figure 45:
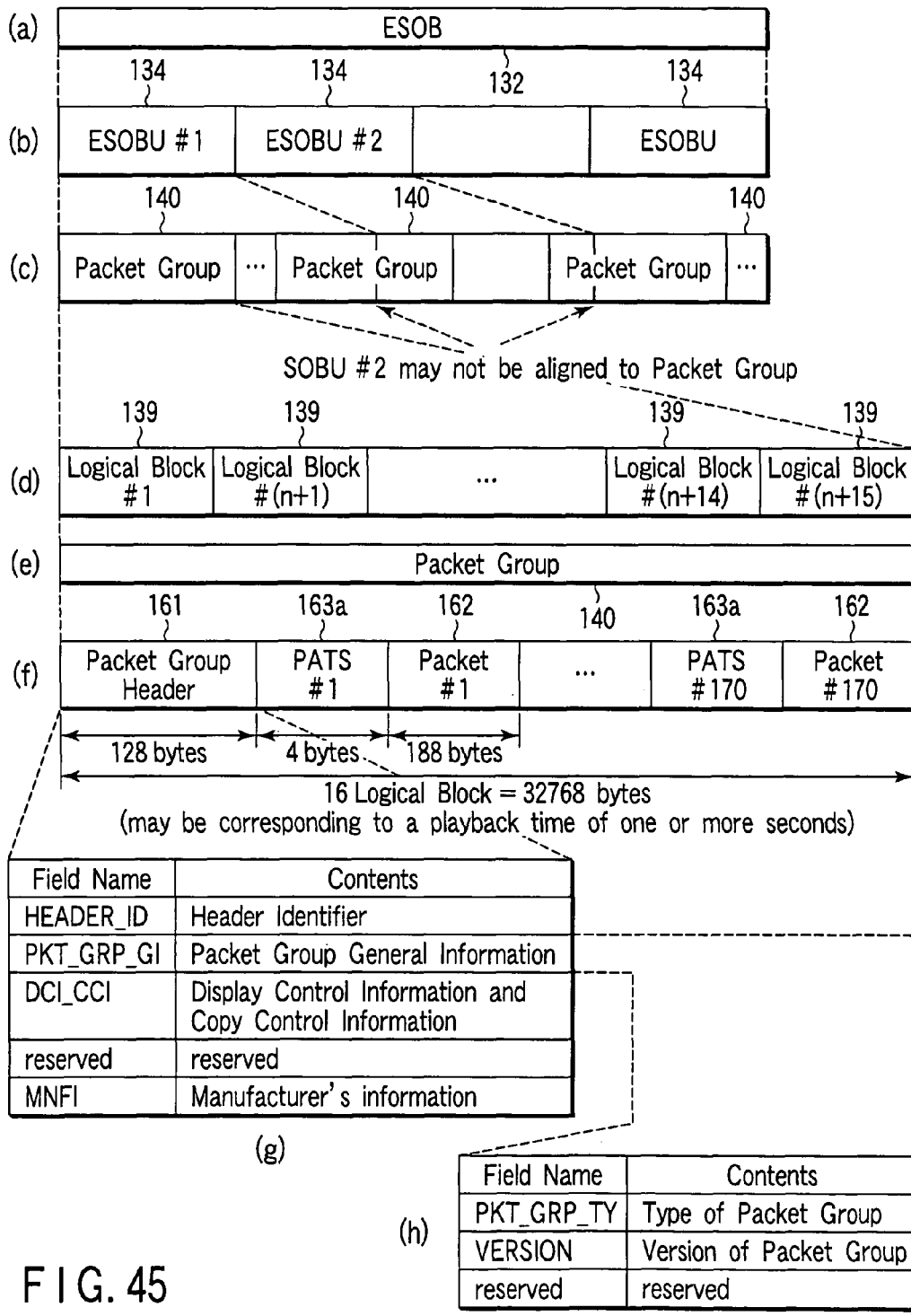
FIG. 45 is a view for explaining another example of the configuration of a data unit (ESOBU) for the stream object (ESOB)

FIG. 45 is a view for explaining another example of the configuration of a data unit (ESOBU) for the stream object (ESOB). The data structure of FIG. 45 may be used in place of that of FIG. 14. In the data structure of FIG. 45, extended stream object ESOB 132 is formed of a plurality of extended stream object unit ESOBU 134 (see FIG. 45(*a*)(*b*)). Each ESOBU 134 includes one or more packet groups 140 (see FIG. 45(*b*)(*c*)). Here, the boundary between adjacent ESOBUs (e.g., the boundary between ESOBU#1 and ESOBU#2, and/or that between ESOBU#2 and ESOBU#3) may not be corresponding to the boundary between adjacent packet groups 140. In other words, in the example of FIG. 45, ESOBU#2 are not aligned to any of packet groups 140 (see FIG. 45(*b*)(*c*)).

Each packet group 140 corresponds to a plurality of logical blocks 139. In the example of FIG. 45(*c*)(*d*)(*e*), one packet group 140 corresponds to 16 logical blocks. The size of one packet group 140 may be corresponding to a playback time of one or more seconds. Packet group 140 is formed of packet group header 161 and a subsequent pairs of time stamp items (PATS) 163*a* and packets (MPEG-TS) 162. In the example of FIG. 45, one packet group 140 includes one packet group header 161 and 170 pairs of PATSs 163*a* and packets 162 (see FIG. 45(*e*)(f)).

Packet group header 161 is configured to include header identifier HEADER_ID, packet group general information PKT_GRP_GI, display control information and copy control information DCI_CCI, and manufacturer's information MNFI (FIG. 45(*g*)). Packet group general information PKT_GRP_GI is configured to include packet group type information PKT_GRP_TY, and packet group version information VERSION (FIG. 45(*h*)).

FIG. 46 is a view for explaining another example of the configuration of management information (EHDVR_MG) recorded on AV data management information recording area 130 shown in FIG. 1. The data structure of FIG. 46 may be used in place of (or may be used with) that of FIG. 3 to FIG. 13. In the data structure of FIG. 46, extended high definition video recording manager EHDVR_MG is configured to include extended high definition video recording manager information EHDVR_MGI, extended movie AV file information table EM_AVFIT, extended still picture AV file information table ES_AVFIT, extended stream file information table ESTR_FIT, extended original program chain information EORG_PGCI, extended user defined program chain information table EUD_PGCIT (which is necessary when at least one extended user defined PGC exists), extended text data manager ETXTDT_MG, extended manufacturer's information table EMNFIT, extended video time amp information table EVTMAPIT, and extended stream time map information table ESTMAPIT (FIG. 46(*a*)(*b*)).

Extended high definition video recording manager information EHDVR_MGI is configured to include extended video manager information management table EVMGI_MAT, and extended play list search pointer table EPL_SRPT (FIG. 46(*b*)(*c*)). Extended play list search pointer table EPL_SRPT is configured to include extended play list search pointer table information EPL_SRPTI, and one or more extended play list search pointers #1 to #n (FIG. 46(*c*)(*d*)).

FIG. 47 exemplifies contents of the extended video manager information management table (VMGI_MAT) shown in FIG. 46. Extended video manager information management table VMGI_MAT is configured to include extended video manager identifier VMG_ID, end address EHR_MANGR_EA of those navigation data recorded in control information file EHR_MANGR.IFO, and end address EHDVR_MGI EA of EHDVR_MGI. VMGI_MAT is configured to further include version number VERN of the Book, time zone TM_ZONE, still time STILL_TM for still pictures, character set code CHRS for a primary text, resume marker information RSM_MRKI, disc representative picture information DISC_REP_PICTI, disc representative name DIS- C_REP_NM, start address EM_AVFIT_SA of the extended movie AV file information table, and start address ES_AVFIT_SA of the extended still AV file information table.

VMGI_MAT is configured to further include encrypted title key information ETKI, copy protection scheme information CPSI, and start address ESTR_FIT_SA of the extended stream file information table. VMGI_MAT is configured to further include start address EORG_PGCI_SA of the extended original PGC information, start address EUD_PGCIT_SA of the extended user-defined PGC information table, start address TXTDT_MG_SA of the extended text data manager, start address EMNFIT_SA of the extended manufacturer's information table, last modification time EVTMAP_LAST_MOD_TM of the extended video time map, and last modification time ESTMAP_LAST_MOD_TM of the extended still time map.

FIG. 48 exemplifies contents of the extended play list search pointer (EPL_SRP) shown in FIG. 46. Extended play list search pointer EPL_SRP is configured to include PGC number PGCN, play list creating time PL_CREATE_TM, primary text information PRM_TXTI, item text search pointer number IT_TXT_SRPN for this play list, representative picture information REP_PICTI, extended play list resume marker information EPL_RSM_MRKI, extended play list index EPL_INDEX, and extended play list last modification time EPL_LAST_MOD_TM.

FIG. 49 exemplifies contents of the play list resume marker information (EPL_SRP) shown in FIG. 46. Play list resume marker information EPL_SRP is configured to include cell number CN (describing the cell number in which the picture point exists), picture point PICT_PT (describing the picture point in the target cell), and marking time MRK_TM (describing the time when this marker was made).

FIG. 50 exemplifies contents of the extended movie AV file information table (EM_AVFIT) shown in FIG. 46. Extended movie AV file information table EM_AVFIT is configured to include extended movie AV file information table information EM_AVFITI, one or more extended movie video object stream information EM_NVOB_STI#1 to EM_NVOB_STI#n, and extended movie AV file information EM_AVFI (FIG. 50(a)(b)). Extended movie AV file information EM_AVFI is configured to include EM_AVFI general information EM_AVFI_GI, one or more EM_VOBI search pointers EM_VOBI_SRP#1 to EM_NVOBI_SRP#n, and one or more extended movie VOB information EM_VOBI#1 to EM_VOBI#n (FIG. 50(b)(c)). Each EM_VOBI is configured to include extended movie VOB general information EM_VOB_GI, extended seamless information ESMLI, extended audio gap information EAGAPI, and extended VOB time map information EVOB_TMAPI (FIG. 50(c)(d)). This EVOB_TMAPI may comprise extended VOB time map general information EVOB_TMAP_GI (FIG. 50(d)(e)).

FIG. 51 exemplifies contents of the extended movie video object general information (EM_VOB_GI) shown in FIG. 50. Extended movie video object general information EM_VOB_GI is configured to include VOB type VOB_TY, recording time VOB_REC_TM of this VOB, sub-second information VOB_REC_TM_SUB for VOB_REC_TM, M_VOB_STI number M_VOB_STIN, video start presentation time VOB_V_S_PTM of this VOB, video end presentation time VOB_V_E_PTM of this VOB, and time zone LOCAL_TM_ZONE wherein the VOB has been originally recorded and VOB_REC_TM as well as VOB_REC_TM_SUB have been recorded.

FIG. 52 exemplifies contents of the extended video object time map general information (EVOB_TMAP_GI) shown in FIG. 50. Extended video object time map general information EVOB_TMAP_GI is configured to include number VOBU_ENT_Ns of the VOBU entries, address offset ADR_OFS, and playback time range VOBU_PB_TM_RNG of VOBU. One or more playback time ranges can be specified by VOBU_PB_TM_RNG. For instance, when VOBU_PB_TM_RNG=00 h, the playback time range is 0.4 to 1.0 second. If VOBU_PB_TM_RNG is 01 h, the playback time range may be, e.g., 1.0 to 2.0 seconds. Other time ranges can be specified by VOBU_PB_TM_RNG=10 h or 11h.

Figure 53:
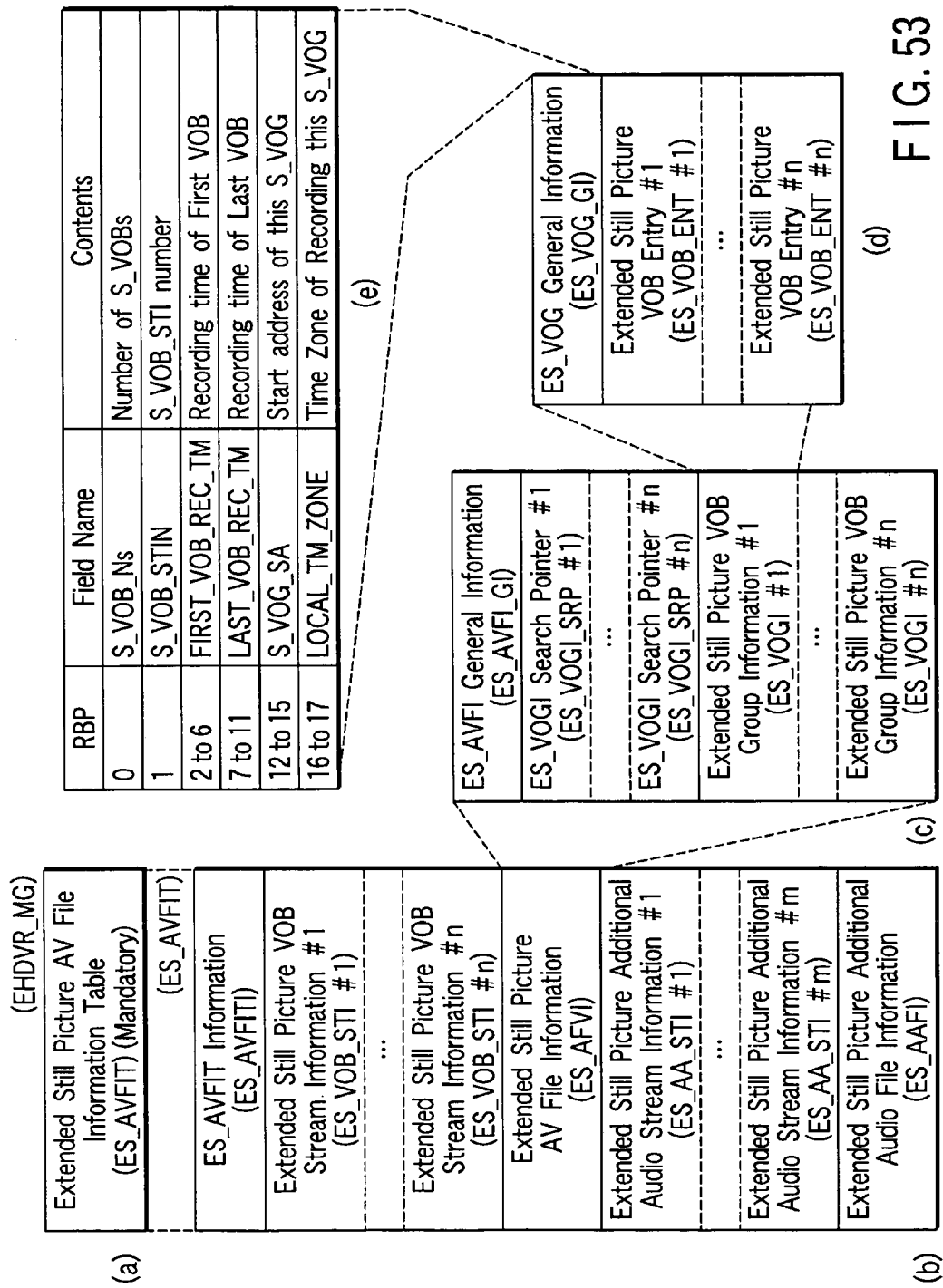
FIG. 53 exemplifies contents of the extended still picture AV file information table (ES_AVFIT) shown in FIG. 46.

FIG. 53 exemplifies contents of the extended still picture AV file information table (ES_AVFIT) shown in FIG. 46. Extended still picture AV file information table ES_AVFIT is configured to include extended S_AVFIT information ES_AVFITI, one or more extended still picture VOB stream information ES_VOB_STI#1 to ES_VOB_STI#n, extended still picture AV file information ES_AVFI, one or more extended still picture additional audio stream information ES_AA_STI#1 to ES_AA_STI#m, and extended still picture additional audio file information ES_AAFI (FIG. 53(a)(b)). Extended still picture AV file information ES_AVFI is configured to include ES_AVFI general information ES_AVFI_GI, one or more extended still picture video object group information search pointers ES_VOGI_SRP#1 to ES_VOGI_SRP#n, and one or more extended still picture video object group information ES_VOGI#1 to ES_VOGI#n (FIG. 53(b)(c)).

Each ES_VOGI is configured to include extended still picture video object group general information ES_VOG_GI, and one or more extended still picture VOB entries ES_VOB_ENT#1 to ES_VOB_ENT#n (FIG. 53(c)(d)). Here, ES_VOG_GI is configured to include number S_VOB_Ns of S_VOBs, S_VOB_STI number S_VOB_STIN, recording time of the first video object FIRST_VOB_REC_TM, recording time of the last video object LAST_VOB_REC_TM, start address of the still picture video object group S_VOG_SA, and time zone LOCAL_TM_ZONE of this S_VOG (FIG. 53(d)(e)).

Figure 54:
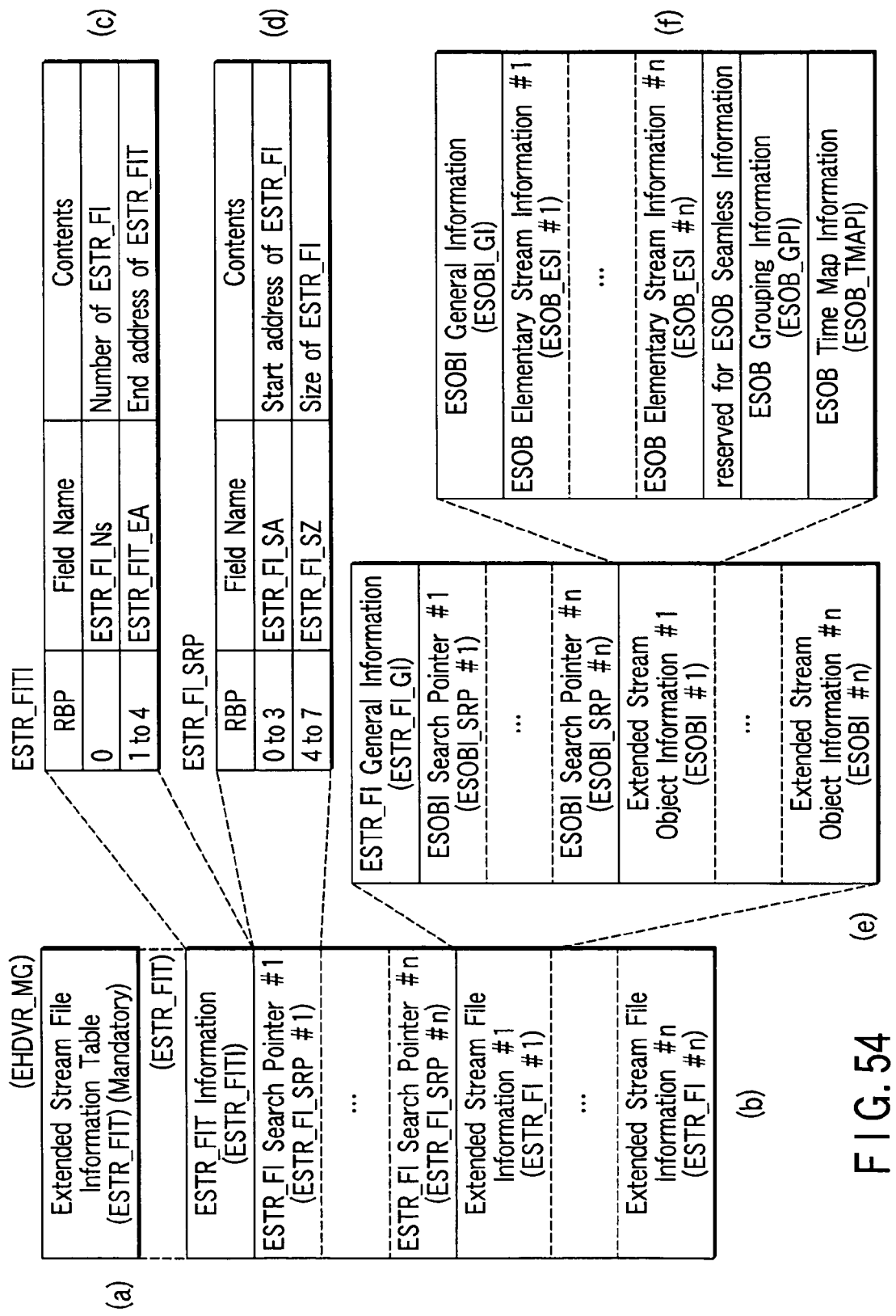
FIG. 54 exemplifies contents of the extended stream file information table (ESTR_FIT) shown in FIG. 46.

FIG. 54 exemplifies contents of the extended stream file information table (ESTR_FIT) shown in FIG. 46. Extended stream file information table ESTR_FIT is configured to include extended stream file information table information ESTR_FITI, one or more extended stream file information search pointers ESTR_FI_SRP#1 to ESTR_FI_SRP#n, and one or more extended stream file information ESTR_FI#1 to ESTR_FI#n (FIG. 54(a)(b)). Extended stream file information table information ESTR_FITI is configured to include number ESTR_FI_Ns of ESTR_FI, and end address ESTR_FIT_EA of ESTR_FIT (FIG. 54(b)(c)). Extended stream file information search pointer ESTR_FI_SRP is configured to include start address ESTR_FI_SA of ESTR_FI, and size ESTR_FI_SZ of ESTR_FI (FIG. 54(b)(d)).

Extended stream file information ESTR_FI is configured to include ESTR_FI general information ESTR_FI_GI, one or more extended stream object information search pointers ESOBI_SRP#1 to ESOBI_SRP#n, and one or more extended stream object information ESOBI#1 to ESOBI#n (FIG. 54(b)(e)). Extended stream object information ESOBI is configured to include ESOBI general information ESOBI_GI, one or more extended stream object elementary stream information ESOB_ESI#1 to ESOB_ESI#n, a reserved are for ESOB seamless information, extended stream object grouping information ESOB_GPI, and extended stream object time map information ESOB_TMAPI (FIG. 54(e)(f)).

FIG. 55 exemplifies contents of the extended stream object information (ESOBI) shown in FIG. 54. Extended stream object information ESOBI is configured to include ESOBI_GI, ESOB_ESI#1 to ESOB_ESI#n, ESOB seamless information reserved area, ESOB_GPI, and ESOB_TMAPI (FIG. 55(e)(f)). ESOB_GI is configured to include ESOB_GPI general information ESOB_GPI_GI, one or more grouping information search pointers GPI_SRP#1 to GPI_SRP#n, and one or more grouping information GPI #1 to GPI #n (FIG. 55(f)(g)). ESOB_GPI_GI is configured to include number GPI_SRP_Ns of the GPI search pointers (FIG. 55(g)(h)). Each GPI search pointer GPI_SRP is configured to include start address GPI_SA of GPI (FIG. 55(g)(i)). Each GPI is configured to include GPI general information GPI_GI, and one or more elementary stream PID ES_PID#1 to ES_PID#n (FIG. 55(g)(j)). Meanwhile, ESOB_TIMAPI is configured to include extended stream object time map general information ESOB_TMAP_GI, and one or more extended elementary stream time map general information EES_TMAP_GI#1 to EES_TMAP_GI#n (FIG. 55(f)(k)).

FIG. 56 exemplifies contents of the extended stream object information general information (ESOBI_GI) shown in FIG. 55. Extended stream object information general information ESOBI_GI is configured to include extended stream object type ESOB_TY, application format name (minor) APP_FORMAT2, profile ESOB_PROFILE of this ESOB, PID of PMT packet PMT_PID, PCR of PCR packet PCR_PID, original network identifier NETWORK_ID, transport stream identifier TS_ID, program number (service identifier) PROGRAM_NUMBER, ID of registration descriptor FORMAT_ID, service type SERVICE_TYPE, copy control information CP_CTRL_INFO, recording time ESOB_REC_TM of this ESOB, sub-second information ESOB_REC_TM_SUB for ESOB_REC_TM, local time zone LOCAL_TM_ZONE, default PID "ESOB_DEF_PID" of this ESOB, start presentation time "ESOB_S_PTM" of this ESOB, end presentation time "ESOB_E_PTM" of this ESOB, duration-ESOB_DURATION of this ESOB, number (PCR_POS_COUNT) of the preceding PCR packets indicated by PCR_POS, bit shift (PCR_POS_SHIFT) of PCR_POS for the designated PCR packet, number ESOB_ES_Ns of elementary streams in this ESOB, number ESOB_V_ES_Ns of video elementary streams in this ESOB, and number ESOB_A_ES_Ns of audio elementary streams in this ESOB.

FIG. 57 exemplifies contents of the extended stream object type (ESOB_TY) shown in FIG. 56. Extended stream object type ESOB_TY is configured to include a reserved bit field followed by a temporarily erased state flag (TE flag), a grouping information flag (GPI flag), another reserved bit field, and a seamless flag (SML flag). Here, the TE flag may be used to indicate whether the corresponding ESOB is in a normal state or in a temporarily erased state. An ESOB in the temporarily erased state will not be referred to by a cell in a user defined PGC. An ESOB in the temporarily erased state will not be reproduced in a normal playback operation. The GPI flag may be used to indicate whether the corresponding ESOB is provided with an ESOB elementary stream grouping information.

FIG. 58 exemplifies contents of the copy control information (CP_CTRL_INFO) shown in FIG. 56. Copy control information CP_CTRL_INFO is configured to include a CCI field, an APS field, an EPN field, an ICT field, a retention fled, a retention state field, and reserved field. Bits of the CCI field may be used to specify a copy-free, no more copy, copy one generation (copy once), or copy never. Bits of the APS (analog protection system) field may be used to specify a copy-free, a type 1 APS is on (automatic gain control AGC), a type 2 APS is on (AGC+2L color stripe), or a type 3 APS is on (AGC+4L color stripe). A bit of the EPN field may be used to specify an EPN-asserted state, or an EPN-unasserted state. When the EPN-asserted state is specified, contents of the corresponding ESOB are prevented from being output (especially internet-output). When the EPN-unasserted state is specified, contents of the corresponding ESOB are not prevented from being output. A bit of the ICT (image constraint token) field may be used to specify a high definition analog output in the form of a constraint image, or a high definition analog output in a high definition analog form. A bit of the retention field may be used, with a combination of the CCI field, to specify a movie mode (retention=0b and CCI=10b), a retention mode (retention=0b and CCI=11b), a non-movie mode/non-retention mode (retention=0b and CCI=00b or 01b), or a non-movie mode/non-retention mode (retention=1b). Bits of the retention state field may be used to specify the retention time forever, the retention time one week, the retention time two days, the retention time one day, the retention time 12 hours, the retention-time 6 hours, the retention time 3 hours, or the retention time 90 minutes.

FIG. 59 exemplifies contents of extended stream object elementary stream information (ESOB_ESI for video ES) shown in FIG. 55. Extended stream object elementary stream information ESOB_ESI for video ES is configured to include type ES_TY of the elementary stream, PID of the elementary stream ES_PID, stream type STREAM_TYPE in PMT, component tag COMPONENT_TAG in the stream identifier descriptor, stream content STREAM_CONTENT in the component descriptor, component type COMPONENT_TYPE in the component descriptor, attributes of video V_ATR, and copy control information CP_CTRL_INFO.

FIG. 60 exemplifies contents of extended stream object elementary stream information (ESOB_ESI for audio ES) shown in FIG. 55. Extended stream object elementary stream information ESOB_ESI for audio ES is configured to include type ES_TY of the elementary stream, PID of the elementary stream ES_PID, stream type STREAM_TYPE in PMT, component tag COMPONENT_TAG in the stream identifier descriptor, stream content STREAM_CONTENT in the component descriptor/audio component descriptor, component type COMPONENT_TYPE in the component descriptor/audio component descriptor, simulcast group tag SIMULCAST_GP_TAG in the audio component descriptor, attributes of audio elementary stream A_ATR, audio language code LANG_CODE, second audio language code LANG_CODE2, and copy control information CP_CTRL_INFO.

FIG. 61 exemplifies contents of extended stream object elementary stream information (ESOB_ESI for other ES) shown in FIG. 55. Extended stream object elementary stream information ESOB_ESI for other ES is configured to include type ES_TY of the elementary stream, PID of the elementary stream ES_PID, stream type STREAM_TYPE in PMT, component tag COMPONENT_TAG in the stream identifier descriptor, data component ID "DAT_COMP_ID" in the data component descriptor or data content descriptor for this other elementary stream in case of the ARIB standard, additional data component information "AD_DAT_COMP_IFO" in the data component descriptor for this other elementary stream in case of the ARIB standard, and copy control information CP_CTRL_INFO.

FIG. 62 exemplifies contents of stream type information (ES_TY) shown in each of FIGS. 59 to 61. Stream type information ES_TY is configured to include a field of stream type ST_TY. Bits of the ST_TY field may be used to specify the video elementary stream, audio elementary stream, or other elementary stream.

FIG. 63 exemplifies contents of the video attribute information (V_ATR) shown in FIG. 59. Video attribute information V_ATR is configured to include an application flag field, an aspect ratio field, a reserved field, a horizontal resolution field, another reserved field, a frame rate field, a vertical resolution field, and still another reserved field. Here, bits of the application flag field can be used to specify a first state in which the video stream is coded with the aspect ratio specified in the V_ATR, and a second state in which the video stream may be coded with the aspect ratio specified in the V_ATR. In the second state, the actual aspect ratio may be recorded in the corresponding stream. The bits of the application flag field can also be used to specify other (reserved) state.

FIG. 64 exemplifies contents of the audio attribute information (A_ATR) shown in FIG. 60. Audio attribute information A_ATR is configured to include a multi-lingual field (multi_ling), a main component field (main_comp), a quality indicator field (quality_indicator), a sampling rate field (sampling_rate), and a reserved field. Here, a bit of the multi-lingual field may be used to specify a no multi-lingual audio stream, or a bi-lingual audio stream in case where the stream is a dual mono. A bit of the main component field may be used to specify a case in which the audio stream is not a main audio, or another case in which the audio stream is the main audio. Bits of the quality indicator field may be used to specify a reserved state, a mode 1 state, a mode 2 state, or a mode 3 state (note that the mode 1 state to mode 3 state may be defined according to a digital broadcasting standard such as "ARIB STD-B32 Part 2, Chapter 2.") Bits of the sampling rate field may be used to specify a sampling frequency of 16 kHz, 22.05 kHz, 24 kHz, 32 kHz, 44.1 kHz, or 48 kHz.

FIG. 65 exemplifies contents of the grouping information general information (GPI_GI) shown in FIG. 55. Grouping information general information GPI_GI is configured to include type BLOCK_TY of a block of groups, type GP_TY of an ES group, block number BLOCK_NUMBER, and number of the ES_PIDs "ES_PID_Ns." Here, bits of BLOCK_TY may be used to specify a no definition state, a multi-view state, a rain attenuation state, a multi-channel state, or other reserved states. Bits of GP_TY may be used to specify no definition, a main group, a sub-group, or other reserved ones. The range of BLOCK_NUMBER may be any of 1 to 32. The range of ES_PID_Ns may be any of 1 to 32.

FIG. 66 exemplifies contents of the elementary stream packet identifier (ES_PID) shown in FIG. 55. Elementary stream packet identifier ES_PID is configured to include a PID of elementary stream "ES_PID." This ES_PID describes the PID of the elementary stream belonging to the corresponding group.

FIG. 67 exemplifies contents of the extended stream object time map general information (ESOB_TMAP_GI) shown in FIG. 55. Extended stream object time map general information ESOB_TMAP_GI is configured to include address offset ESOB_ADR_OFS of the ESOB, size ESOB_SZ of the ESOB, ESOB start packet position ESOB_S_PKT_POS, ESOB end packet position ESOB_E_PKT_POS, playback time range ESOBU_PB_TM_RNG of the ESOBU, and number EES_TMAP_GI_Ns of the extended elementary stream time map general information items (EES_TMAP_GIs).

Here, ESOB_ADR_OFS may be used to indicate the start address of the corresponding ESOB from the first logical block of an extended high-resolution stream video recording object file (EHR_STRxx.VRO file; not shown). ESOB_SZ may be used to indicate the size of the corresponding ESOB with the number of packet groups. In other words, the size of ESOB may be described in unit of a packet group.

ESOB_S_PKT_POS may be used to indicate the start packet position of the corresponding ESOB from the first packet group of this ESOB, where the value of ESOB_S_PKT_POS may be any of 1 to PKT_Ns. ESOB_E_PKT_POS may be used to indicate the end packet position of the corresponding ESOB from the last packet group of this ESOB, where the value of ESOB_E_PKT_POS may be any of 1 to PKT_Ns.

ESOBU_PB_TM_RNG may be used to indicate the playback time range of the corresponding ESOBU. More specifically, when ESOBU_PB_TM_RNG=00 h, the playback time range may be 0.4 to 1.0 second, for example. If ESOBU_PB_TM_RNG is 01 h, the playback time range may be, e.g., 1.0 to 2.0 seconds, for example. Other time ranges may be specified by ESOBU_PB_TM_RNG=10 h or 11 h.

EES_TMAP_GI_Ns may be used to indicate the number of extended elementary stream time map general information items (EES_TMAP_GIs) for the corresponding ESOB. EES_TMAP_GI_Ns (corresponding to the number of EES_TMAP_GI#1 to EES_TMAP_GI#n in FIG. 55(k)) is selected to be the same as the number (ETMAPI_Ns described in, e.g., extended HR_STMAP.IFO file: not shown) of extended elementary time map information items (corresponding to ESTMAPI#1 to ESTMAPI#n in FIG. 74(b)).

FIG. 68 exemplifies contents of the extended elementary stream time map general information (EES_TMAP_GI) shown in FIG. 55. Extended elementary stream time map general information EES_TMAP_GI is configured to include elementary stream PID "ES_PID", start presentation time "ES_S_PTM" of the corresponding elementary stream, end presentation time "ES_E_PTM" of the corresponding elementary stream, start address offset "ES_S_ADR_OFS" for the corresponding elementary stream, last ESOBU end packet position "ES_LAST_ESOBU_E_PKT_POS", and number "ES_ESOBU_ENT_Ns" of ESOBU entries for the corresponding elementary stream.

Here, ES_PID may be used to indicate the PID (packet identifier) of a video elementary stream for which the corresponding time map is generated. ES_S_PTM may be used to indicate the presentation start time (coded as presentation time stamp PTS) of the first video field of the corresponding elementary stream. ES_E_PTM may be used to indicate the presentation terminating time of the last video field of the corresponding elementary stream. ES_S_ADR_OFS may be used to indicate the start address of the corresponding elementary stream, with the number of packet groups from the first packet group of the ESOB. ES_LAST_ESOBU_E_PKT_POS may be used to indicate the end packet position of the last ESOBU, with the packet number (e.g., any one of 1 to 170 in the embodiment of FIG. 45(f)), in the last packet group of the corresponding ESOB. ES_ESOBU_ENT_Ns may be used to indicate the number of ESOBU entries (which are included in, e.g., the extended HR_STMAP.IFO file, not shown) in the extended stream time map information of the corresponding elementary stream.

Figure 69:
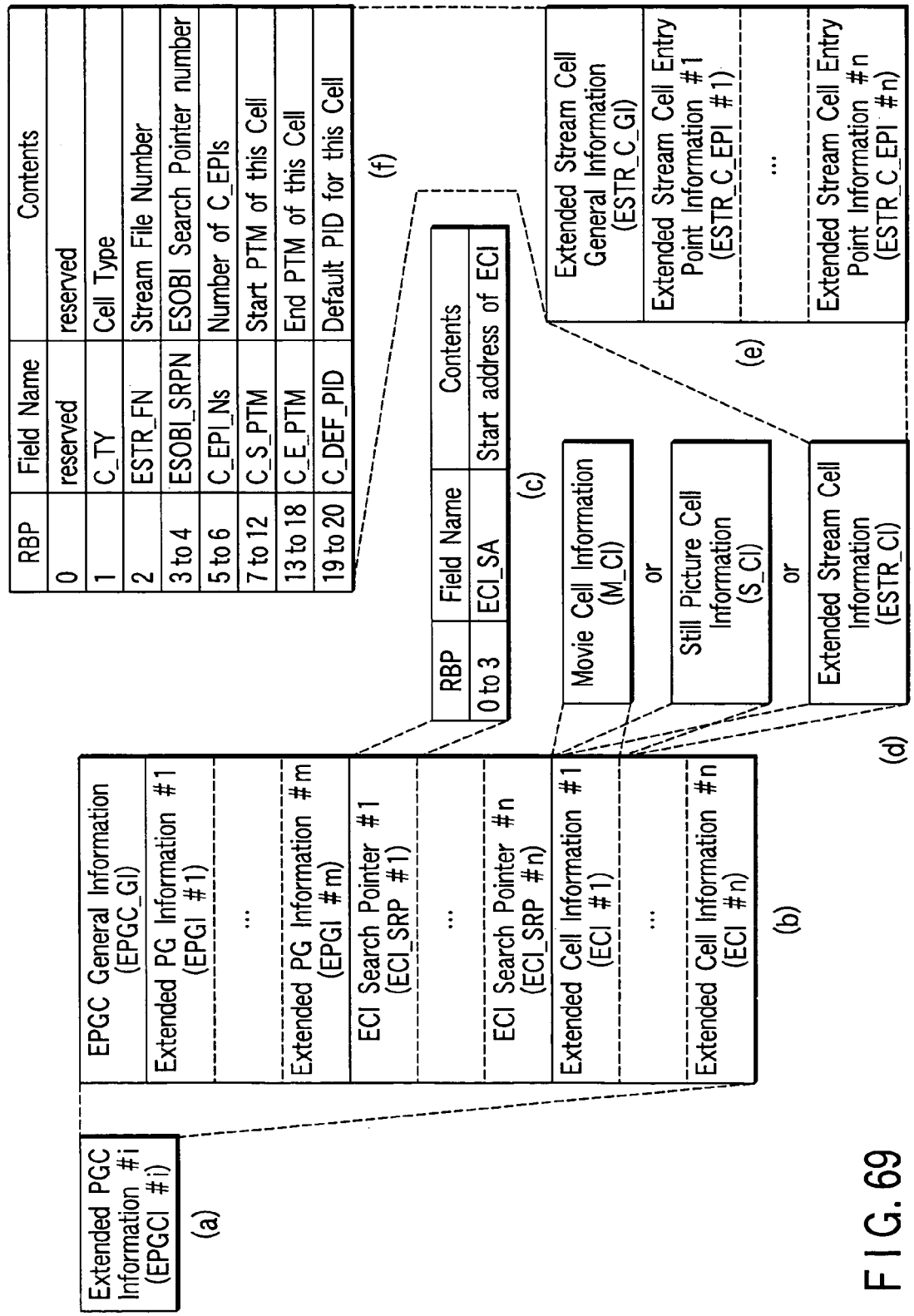
FIG. 69 exemplifies contents of the extended program chain information (EPGCI; or EORG_PGCI) shown in FIG. 46.

FIG. 69 exemplifies contents of the extended program chain information (EPGCI; or extended original PGC information EORG_PGCI) shown in FIG. 46. Extended program chain information EPGCI is configured to include extended program chain general information (EPGC_GI), extended program information #1 (EPGI#1) to extended program information #m (EPGI#m), extended cell information search pointer #1 (ECI_SRP#1) to extended cell information search pointer #n (ECI_SRP#n), and extended cell information #1 (ECI#1) to extended cell information #n (ECI#n) (FIG. 69(a) (b)). Each of ECI_SRP#1 to ECI_SRP#n may include start address ECI_SA of the corresponding ECI (FIG. 69(b)(c)). Incidentally, EPGCI is extended management information for managing PGC which comprises one or more programs each including one or more cells.

Here, there are three types of the extended cell information ECI; movie cell information M_CI, still picture cell information S_CI, and extended stream cell information ESTR_CI (FIG. 69(b)(d)). The data structure of M_C$_1$ and S_CI may be substantially the same as those of the current DVD Video Recording standard. Meanwhile, the data structure of ESTR_CI differs therefrom. More specifically, ESTR_CI is configured to include extended stream cell general information ESTR_C_GI, and one or more extended stream cell entry point information items #1 to #n (ESTR_C_EPI#1 to ESTR_C_EPI#n) (FIG. 69(d)(e)). Extended stream cell general information ESTR_C_GI may be configured to include cell type C_TY, stream file number ESTR_FN, extended stream object information search pointer number ESOBI_S-RPN, number C_EPI_Ns of the C_EPIs, start PTM "C_S_PTM" of the corresponding cell, end PTM "C_E_PTM" of the corresponding cell, and default PID of the corresponding cell (FIG. 69(e)(f)).

FIG. 70 exemplifies contents of the extended program chain general information (EPGCI_GI) shown in FIG. 69. Extended program chain general information EPGCI_GI is configured to include number PG_Ns of the programs in the corresponding extended PGC, and number CI_SRP_Ns of the extended CI_SRPs in the corresponding extended PGC. In case of the extended user defined PGC, this PG_Ns is set to '0'. In case of the extended original PGC, this PG_Ns may be any one of 1 to 99. The maximum number of this CI_SRP_Ns may be '1998' which is the sum of '999' for movie cells and '999' for still picture cells.

FIG. 71 exemplifies contents of the extended program information (EPGI) shown in FIG. 69. Extended program information EPGI is configured to include program type PG_TY, number C_Ns of the cells in the corresponding program, primary text information PRM_TXTI for this program, item text information search pointer number IT_TXT_SRPN indicating an item text whose text data may correspond to this program, representative picture information REP_PICTI, program resume marker information PG_RSM_MRKI, program index PG_INDEX, and program last modification time PG_LAST_MOD_TM describing the time when the corresponding program was modified last.

Here, PG_TY may be used to include protect information indicating whether the corresponding program is in a protected state. If the program is in the protected state, all data object referred to and used in the presentation (playback) of the program should not be erased temporarily or permanently.

REP_PICTI may be used to include cell number CN and picture point PICT_PT. The CN may describe the cell number in which the corresponding picture point (PICT_PT) exists. The PICT_PT may indicate the picture point in the target cell, using the presentation time (PTM).

PG_INDEX may be used to indicate the index number of the corresponding program. PG_INDEX is a unique number assigned to each program. Two or more programs should not have the same PG_INDEX value. Whenever creating a new program, unused available index value may be searched and described in PG_INDEX. The value of PG_INDEX may be kept unchanged until the corresponding program is deleted. The value of PG_INDEX may be kept unchanged when the corresponding program is modified. The value of PG_INDEX may be kept unchanged when other programs are deleted and/or newly created.

FIG. 72 exemplifies contents of the program resume marker information (PG_RSM_MRKI) shown in FIG. 71. Program resume marker information PG_RSM_MRKI is configured to include cell number CN, picture point PICT_PT, and marking time MRK_TM. The CN may describe the cell number in which the picture point (PICT_PT) exists. The PICT_PT may describe the picture point in the target cell. The MRK_TM may describe the time when the corresponding marker was made. In short, PG_RSM_MRKI may be used to include a resume marker of the corresponding program. PG_RSM_MRKI should not refer to the data object in a temporarily erased state.

Figure 73:
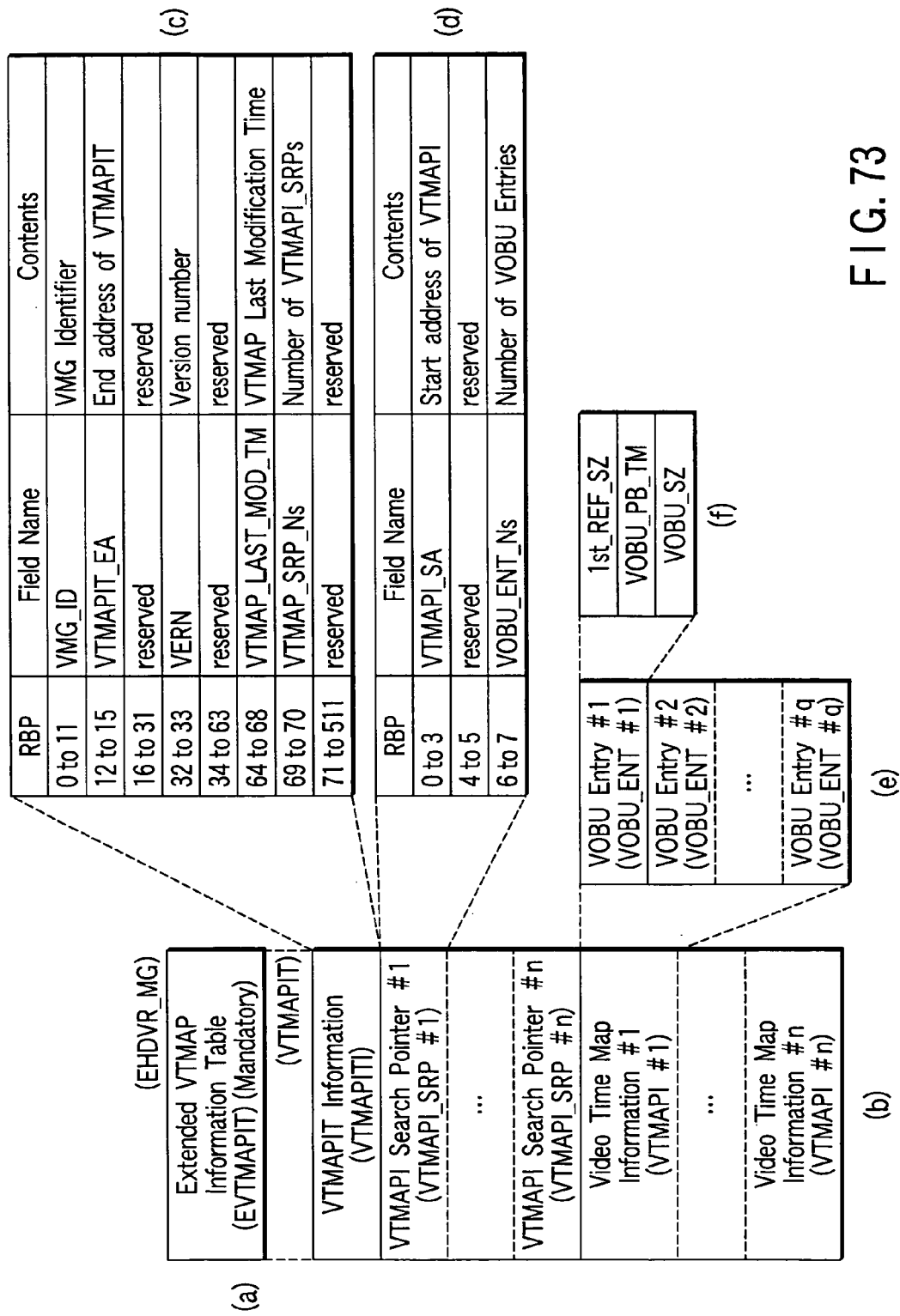
FIG. 73 exemplifies contents of the extended video time map information table (EVTMAPIT) shown in FIG. 46.

FIG. 73 exemplifies contents of the extended video time map information table (EVTMAPIT) shown in FIG. 46. Extended video time map information table EVTMAPIT is configured to include video time map information table information VTMAPITI, one or more video time map information search pointers #1 to #n (VTMAPI_SRP#1 to VTMAPI_SRP#n), and one or more video time map information items #1 to #n (VTMAPI#1 to VTMAPI#n) (FIG. 73(a)(b)).

Here, VTMAPITI may be used to include video manager identifier VMG_ID, end address VTMAPIT_EA of video time map information table VTMAPIT, version number VERN of the used standard (e.g., DVD EHD_VR standard), last modification time VTMAP_LAST_MOD_TM of video time map VTMAP, and number VTMAPI_SRP_Ns of video time map information search pointers (FIG. 73(b)(c)). VMG_ID may be used to describe "DVD EHR_VTMAP" to identify a video time map file (EHR_VTMAP.IFO; not shown) with character set code of ISO/IEC 646:1983. VTMAP_LAST_MOD_TM may be used to describe the time when the content of EHR_VTMAP.IFO was modified last.

Each VTMAPI_SRP may include start address VTMAPI_SA of VTMAPI, and number VOBU_ENT_Ns of VOBU entries shown in FIG. 73(e) (FIG. 73(b)(d)). Each VTMAPI may include one or more VOBU entries #1 to #q (VOBU_ENT#1 to VOBU_ENT#q) (FIG. 73(b)(e)). Each VOBU_ENT may include first reference picture size 1ST_REF_SZ of the corresponding video object unit VOBU, playback time VOBU_PB_TM of the corresponding VOBU, and size VOBU_SZ of the corresponding VOBU (FIG. 73(e)(f)).

Figure 74:
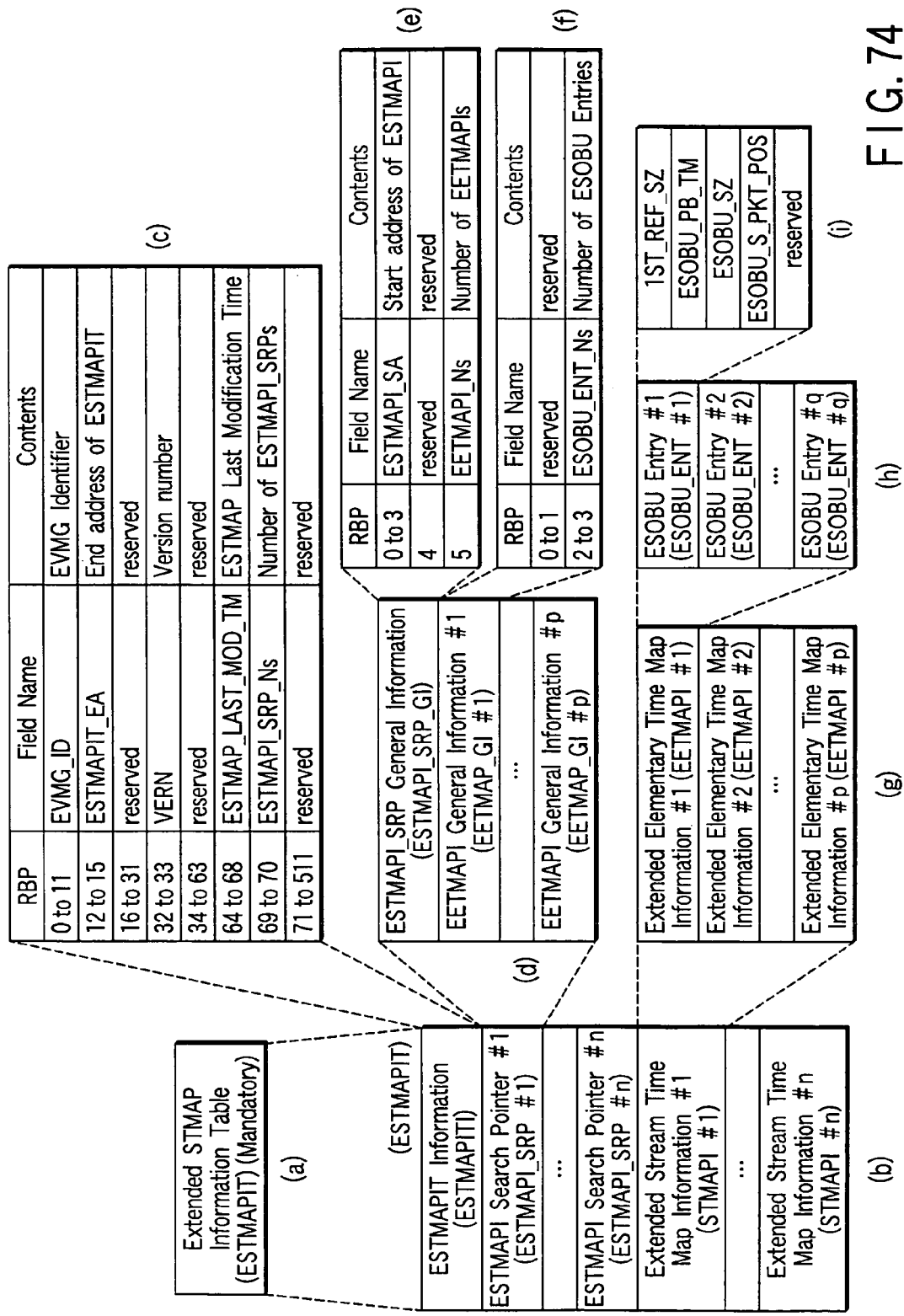
FIG. 74 exemplifies contents of the extended stream time map information table (ESTMAPIT) shown in FIG. 46.

FIG. 74 exemplifies contents of the extended stream time map information table (ESTMAPIT) shown in FIG. 46. Extended stream time map information table ESTMAPIT is configured to include extended stream time map information table information ESTMAPITI, one or more extended stream time map information search pointers #1 to #n (ESTMAPI_SRP#1 to ESTMAPI_SRP#n), and one or more extended stream time map information items #1 to #n (ESTMAPI#1 to ESTMAPI#n) (FIG. 74(a)(b)).

Here, ESTMAPITI may be used to include extended video manager identifier EVMG_ID, end address ESTMAPIT_EA of the extended stream time map information table, version number VERN of the used standard (e.g., DVD EHD_VR standard), last modification time ESTMAP_LAST_MOD_TM of extended stream time map ESTMAP, and number ESTMAPI_SRP_Ns of extended stream time map information search pointers (FIG. 74(b)(c)). EVMG_ID may be used to describe "DVD_EHR_STMAP" to identify a stream time map file (EHR_STMAP.IFO; not shown) with character set code of ISO/IEC 646:1983. ESTMAP_LAST_MOD_TM may be used to describe the time when the content of EHR_STMAP.IFO was modified last.

Each ESTMAPI_SRP may include extended stream time map information search pointer general information ESTMAPI_SRP_GI, and one or more extended elementary time map information general information items #1 to #p (EETMAPI_GI#1 to EETMAPI_GI#p) (FIG. 74(b)(d)). Here, ESTMAPI_SRP_GI may be used to include start address ESTMAPI_SA of ESTMAPI, and number EETMAPI_Ns of extended elementary time map information items (EETMAPIs shown in FIG. 74(g)) (FIG. 74(d)(e)). Each EETMAPI_GI may be used to include number ESOBU_ENT_Ns of extended stream object unit entries (ESOBU_ENTs in FIG. 74(h)) (FIG. 74(d)(f)). Each ESTMAPI may include extended elementary time map information items #1 to #p (EETMAPI#1 to EETMAPI#p) (FIG. 74(b)(g)). Each EETMAPI may be configured to include one or more extended SOBU entries #1 to #q (ESOBU_ENT#1 to ESOBU_ENT#q) (FIG. 74(g)(h)).

Each ESOBU_ENT may be configured to include first reference picture size 1ST_REF_SZ of the corresponding ESOBU, playback time ESOBU_PB_TM of the corresponding ESOBU, size ESOBU_SZ of the corresponding ESOBU, and start packet position ESOBU_S_PKT_POS of the corresponding ESOBU (FIG. 74(h)(i)). This ESOBU_S_PKT_POS may be used to describe the start packet position of the corresponding ESOBU, with the relative packet number (PKTG_RPKTN) in the first packet group of the corresponding ESOBU. The value of ESOBU_S_PKT_POS may be any one of 1 to PKT_Ns (number of packets in the packet group).

Incidentally, the pack/packet group header may contain arrival time information (ATS) and attribute information (PCRI) of the first TS packet, and the pack/packet group data may contain difference information (IAPAT) from the arrival time of the first TS packet together with data of TS packets, or may contain time information items (PATS#) of corresponding TS packets.

Note that at least one of TS packets may have an adaptation field including a predetermined program clock reference (PCR), and the pack/packet group header may contain location information (156 in FIG. 14) of the program clock reference (PCR).

Alternatively, an information recording medium to which the system of an embodiment of the present invention can be applied may also be configured as follows. More specifically, in a recording medium configured to record a digital stream signal complying with an MPEG transport stream and a video recording signal obtained by converting an analog signal into a digital signal by MPEG encoding, this recording medium may have a management area and data area, and the data area can store both the video recording signal and digital stream signal. Data of this digital stream signal can be separately recorded as a plurality of objects (ESOB). Each object contains data units (ESOBU). One data unit is made up of pack/packet groups each of which is formed by grouping a plurality of transport stream packets (TS packets). The pack/packet group is formed of a pack/packet group header and pack/packet group data containing TS packets having data of the digital stream signal.

On the other hand, the management area may contain cell information (CI) associated with cells as playback units, and attribute information (contained in ESFI in FIG. 4; PCR_Pack number or 1st_Ref_PIC_PTM in FIG. 8) of the object (ESOB). This cell information (management information layer 10 in FIG. 2) can designate both data (VOB in FIG. 2) of the video recording signal and the object (ESOB in FIG. 2) (VOB can be designated by time information VOBU_PB_TM (not shown); ESOB can be designated by time information ESOBU_PB_TM in FIG. 8). This cell information (CI#q in FIG. 11) can record number information (corresponding ESOB number in FIG. 11) used to designate the object (ESOB).

Note that at least one of TS packets may have an adaptation field including a predetermined program clock reference (PCR), and the management area may contain location information (PCR_Pack number or corresponding 1st_Ref_PIC_PTM in FIG. 8) of the program clock reference.

An information recording method according to an embodiment of the present invention may be configured to record information on the aforementioned medium.

An information playback method according to an embodiment of the present invention may be configured to play back information from the aforementioned medium.

An information recording apparatus according to an embodiment of the present invention may be configured to record information on the aforementioned medium.

An information playback apparatus according to an embodiment of the present invention may be configured to play back information from the aforementioned medium.

Also, an apparatus according to an embodiment of the present invention can comprise a management data generation unit for generating a management map or the like used to manage stream data, a support information appending unit for appending support information of management data in the generated management data, and a drive unit for recording the generated management data.

Incidentally, in the embodiment of FIG. 20, when a stream recording (digital video input) is performed, encoder unit 79 is configured to record the digital stream signal using an MPEG transport stream. On the other hand, when a video recording (analog video input) is performed, encoder unit 79 is configured to record a digital stream signal, obtained by converting an analog video input using A/D converter 84, using an MPEG program stream.

Note that the present invention is not limited to the aforementioned embodiments, and various modifications may be made without departing from the scope of the invention when it is practiced. The respective embodiments may be combined as needed as long as such combinations are possible, and combined effects can be obtained in such case. Furthermore, the embodiments include inventions of various stages, and various inventions can be extracted by appropriately combining a plurality of disclosed required constituent elements. For example, even when some required constituent elements are omitted from all required constituent elements described in the embodiment, an arrangement from which the required constituent elements are omitted can be extracted as an invention as long as the problems that have been discussed in the paragraphs of the problems to be solved by the invention, and the effects that have been explained in the paragraphs of the effect of the invention can be obtained.

As described in detail above, according to the present invention, data of digital TV broadcast and the like can be flexibly managed.

What is claimed is:

1. A computer-readable non-transitory information medium or a computer-associated machine-readable non-transitory information medium for access by a recording/reproducing apparatus, the medium comprising one or more data areas configured to store object data items corresponding to stream files of an MPEG transport stream, and a management area configured to store management information for managing the stream files, wherein one of the object data items includes
a first MPEG data item corresponding to the MPEG transport stream which comprises transport packets each associated with an arrival time stamp, and another one of the object data items can include
a second MPEG data item corresponding to a self-encoded MPEG stream, a coding format of the second MPEG data item being different from that of the first MPEG data item; and the management information comprises playlist information including one or more playback control items, the playback control item including number information which refers to the first MPEG data item.

2. The medium of claim 1, wherein the management information further comprises format ID information identifying a registration descriptor of the object data items.

3. A method of recording information on an information recording medium comprising:

one or more data areas configured to store object data items corresponding to stream files of an MPEG transport stream, and a management area configured to store management information for managing the stream files, wherein one of the object data items includes a first MPEG data item corresponding to the MPEG transport stream which comprises transport packets each associated with an arrival time and another one of the object data items can include a second MPEG data item corresponding to a self-encoded MPEG stream, a coding format of the second MPEG data item being different from that of the first MPEG data item, and the management information comprises playlist information including one or more playback control items, the playback control item including number information which refers to the first MPEG data item, the method comprising: generating the object data items, recording the generated object data items on the data area, generating the management information, and recording the generated management information on the management area.

4. The recording method of claim 3, wherein the management information further comprises format ID information identifying a registration descriptor of the object data items.

5. A method of reproducing information from an information recording medium comprising:

one or more data areas configured to store object data items corresponding to stream files of an MPEG transport stream, and a management area configured to store management information for managing the stream files, wherein one of the object data items includes a first MPEG data item corresponding to the MPEG transport stream which comprises transport packets each associated with an arrival time stamp, and another one of the object data items can include a second MPEG data item corresponding to a self-encoded MPEG stream, a coding format of the second MPEG data item being different from that of the first MPEG data item, and the management information comprises playlist information including one or more playback control items, the playback control item including number information which refers to the first MPEG data item the method comprising:

reproducing the management information from the management area, and reproducing the object data items from the data area based on the reproduced management information.

6. The reproducing method of claim 5, wherein the management information further comprises format ID information identifying a registration descriptor of the object data items.

7. An apparatus for reproducing information from an information recording medium comprising:

one or more data areas configured to store object data items corresponding to stream files of an MPEG transport stream, and a management area configured to store management information for managing the stream files, wherein one of the object data items includes a first MPEG data item corresponding to the MPEG transport stream which comprises transport packets each associated with an arrival time stamp, and another one of the object data items can include a second MPEG data item corresponding to a self-encoded MPEG stream, a coding format of the second MPEG data item being different from that of the first MPEG data item, and the management information comprises playlist information including one or more playback control items, the playback control item including number information which refers to the first MPEG data item, the apparatus comprising:

a first reproducer configured to reproduce the management information from the management area, and a second reproducer configured to reproduce the object data items from the data area based on the reproduced management information.

8. The reproducing apparatus of claim 7, wherein the management information further comprises format ID information identifying a registration descriptor of the object data items.

* * * * *